(12) United States Patent
Martinez de Leon et al.

(10) Patent No.: US 10,682,837 B2
(45) Date of Patent: Jun. 16, 2020

(54) METHOD AND COMPOSITIONS FOR APPLYING A MATERIAL ONTO ARTICLES

(71) Applicant: The Procter & Gamble Company, Cincinnati, OH (US)

(72) Inventors: Karen Aida Martinez de Leon, Mason, OH (US); Christopher Gerald Donner, Liberty Township, OH (US); Matthew Richard Allen, Mason, OH (US); Robert Paul Cassoni, Waynesville, OH (US); Michael Idacavage, Marietta, GA (US); Neil Cramer, Boulder, CO (US)

(73) Assignee: The Proctor & Gamble Company, Cincinnati, OH (US)

( * ) Notice: Subject to any disclaimer, the term of this patent is extended or adjusted under 35 U.S.C. 154(b) by 7 days.

(21) Appl. No.: 15/988,314

(22) Filed: May 24, 2018

(65) Prior Publication Data

US 2018/0354249 A1    Dec. 13, 2018

Related U.S. Application Data

(60) Provisional application No. 62/517,207, filed on Jun. 9, 2017.

(51) Int. Cl.
*B32B 1/00* (2006.01)
*B32B 7/00* (2019.01)
(Continued)

(52) U.S. Cl.
CPC .............. *B32B 37/025* (2013.01); *B32B 1/02* (2013.01); *B32B 7/12* (2013.01); *B32B 27/08* (2013.01);
(Continued)

(58) Field of Classification Search
CPC .... B32B 1/00; B32B 1/02; B32B 7/00; B32B 7/10; B32B 7/12; B32B 27/00;
(Continued)

(56) References Cited

U.S. PATENT DOCUMENTS

| 2,134,041 A | 10/1938 | Hamm |
| 2,684,775 A | 7/1954 | Von Hofe |

(Continued)

FOREIGN PATENT DOCUMENTS

| DE | 10028620 A1 | 12/2001 |
| EP | 0076593 | 4/1983 |

(Continued)

OTHER PUBLICATIONS

U.S. Appl. No. 15/988,335, filed May 24, 2018, Sawin et al.
(Continued)

*Primary Examiner* — Jacob T Minskey
*Assistant Examiner* — Matthew Hoover
(74) *Attorney, Agent, or Firm* — Sarah M DeCristofaro

(57) ABSTRACT

Apparatuses and methods for applying a transfer material from a transfer component onto the surface of an article are disclosed, including apparatuses and methods of transfer printing on and/or decorating three-dimensional articles, as well as the articles printed and/or decorated thereby. In some embodiments, the method may utilize a printer such as an inkjet printer. In some cases, the transfer material may be a UV curable ink and/or adhesive. When the transfer material is UV curable, the transfer component may be permeable to UV radiation to allow curing of the ink and/or adhesive therethrough. UV curable adhesives including thiol-acrylate and thiol-ene acrylate inkjet-able adhesives are disclosed.

10 Claims, 24 Drawing Sheets

(51) Int. Cl.
| | | |
|---|---|---|
| *B32B 27/00* | (2006.01) | |
| *B32B 37/00* | (2006.01) | |
| *B32B 38/00* | (2006.01) | |
| *B41J 3/00* | (2006.01) | |
| *B41J 11/00* | (2006.01) | |
| *B41M 5/00* | (2006.01) | |
| *B44C 1/00* | (2006.01) | |
| *C09D 11/00* | (2014.01) | |
| *C09J 4/00* | (2006.01) | |
| *B41J 3/407* | (2006.01) | |
| *B44C 1/17* | (2006.01) | |
| *B32B 7/12* | (2006.01) | |
| *B32B 37/12* | (2006.01) | |
| *B32B 1/02* | (2006.01) | |
| *B32B 27/08* | (2006.01) | |
| *B41M 5/035* | (2006.01) | |
| *C09D 11/101* | (2014.01) | |
| *B41M 5/03* | (2006.01) | |
| *C09D 11/30* | (2014.01) | |
| *B41M 5/025* | (2006.01) | |
| *B41M 7/00* | (2006.01) | |

(52) U.S. Cl.
CPC ............ *B32B 37/12* (2013.01); *B32B 38/145* (2013.01); *B41J 3/4073* (2013.01); *B41J 11/002* (2013.01); *B41M 5/0256* (2013.01); *B41M 5/03* (2013.01); *B41M 5/0356* (2013.01); *B44C 1/1708* (2013.01); *C09D 11/101* (2013.01); *C09D 11/30* (2013.01); *C09J 4/00* (2013.01); *B32B 2439/00* (2013.01); *B41M 7/0081* (2013.01)

(58) Field of Classification Search
CPC ......... B32B 27/08; B32B 37/00; B32B 37/02; B32B 37/025; B32B 37/10; B32B 37/12; B32B 38/00; B32B 38/10; B32B 38/14; B32B 38/145; B41J 3/00; B41J 3/40; B41J 3/407; B41J 3/4073; B41J 11/00; B41J 11/002; B41M 5/00; B41M 5/02; B41M 5/025; B41M 5/0256; B41M 5/03; B41M 5/035; B41M 5/0356; B44C 1/00; B44C 1/10; B44C 1/17; B44C 1/17; B44C 1/1708; C09D 11/00; C09D 11/10; C09D 11/101; C09D 11/30; C09J 4/00
See application file for complete search history.

(56) References Cited

U.S. PATENT DOCUMENTS

| | | |
|---|---|---|
| 3,313,667 A | 4/1967 | Flood |
| 3,418,926 A | 12/1968 | Ichiro |
| 3,587,455 A | 6/1971 | Childress et al. |
| 4,129,473 A | 12/1978 | Perret |
| 4,769,100 A | 9/1988 | Short et al. |
| 4,828,637 A | 5/1989 | Mentzer et al. |
| 4,838,973 A | 6/1989 | Mentzer et al. |
| 4,960,482 A | 10/1990 | Crane et al. |
| 5,116,452 A | 5/1992 | Eder |
| 5,311,816 A | 5/1994 | Schliessmann |
| 5,557,376 A | 9/1996 | Landa et al. |
| 5,585,900 A | 12/1996 | Lior et al. |
| 5,641,372 A | 6/1997 | Okuno |
| 5,674,345 A | 10/1997 | Nash |
| 5,702,559 A | 12/1997 | Bright |
| 5,753,350 A | 5/1998 | Bright |
| 5,832,819 A | 11/1998 | Widman |
| 5,893,016 A | 4/1999 | Landa et al. |
| 5,908,729 A | 6/1999 | Landa et al. |
| 5,915,152 A | 6/1999 | Meiri et al. |
| 5,923,929 A | 7/1999 | Ben Avraham et al. |
| 5,972,548 A | 10/1999 | Landa et al. |
| 6,108,513 A | 8/2000 | Landa et al. |
| 6,110,316 A | 8/2000 | Kobayashi et al. |
| 6,135,654 A | 10/2000 | Jennel |
| 6,143,407 A | 11/2000 | Lythgoe et al. |
| 6,153,038 A | 11/2000 | Brooker |
| 6,250,316 B1 | 6/2001 | Brandt et al. |
| 6,363,234 B2 | 3/2002 | Landa et al. |
| 6,438,352 B1 | 8/2002 | Landa et al. |
| 6,479,205 B1 | 11/2002 | Landa et al. |
| 6,488,794 B1 | 12/2002 | Bright et al. |
| 6,584,294 B1 | 6/2003 | Landa et al. |
| 6,584,894 B1 | 7/2003 | Mason |
| 6,598,531 B2 * | 7/2003 | Nedblake, Jr. ...... B23K 26/0846 101/490 |
| 6,605,174 B1 | 8/2003 | Landa et al. |
| 6,608,979 B1 | 8/2003 | Landa et al. |
| 6,695,028 B1 | 2/2004 | Scheuber et al. |
| 6,695,501 B2 | 2/2004 | Nedblake, Jr. et al. |
| 6,699,352 B2 | 3/2004 | Sawatsky |
| 6,736,055 B2 | 5/2004 | Lutz et al. |
| 6,835,268 B2 | 12/2004 | Widman |
| 6,863,755 B2 | 3/2005 | Nedblake, Jr. et al. |
| 6,863,756 B2 | 3/2005 | Nedblake, Jr. et al. |
| 6,920,822 B2 | 7/2005 | Finan |
| 6,964,722 B2 | 11/2005 | Taylor et al. |
| 7,011,728 B2 | 3/2006 | Dewig et al. |
| 7,048,651 B2 | 5/2006 | Kennedy, III et al. |
| 7,210,408 B2 | 5/2007 | Uptergrove |
| 7,354,691 B2 | 4/2008 | Landa et al. |
| 7,373,878 B2 | 5/2008 | Finan |
| 7,448,323 B2 | 11/2008 | Kennedy, III et al. |
| 7,467,847 B2 | 12/2008 | Baxter et al. |
| 7,517,622 B2 | 4/2009 | Golodetz et al. |
| 7,603,947 B2 | 10/2009 | Hanzel |
| 7,647,008 B2 | 1/2010 | Landa et al. |
| 7,678,525 B2 | 3/2010 | Landa et al. |
| 7,765,931 B2 | 8/2010 | Kennedy, III et al. |
| 7,815,761 B2 | 10/2010 | Phillips |
| 7,829,163 B2 | 11/2010 | Albenice et al. |
| 8,268,443 B2 | 9/2012 | Laprade et al. |
| 8,501,316 B2 | 8/2013 | Laprade et al. |
| 8,522,989 B2 | 9/2013 | Uptergrove |
| 8,551,270 B2 | 10/2013 | Previty et al. |
| 8,579,402 B2 | 11/2013 | Uptergrove |
| 8,616,259 B1 | 12/2013 | Woods et al. |
| 8,667,895 B2 | 3/2014 | Gerigk et al. |
| 8,685,610 B2 | 4/2014 | Golodetz et al. |
| 8,714,731 B2 | 5/2014 | Leung et al. |
| 8,800,439 B2 * | 8/2014 | Clark ..................... B41J 2/0057 101/194 |
| 8,851,136 B1 | 10/2014 | Drynkin et al. |
| 8,899,739 B2 | 12/2014 | Ohnishi |
| 8,919,247 B2 | 12/2014 | Morgavi et al. |
| 8,943,968 B2 | 2/2015 | Tanaka et al. |
| 9,021,947 B2 | 5/2015 | Landa |
| 9,186,884 B2 | 11/2015 | Landa et al. |
| 9,211,966 B2 | 12/2015 | Broad |
| 9,221,573 B2 | 12/2015 | Lorence et al. |
| 9,229,664 B2 | 1/2016 | Landa et al. |
| 9,254,687 B2 | 2/2016 | Ohnishi |
| 9,290,016 B2 | 3/2016 | Landa et al. |
| 9,303,185 B2 | 4/2016 | Sambhy et al. |
| 9,333,788 B2 | 5/2016 | Will et al. |
| 9,381,736 B2 | 7/2016 | Landa et al. |
| 9,487,027 B1 | 11/2016 | Strater, Jr. et al. |
| 2002/0168212 A1 | 11/2002 | Nedblake, Jr. et al. |
| 2006/0018698 A1 | 1/2006 | Vogt |
| 2007/0120930 A1 | 5/2007 | Domoto |
| 2007/0144364 A1 | 6/2007 | Hitchcock |
| 2009/0000508 A1 | 1/2009 | Edison |
| 2009/0207198 A1 | 8/2009 | Muraoka |
| 2009/0214837 A1 | 8/2009 | Albenice et al. |
| 2010/0038022 A1 | 2/2010 | Lapelosa |
| 2010/0091057 A1 | 4/2010 | Kennedy, III et al. |
| 2010/0154613 A1 | 6/2010 | Boucher et al. |
| 2010/0212821 A1 | 8/2010 | Grinberg et al. |
| 2010/0220169 A1 | 9/2010 | Howell |

(56) References Cited

U.S. PATENT DOCUMENTS

| | | |
|---|---|---|
| 2010/0257819 A1 | 10/2010 | Schach |
| 2011/0177267 A9 | 7/2011 | Albenice et al. |
| 2011/0232514 A1 | 9/2011 | Putzer et al. |
| 2012/0031548 A1 | 2/2012 | Broad |
| 2012/0061014 A1 | 3/2012 | Patel et al. |
| 2012/0118503 A1 | 5/2012 | Lorence et al. |
| 2013/0019566 A1 | 1/2013 | Schach |
| 2013/0133532 A1 | 5/2013 | Kian et al. |
| 2013/0206328 A1 | 8/2013 | Chiu et al. |
| 2014/0037875 A1 | 2/2014 | Scully |
| 2014/0204145 A1 | 7/2014 | Ohnishi |
| 2014/0221185 A1 | 8/2014 | Yamamoto |
| 2014/0285600 A1 | 9/2014 | Domeier et al. |
| 2014/0338840 A1 | 11/2014 | Lux et al. |
| 2015/0022602 A1 | 1/2015 | Landa et al. |
| 2015/0024648 A1 | 1/2015 | Landa et al. |
| 2015/0025179 A1 | 1/2015 | Landa et al. |
| 2015/0042736 A1 | 2/2015 | Landa et al. |
| 2015/0044431 A1 | 2/2015 | Landa et al. |
| 2015/0049134 A1 | 2/2015 | Shmaiser et al. |
| 2015/0054865 A1 | 2/2015 | Landa et al. |
| 2015/0059601 A1 | 3/2015 | Domeier et al. |
| 2015/0165759 A1 | 6/2015 | Landa et al. |
| 2015/0183544 A1 | 7/2015 | Moffatt et al. |
| 2015/0343762 A1 | 12/2015 | Shaul et al. |
| 2015/0351250 A1 | 12/2015 | Kella et al. |
| 2016/0075130 A1* | 3/2016 | Landa ............... B41J 2/0057 347/103 |
| 2016/0129687 A1 | 5/2016 | Vilas Boas et al. |
| 2016/0167363 A1 | 6/2016 | Landa et al. |

FOREIGN PATENT DOCUMENTS

| | | |
|---|---|---|
| EP | 1163156 B1 | 11/2003 |
| EP | 2484524 | 8/2012 |
| EP | 1769916 B1 | 11/2012 |
| GB | 827313 | 3/1960 |
| GB | 898153 | 6/1962 |
| GB | 2366241 A | 3/2002 |
| JP | 2007070417 A | 3/2007 |
| WO | WO93007541 | 4/1993 |
| WO | WO96034319 | 10/1996 |
| WO | WO2001012440 | 2/2001 |

OTHER PUBLICATIONS

Zuilhof et al. "ID Technology Choosing the Right Pressure-Sensitive Labeler", 20 pgs.

International Search Report and Written Opinion dated Sep. 17, 2018, PCT/US2018/036655, 12 pgs.

International Search Report and Written Opinion dated Sep. 20, 2018, PCT/US2018/036652, 18 pgs.

* cited by examiner

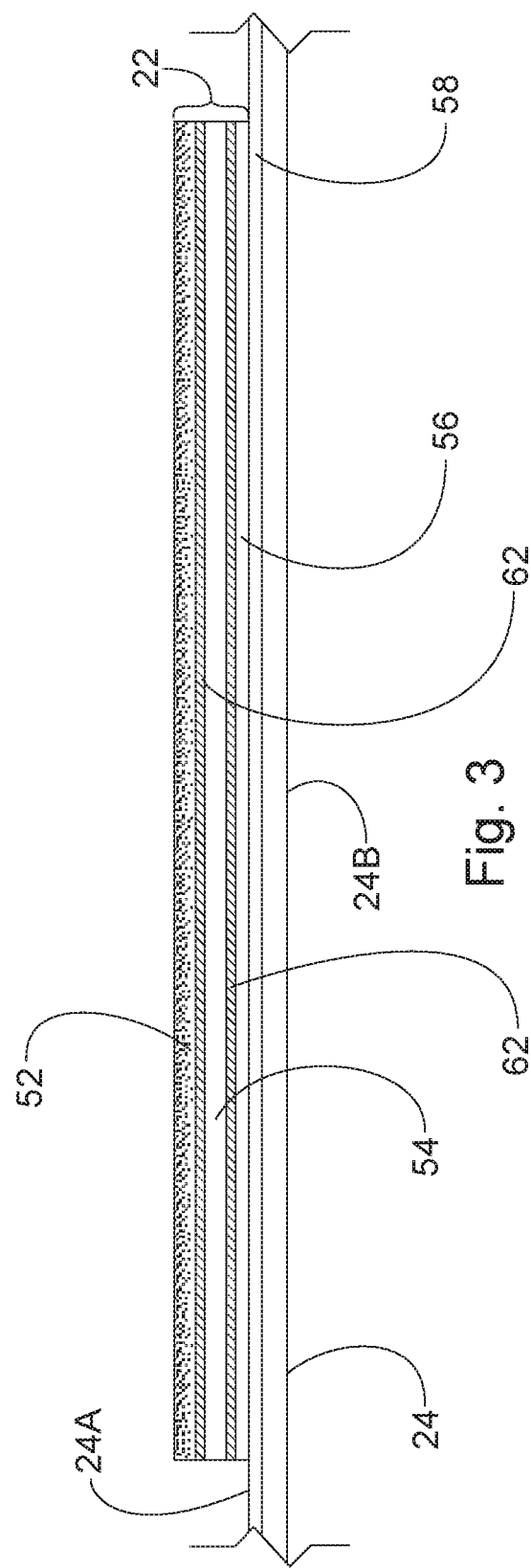

METHOD AND COMPOSITIONS FOR APPLYING A MATERIAL ONTO ARTICLES

FIELD OF THE INVENTION

The present invention is directed to apparatuses and methods for applying a transfer material onto an article, including apparatuses and methods of transfer printing onto and/or decorating three-dimensional articles, as well as the articles having the transfer material thereon and/or which are decorated thereby.

BACKGROUND

Various apparatuses and methods of printing are disclosed in the patent literature and on the internet. Patent publications disclosing apparatuses and methods of printing include: U.S. Pat. No. 6,135,654, Jennel; U.S. Pat. No. 6,699,352 B2, Sawatsky; U.S. Pat. No. 6,920,822 B2, Finan; U.S. Pat. No. 7,210,408 B2, Uptergrove; U.S. Pat. No. 7,373,878 B2, Finan; U.S. Pat. No. 7,467,847 B2, Baxter, et al.; U.S. Pat. No. 8,522,989 B2, Uptergrove; U.S. Pat. No. 8,579,402 B2, Uptergrove; U.S. Pat. No. 8,667,895 B2, Gerigk, et al.; U.S. Pat. No. 8,714,731 B2, Leung. et al.; U.S. Pat. No. 8,899,739 B2, Ohnishi; U.S. Pat. No. 8,919,247 B2; Mogavi, et al.; U.S. Pat. No. 9,303,185 B2, Sambhy, et al.; U.S. Pat. No. 9,487,027, Strater, Jr., et al.; and US Patent Application Publication Nos. US 2009/0207198 A1, Muraoka; US 2010/0212821 A1, Grinberg, et al.; US 2011/0232514 A1, Putzer, et al.; US 2013/0019566 A1, Schach; US 2014/0285600 A1, Domeier, et al.; US 2015/0022602 A1, Landa, et al.; US 2015/0024648 A1, Landa, et al.; US 2015/0183544 A1, Moffatt, et al.; and EP 1163156 B1, Johnson. Other types of apparatuses and methods include the apparatus and method disclosed in U.S. Patent Application Pub No. US 2012/0031548 A1, "Apparatus and Method for Applying a Label to a Non-Ruled Surface", filed in the name of Broad.

A number of current efforts are being directed to printing, particularly inkjet printing, on three-dimensional articles such as bottles and the like. Some current printing apparatuses and processes use ink jet printing to print directly on three-dimensional articles. Unfortunately, with current inkjet technology and current printing apparatuses, the quality of labels that can be formed by printing directly on three-dimensional articles is not as good as that formed on separately printed flat labels. Further, such printing processes may only be able to accurately jet ink short distances (e.g., several millimeters) from the print head. Therefore, if the article has surface features that differ in height or depth by more than such short distances, the ink jetted by an ink jet print head will not be accurately applied, leading to defects in print quality.

Other processes for applying ink to three-dimensional articles are transfer processes. In these processes, ink is first applied to a transfer surface, and then the image is transferred from the transfer surface to the article. Current transfer processes may suffer from the disadvantage that they are not well suited to transfer the image from the transfer surface to articles with complex three-dimensional shapes and/or which have surface features that differ in height (or depth) by more than a limited extent.

A need exists for improved apparatuses and transfer methods for applying a transfer material, such as printing, decorations, or other substances onto three-dimensional articles.

SUMMARY

The present invention is directed to apparatuses and methods for applying a transfer material onto the surface of an article, including apparatuses and methods (or processes) of transfer printing onto and/or decorating three-dimensional articles, as well as the articles having the transfer material thereon and/or which are decorated thereby.

In some cases, the processes comprise:
providing at least one three-dimensional article which has a surface;
providing a deposition device;
providing a transfer component with initial dimensions, a surface, and an initial configuration;
depositing at least one material onto a portion of the surface of the transfer component with the deposition device to form a transfer material on said transfer component;
modifying the initial dimensions and/or initial configuration of the portion of the transfer component with the transfer material thereon to conform the transfer component to at least a portion of the surface of the three-dimensional article; and
transferring the transfer material onto the surface of the article.

In some cases, the transfer component may be continuous. In other cases, the transfer component may be a discrete element (that is, non-continuous). There can be variations in the step of modifying the portion of the transfer component with the transfer material thereon. In some cases, the portion of the transfer component that is modified may have two surfaces, both of which are deformed (e.g., deflected) during the modification step. The portion of the transfer component with the transfer material thereon may be modified in various different sequences relative to contacting the article (or being contacted by the article), including: prior to contact with the article; simultaneously to contact with the article; after initial contact with the article; and, combinations thereof. Several different types of mechanisms can be used to modify the transfer component. These include, but are not limited to: (1) conforming components with a cavity therein; (2) mechanisms in which a portion of the transfer component spans between spaced apart constraining components that constrain the transfer component in one or more directions, and the article is pushed into the span of the transfer component (or the span of the transfer component is pulled onto the article); (3) embodiments in which the transfer component may be brought into contact with the surface of the article by passing the transfer component through a nip that is formed by the surface of the article and a shaped die; and, (4) embodiments which use vacuum, air jets, fluid jets, and the like, or combinations thereof, to bring the transfer component into contact with, or in closer contact with, the surface of the article.

In some cases, the three-dimensional article has a surface comprising two or more portions that each have a different radius of curvature. These two or more portions may comprise a first portion having a first radius of curvature and a second portion having a second radius of curvature, wherein the second radius of curvature is less than the first radius of curvature. In such cases, it may be desirable for contact between the transfer component with the transfer material thereon and the surface of the article to initially occur at the second portion of the article with the lesser radius of curvature (such that it serves an "initial contact portion"), and then at the first portion of the article to assist and/or improve the process of conforming the transfer material to the surface of the article.

The apparatus for carrying out the process may comprise one or more functional devices at one or more stations for performing a function. The function(s) can be performed on the articles directly, or on the transfer component to create the transfer material that is transferred to the surface of the articles. The functional devices may include, but are not limited to: one or more deposition devices; optional devices such as adhesive deposition devices; devices for treating articles (e.g., devices for treating the surface of articles, or for curing substances applied to the articles); devices for decorating articles (e.g., application of a metal foil); devices for transforming a property of an article (e.g., laser); or combinations thereof.

In some embodiments, the deposition device may comprise a printer such as an inkjet printer having an inkjet print head. If there are multiple deposition devices, one or more can comprise inkjet printers and other deposition device(s) can comprise other types of deposition devices. Alternatively, all of the deposition devices can comprise inkjet printers. In some cases, the transfer material may comprise a UV curable ink and/or adhesive. When the transfer material is UV curable, the transfer component may be at least partially or substantially permeable to UV radiation to allow curing of the ink and/or adhesive therethrough. Improved UV curable adhesives comprising thiol-acrylate and thiol-ene acrylate inkjet-able adhesives are disclosed. In such cases, the process may further comprise providing a source of UV radiation, wherein said source of UV radiation is positioned so that the transfer component is disposed between the source of UV radiation and the UV curable composition, and at least partially curing the UV curable composition with the source of UV radiation through the transfer component. In such embodiments, the curing can take place during the time period between when the article and the transfer material make contact up until the transfer material is transferred from the transfer component onto the surface of the article. The steps of the processes described herein can take place in any suitable order.

The articles having the transfer material thereon and/or which are decorated by the processes can comprise any suitable three-dimensional articles. In some cases, the articles may be plastic containers comprising a hollow container having an interior, an exterior surface, a top portion, a bottom portion, a front, a back, and sides. (Any description relating to the container herein may also apply to other types of articles.) The hollow container may be preformed in that it is formed prior to applying the transfer material thereto. The exterior surface comprises two or more portions that each have a radius of curvature. At least two of the two or more portions may be at least partially separated by an intermediate portion that has a lesser radius of curvature than the two portions. In some cases, at least two of the top portion, bottom portion, front, back, and sides of the article may have different configurations. The transfer material may be applied onto and positioned on top of at least a portion of the surface of the article without penetrating into its surface. The transfer material may extend continuously across at least parts of said two portions and the intermediate portion. The transfer material may be preformed (such as with ink cured and dried) and transferred to the desired portion(s) (such as the two portions and the intermediate portion) of the surface of the article. In some cases, at least two or more portions and the intermediate portion are all located on one of the top portion, bottom portion, front, back, or a side of the container, and the intermediate portion is a feature on said exterior surface that has a lesser radius of curvature than the two or more portions. The feature may protrude outward from the exterior surface. Alternatively, the feature may be recessed into the exterior surface. In other cases, the at least two or more portions are located on different portions or locations on the surface including the top portion, a bottom portion, a front, a back, and sides of the container, and the intermediate portion comprises an edge between the two or more portions. In one non-limiting example, the transfer material may wrap around the front or back of the article and at least one of the sides or the bottom portion of the article. This can provide a transfer material that wraps two or more sides of the article (that is, a multi-sided wrap). In some cases, this can provide the transfer material with a cleaner appearance without the visible edges typically seen on the front or back of articles which have heat transfer labels applied thereto. The transfer material can be transferred without a carrier remaining on the article after transfer material is applied to the surface of the article.

Any of the embodiments described in this specification may be combined, or provided with any of the features of any other embodiment described herein in any suitable combinations. All percentages of ingredients in the compositions described throughout this specification are by weight, unless otherwise specified. The terms "standard conditions" or "standard temperature", as used herein, refer to a temperature of 77° F. (25° C.) and 50% relative humidity.

BRIEF DESCRIPTION OF THE DRAWINGS

FIG. 3 is a schematic side view of a transfer component having a composite transfer material thereon.

Figure 1A:
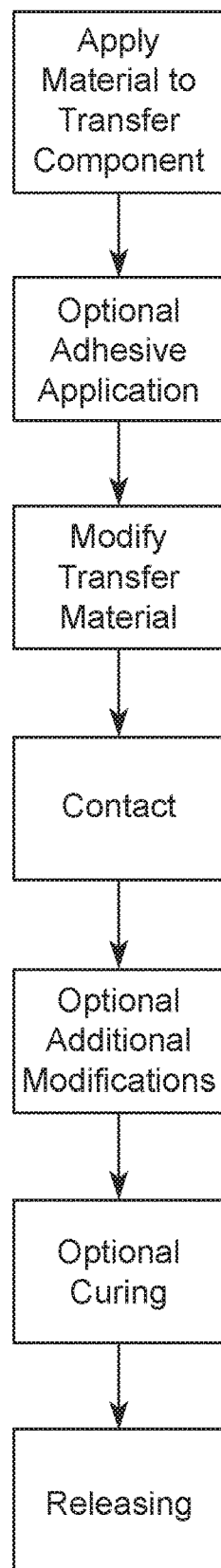
FIG. 1A is a flow chart showing one category of processes for applying a transfer material onto an article using a transfer process.

The embodiments of the method, apparatus(es), and articles shown in the drawings are illustrative in nature and are not intended to be limiting of the invention defined by the claims. Moreover, the features of the invention will be more fully apparent and understood in view of the detailed description.

DETAILED DESCRIPTION

I. Introduction.

The present invention is directed to apparatuses and methods for applying a transfer material onto the surface of an article, including apparatuses and methods of transfer printing onto and/or decorating three-dimensional articles, as well as the articles having the transfer material thereon and/or are decorated thereby. The term "process" may be used herein interchangeably with the term "method".

FIG. 1A is a flow chart showing an example of one category of processes for applying a transfer material onto the surface of a three-dimensional article. As shown in FIG. 1A, the process comprises steps of: (1) applying a material to a transfer component (for example, by digitally printing an image onto a transfer component); (2) optionally applying an adhesive to the material (such as the image) wherein the material and any optional adhesive comprise a transfer material; (3) modifying a portion of the transfer component containing the transfer material as well as the transfer material (such as by stretching the same); (4) contacting the surface of the article with the transfer material using the transfer component (by moving at least one of the article or transfer component toward the other); (5) optionally performing an additional physical modification on the transfer component (and transfer material thereon) such as by vacuum, air jets, fluid jets or combinations thereof to bring the transfer component into closer contact with the surface of the article; (6) optionally curing the adhesive; and (7) releasing the transfer component from (indirect contact with) the surface of the article, transferring custody of the transfer material from the transfer component to the article.

The term "transfer material", as used herein, will be used to describe the material that is transferred from the transfer component to the surface of the article. This term is inclusive of a material alone, or a combination of a material, any adhesive thereon, or other material(s) joined thereto that will be transferred to the surface of the article. If the transfer material comprises a combination of materials, it may be referred to herein as the "composite transfer structure". The term "substance" may be used interchangeably with the term "material" herein with reference to the material(s) that are deposited on the transfer component (and which will form all or part of the transfer material). Typically, a discrete or separate transfer material will be transferred to each article 10.

Figure 1B:
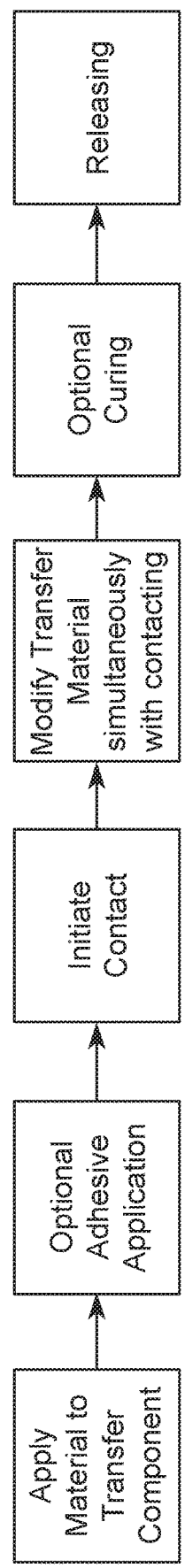
FIG. 1B is a flow chart showing a second category of processes for applying a transfer material onto an article using a transfer process in which at least some of the steps of contacting the article and modifying the transfer material occur simultaneously.

FIG. 1B is a flow chart showing an example of a second category of processes for applying a transfer material onto the surface of a three-dimensional article. As shown in FIG. 1B, in this category of processes, at least some portions of the modifying and contacting steps can occur simultaneously. More specifically, the three-dimensional article may be brought into contact with the transfer component, and the transfer component with the transfer material thereon may be modified simultaneously with the step of contacting. In such a case, for example, the transfer component may be a web which is held in tension, and the three-dimensional article may be forced into contact with the web to conform the web to the surface of the article. The term "conform", as used throughout this Detailed Description, does not require exact conformity, and includes partial conformity. There can, however, be aspects of the step of modifying the image that are not necessarily simultaneous. For example, some aspects of modifying the portion of the transfer components with transfer material thereon may take place before the contacting the article, and then additional modification of the transfer components with transfer material thereon may take place simultaneously with or after contacting the article. For instance, the initial modification of the transfer component with the transfer material may occur through simultaneous contact. This can be followed by a supplementary modification (e.g., positive pressure air or vacuum) that may be subsequent to the initial contact rather than simultaneous. Such a subsequent modification could be performed prior to any optional curing and releasing. In other embodiments, the order of the modifying and contacting steps can be reversed. For example, the article may contact the transfer component, at least for a period of time, before any modification occurs. Thereafter, the article may be forced into contact with the web to conform the web to the surface of the article.

Figure 1C:
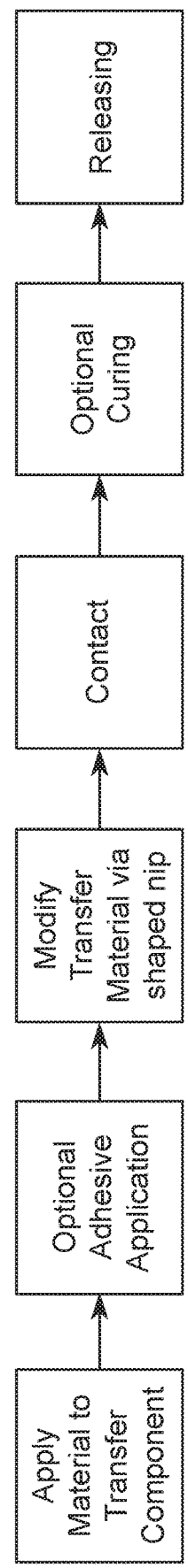
FIG. 1C is a flow chart showing a third category of processes for applying a transfer material onto an article using a transfer process in which the transfer material is modified using a shaped nip.

FIG. 1C is a flow chart showing one example of a third category of processes for applying a transfer material onto the surface of a three-dimensional article. As shown in FIG. 1C, the transfer component 24 may be brought into contact with the surface of the articles 10 by passing the transfer component through a nip that is formed by the surface of the article and a shaped die.

Numerous variations of the order of steps of these processes, as well as mechanisms to carry out the processes, are possible. The order in which the steps take place can be varied, and/or the steps and/or portions of the different processes may be combined in any suitable manner. In addition, any other suitable steps could be added to any of these processes. Suitable additional steps include, but are not limited to: applying a release coating to the transfer component prior to depositing a transfer material thereon; treating the surface of articles, or curing materials applied to the articles; decorating the articles (e.g., by the application of a metal material); transforming a property of an article (e.g., by laser); or combinations thereof. In addition, if a reusable transfer component is used, the processes may further comprise a step of cleaning the transfer component after the releasing step. Such additional steps can be added, as appropriate, to either the front end and/or the back end of the processes of the categories shown in FIGS. 1A-1C, and/or at any suitable place between any of the steps shown therein.

II. First Category of Processes.

Figure 2:
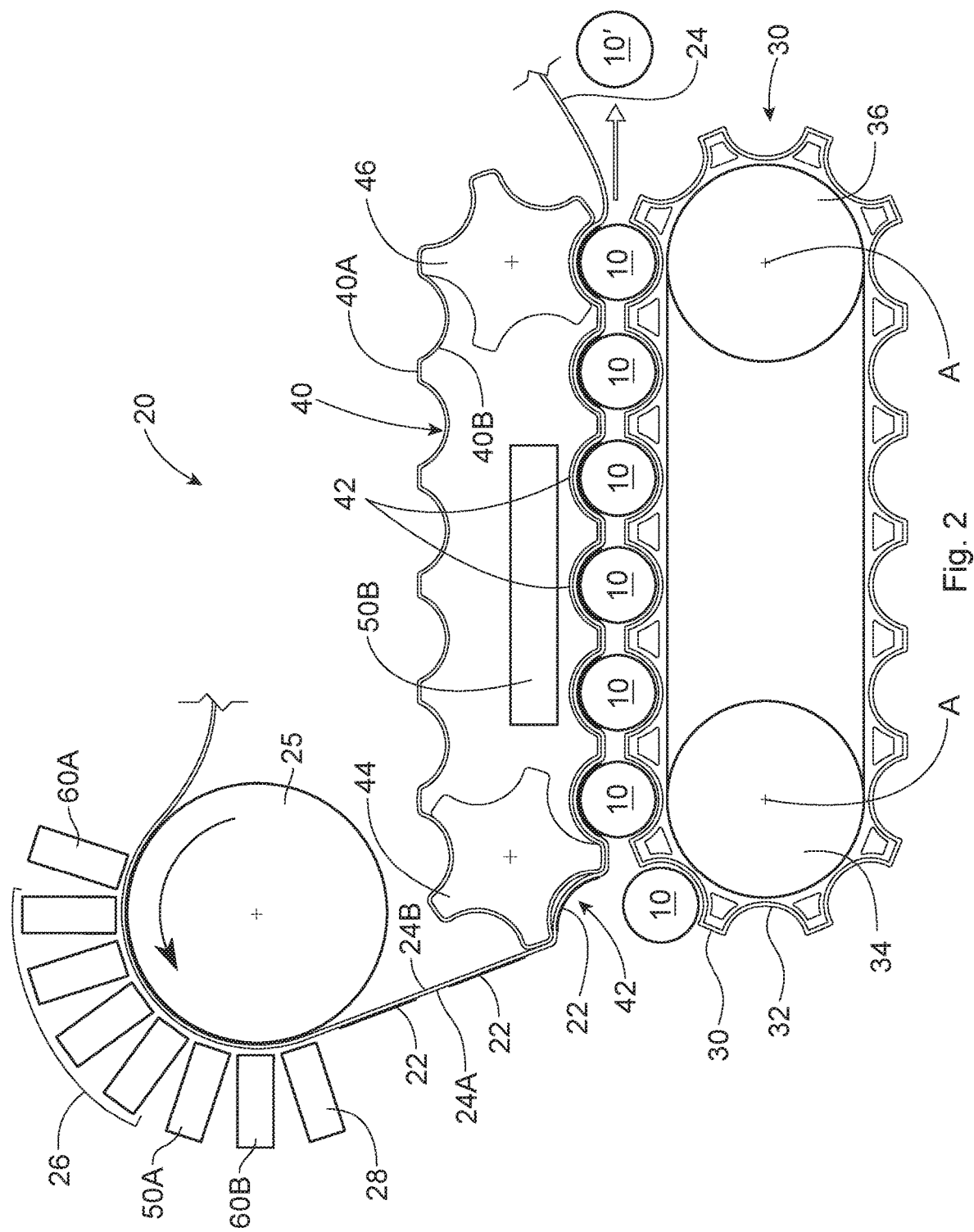
FIG. 2 is a schematic top view of one embodiment of an apparatus for applying a transfer material onto an article using a transfer process.

FIG. 2 shows one non-limiting embodiment of an apparatus 20 for applying a transfer material 22 onto the surface of at least one article 10. The embodiment shown in FIG. 2 can be considered to be an example of the first category of process shown in the flow chart of FIG. 1A.

As shown in FIG. 2, the apparatus 20 comprises a transfer component 24, a component providing a support surface for supporting the transfer component while printing such as cylinder 25, one or more deposition devices 26, an optional adhesive deposition device 28, a conveyor 30, a conforming component 40, one or more optional energy sources (which may be designated generally by reference number 50, or more specifically as) 50A and 50B, and one or more optional decoration stations 60A and 60B. The decoration stations (which may be designated generally by reference number 60, or more specifically as) 60A and 60B can apply any suitable material to the transfer component or material thereon, including metallic material.

The apparatus 20 can be used to apply a transfer material 22 on numerous different types of three-dimensional articles 10. Such articles include, but are not limited to: containers or packages such as bottles, boxes, cans, and cartons; consumer products including, but not limited to pods, laundry dosing balls, razors; components of consumer products such as razor blade heads and handles; sprayer triggers; tubs; tubes including, but not limited to tampon tubes; and deodorant stick containers. The articles may include primary packages for consumer products, including disposable consumer products. Additional articles include components of containers or packages including, but are not limited to: bottle caps, closures, and bottle pre-forms that are subsequently blown into the form of a finished bottle.

The apparatus 20 can be used to apply material to empty containers, partially filled, or full containers including closed and open containers. The method and apparatus 20 can be used to apply material (e.g., decorate) the containers, the closures, or both (separately or simultaneously). The containers can have a rigid, flexi-resilient, or flexible structure in whole or in part. In some cases in which the articles are flexible and have an interior which is empty (such as in the case of some bottles), it may be desirable to blow air or other gas into the interior of the article in order to pressurize the article, above atmospheric pressure, so that the surface of the article does not yield excessively during the transfer process described herein. For example, at least a portion of the surface of the article to which a substance is to be applied is flexible, wherein the interior of the article, which is hollow or partially hollow, is pressurized prior to transferring the substance onto the surface of said article with the result that the portion of the surface of the article to which a substance is to be applied is less flexible while being pressurized. Containers such as bottles can be made by any suitable method including, but not limited to blow molding. Such containers may have a threaded opening, an opening configured to accept a snap-on closure, or any other suitable type of opening. The closures can be made by any suitable method including, but not limited to injection molding. Such containers may be capped or uncapped with a closure when the material is applied. In some embodiments, the material is applied to the container after the container is filled and has a closure applied thereto. In one exemplary process, the container is a blow molded container and the closure is an injection molded closure, and the container is filled with a fluent material and has the closure applied thereto. In such a process, the transfer material may be applied to the container and/or closure at the end of a bottling line.

The articles can be made of any suitable material, including but not limited to: plastic, metal, and/or cardboard. If the articles are made of plastic, they can be made of any suitable plastic. Suitable plastics for bottles, for example, may include, but are not limited to: polypropylene, polyethylene terephthalate (PET), high density polyethylene (HDPE), and low density polyethylene (LDPE).

The articles 10 will typically have at least two opposing ends. For example, a bottle will have a base and a top. The articles 10 may also have a front, a back, and sides. The articles 10 will also have a surface 12. The articles 10 may be solid as in the case of some razor blade handles, or hollow or partially hollow in the case of bottles, for example. The surface of the articles 10 may be flat (planar) or curved. The entire surface need not be either flat or curved. For example, the surface of the articles 10 may have: portions that are flat; portions that are curved; or, the surface may have both flat portions and curved portions. For instance, in the case of bottles, at least a portion of the surface may have a convex curvature. It is also possible that some articles may have a surface in which at least a portion thereof has a concave curvature.

Figure 26:
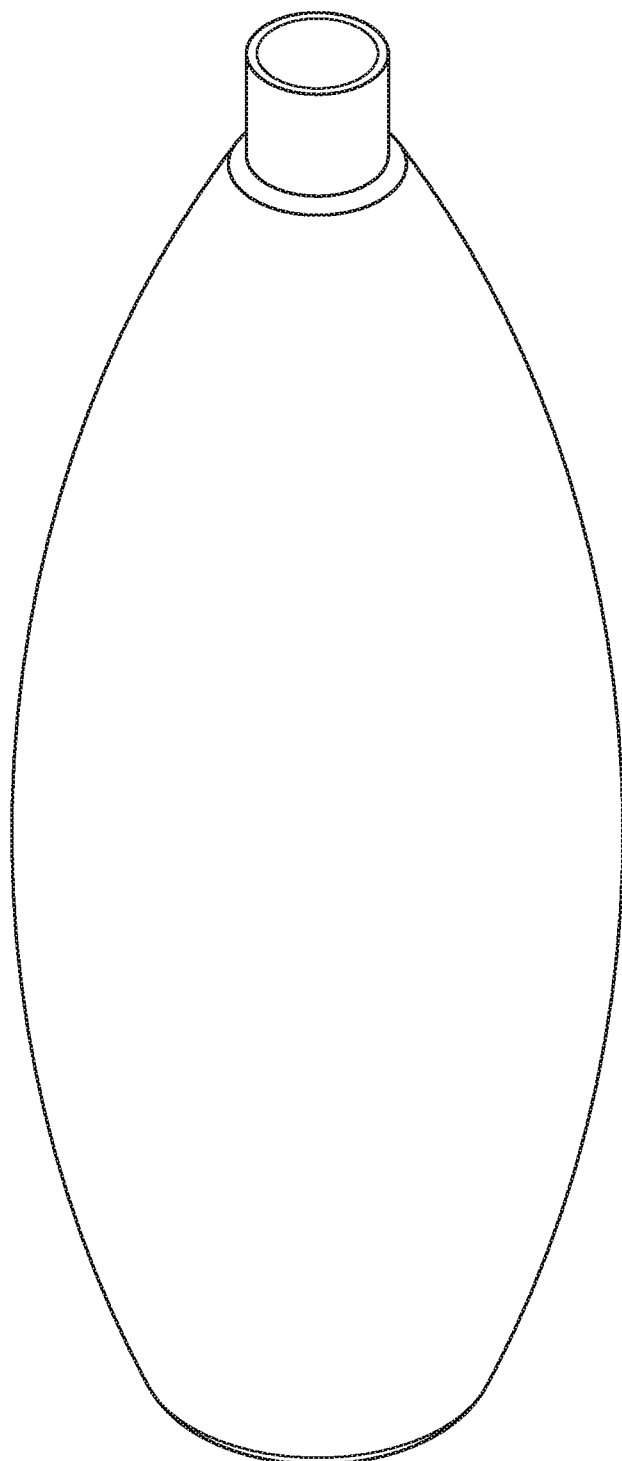
FIG. 26 is a perspective view of a bottle having a Gaussian curvature.
Figure 26A:
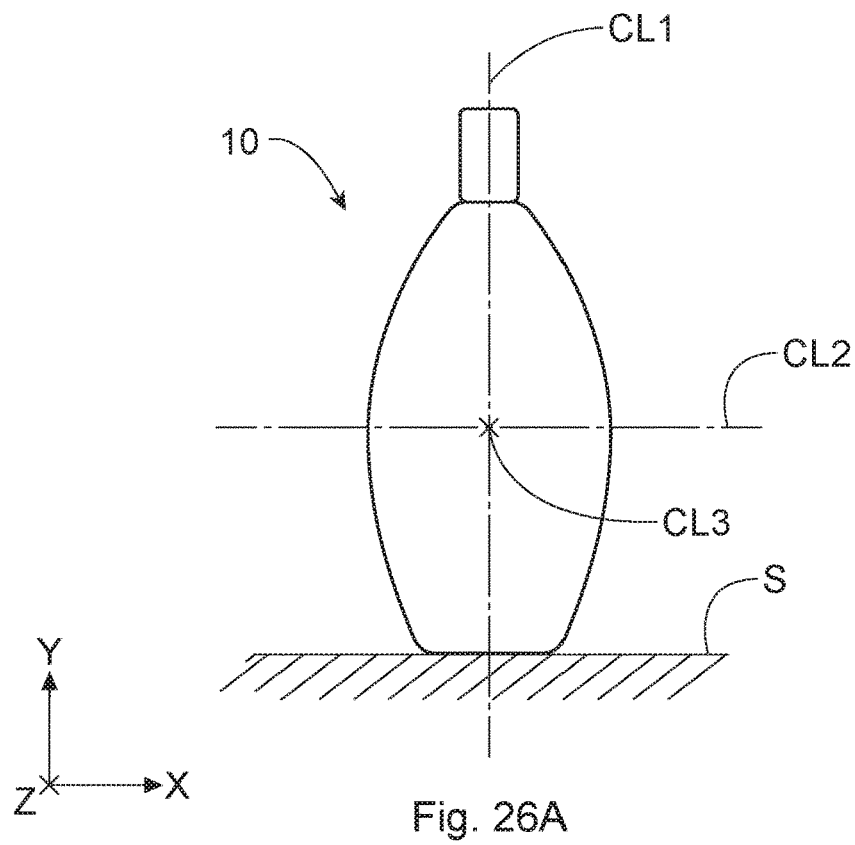
FIG. 26A is a front view of the bottle shown in FIG. 26 resting on a horizontal surface.
Figure 26B:
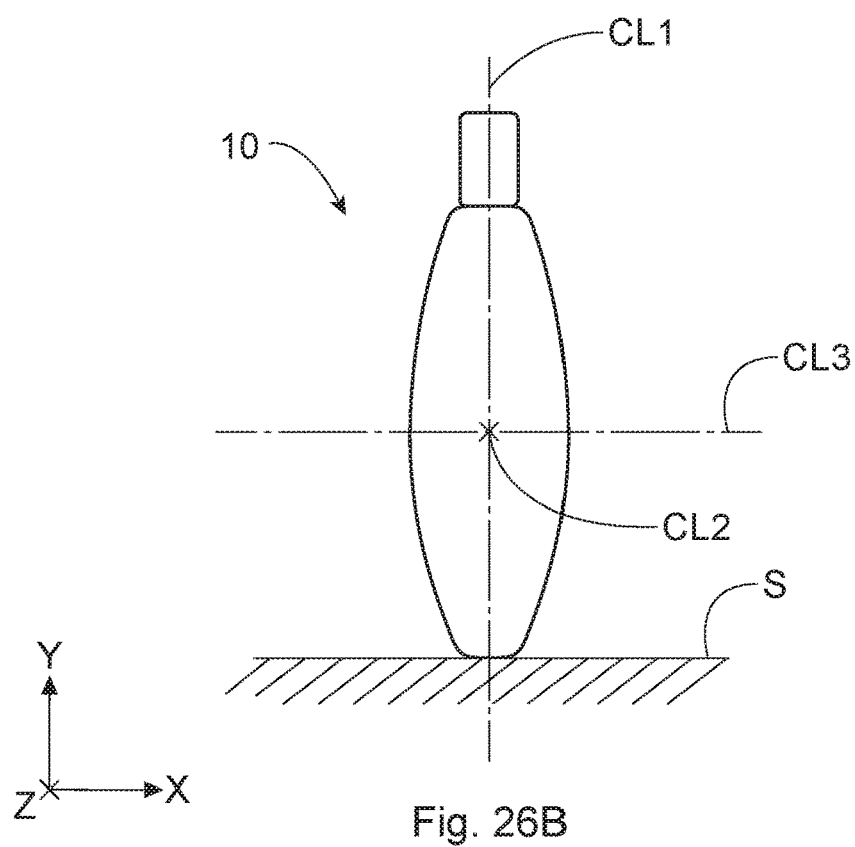
FIG. 26B is a side view of the bottle shown in FIG. 26 resting on a horizontal surface.

The articles 10 can be described using a coordinate system, as shown in FIGS. 26A and 26B. The coordinate system is a three-dimensional Cartesian coordinate system with an X-axis, a Y-axis, and a Z-axis, wherein each axis is perpendicular to the other axes, and any two of the axes define a plane. In some cases, the articles (such as containers) are designed to rest on a horizontal support surface S. As shown in FIGS. 26A and 26B, the X-axis and the Z-axis are parallel with the horizontal support surface S and the Y-axis is perpendicular to the horizontal support surface S. (It should be understood that other types of articles may be described by such a coordinate system, but such articles may have other orientations with respect to a horizontal support surface. For example, certain articles (such as razor blade handles) may have a longest dimension or length that can be considered to extend in the longitudinal direction even though such an article is not capable of standing upright with the longitudinal dimension in a vertical orientation.)

FIGS. 26A and 26B also show other lines of reference (such as centerlines), for referring to directions and locations with respect to the article such as container 10. The term "longitudinal" refers to a direction, orientation, or measurement that is parallel to the longitudinal centerline CL1 of the article 10. As used herein in the case of containers, the term "longitudinal" refers to a direction, orientation, or measurement that is parallel to a longitudinal centerline of a container, when the container is standing upright on a horizontal support surface, as described herein. In the case of containers, the longitudinal centerline CL1 runs parallel to the Y-axis. When expressed in relation to a horizontal support surface for a container, a longitudinal measurement may also be referred to as a "height", measured above the horizontal support surface. In the case of a container resting on a horizontal support surface the longitudinal orientation may also be referred to a vertical orientation.

A lateral centerline CL2 runs parallel to the X-axis. As used herein, the term "lateral" refers to a direction, orientation, or measurement that is parallel to a lateral centerline of a container, when the container is standing upright on a horizontal support surface, as described herein. In the case of a container resting on a horizontal support surface S, a lateral orientation may also be referred to a "horizontal" orientation, and a lateral measurement may also be referred to as a "width." As shown in FIG. 26B, an XY plane at the lateral centerline CL2 separates the article 10 into a front and a back (e.g., a half and a back half). An XZ plane at the lateral centerline CL2 separates the article 10 into an upper portion and a lower portion (e.g., an upper half and a lower half). As shown in FIG. 26A, a YZ plane at the longitudinal centerline CL1 separates the article 10 into a left portion and a right portion (e.g., a left half and a right half). A third centerline CL3 runs parallel to the Z-axis. The longitudinal centerline CL1, the lateral centerline CL2, and the third centerline CL3 all intersect at a center of the article 10.

In some embodiments, it may be desirable that the method be used to apply the transfer material 22 to non-cylindrical three-dimensional articles, and thus on surfaces of articles that do not form part of a cylindrical object. In such cases, one or more of the front, back and sides may have different configurations. Such surfaces may as a result, be more complex (and difficult to apply transfer materials to) than cylindrical surfaces. In some embodiments, it may be desirable to apply a transfer material onto articles that have non-ruled surfaces. A non-ruled surface can be described as one that has a Gaussian curvature that is not equal to zero (e.g., FIG. 26). In some cases, the article may have an exterior surface having a portion that has simultaneous radii of curvature in two or more planes wherein the absolute value of the Gaussian curvature of said portion is greater than or equal to 43 $m^{-2}$. In some cases, the absolute value of the Gaussian curvature of such a portion is greater than or equal to 172 $m^{-2}$. In some embodiments, the method may be used to apply a transfer material onto the surface of articles that have complex curvatures in which the surface comprises regions with curves that have more than one radius of curvature. The surface of the article may also have more than one axis of curvature (aside from any changes in curvature such as that which are present on a cylindrical article where the curved sides of the cylinder transition into the top and bottom of the article). The terms "axis of curvature" or "axes of curvature", as used herein, refer to an axis that passes through the center of a curve (that is, the center point from which the radii of the curve extend) which is perpendicular (orthogonal) to the plane in which the radius of the curve is measured.

In some embodiments, the three-dimensional article has a surface comprising two or more portions that each have a different radius of curvature. These two or more portions may comprise a first portion having a first radius of curvature and a second portion having a second radius of curvature, wherein the second radius of curvature is less than the first radius of curvature. In such cases, it may be desirable for contact between the transfer component with the transfer material thereon and the surface of the article to initially occur at the second portion of the article with the lesser radius of curvature, and then at the first portion of the article. In such cases, it may be desirable for the radius of curvature of the second portion to be greater than zero. The first and second portions with the first and second radii of curvature, respectively can be in any suitable location and orientation on the article. In some cases, the first and second portions are both located on one of the top portion, bottom portion, front, back, or a side of an article such as a container. The first and second portions may be adjacent, or spaced apart. In some cases, the first radius of curvature and the second radius of curvature may lie in a plane that is orthogonal to the longitudinal centerline of the article (e.g., and the Y axis of the article). In other cases, the first radius of curvature and the second radius of curvature may lie in a plane that is orthogonal to the lateral centerline of the article (e.g., and the X or Z axis of the article). The first and second portions can comprise portions of the surface of the article with any relative amounts of curvature. For example, in some cases, the second portion will typically have a radius of curvature that is less than the maximum radius of curvature of the surface. In other cases, the second portion can have a radius of curvature that is in the lowest 50% of all the radii of curvature on the surface. In still other cases, the second portion can have the lowest radius of curvature on the surface.

Figure 18A:
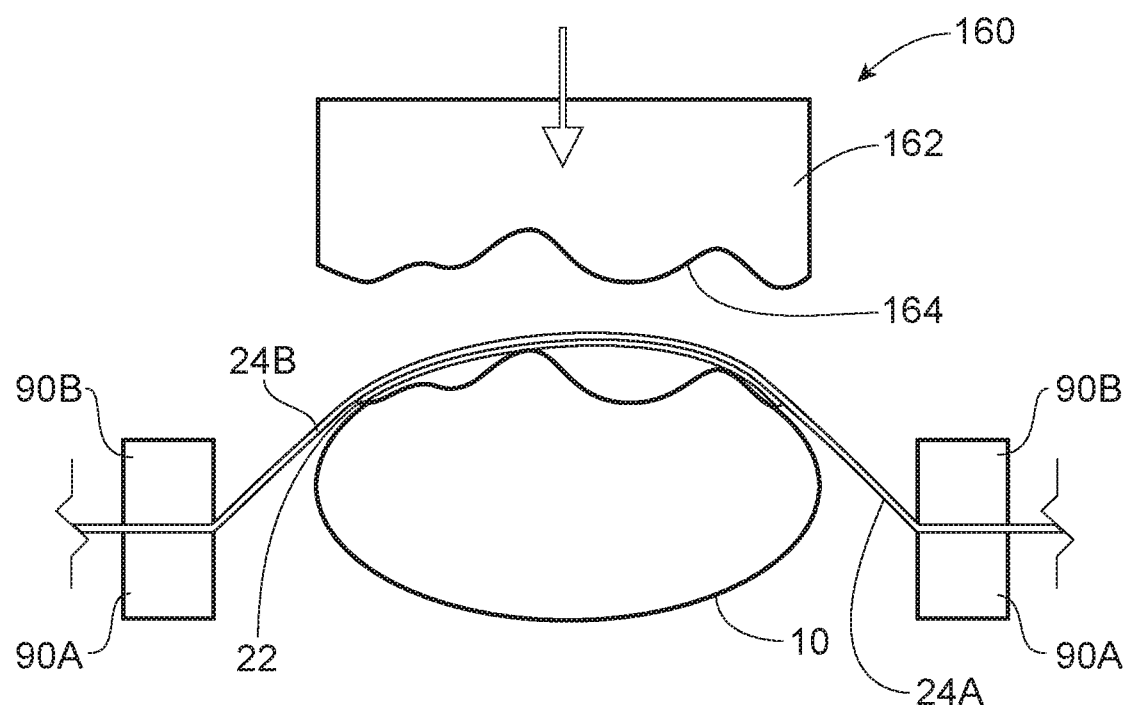
FIG. 18A is a schematic top view of a first step of an alternative embodiment that uses a shaped back-up element configured to further conform the transfer component and transfer material thereon to the shape of the article.
Figure 18B:
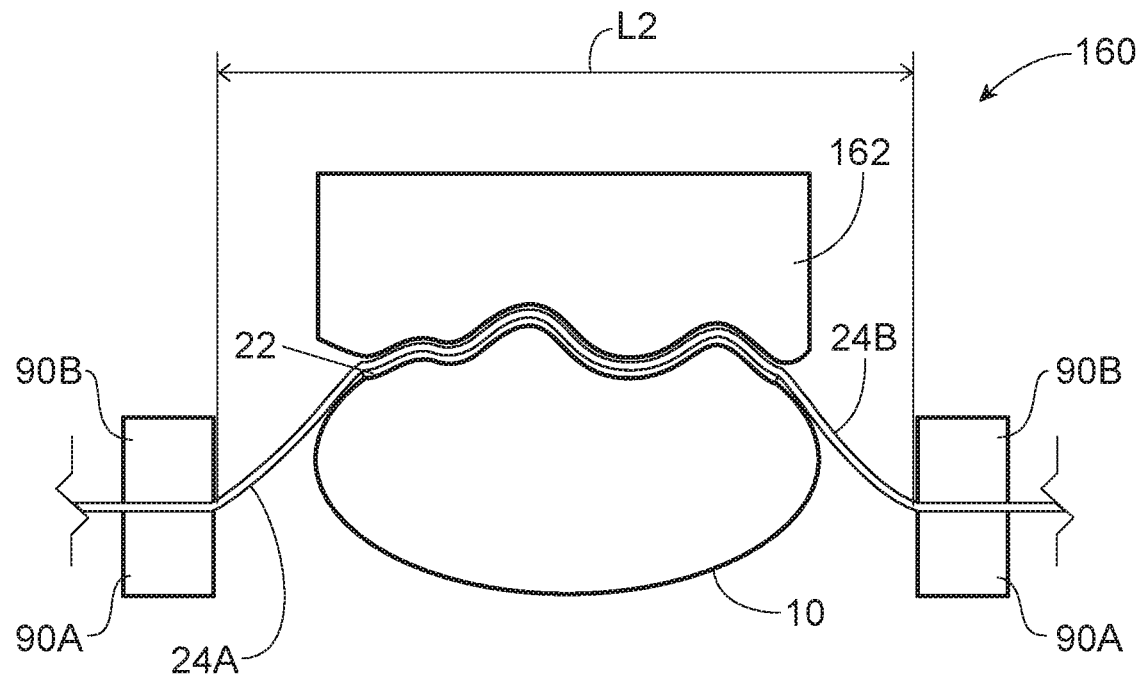
FIG. 18B is a schematic top view of a second step of using the shaped back-up element shown in FIG. 18A to further conform the transfer component and transfer material thereon to the shape of the article.

In some embodiments, the method may be used to apply a transfer material onto two or more portions of an article that each have a radius of curvature. At least two of the two or more portions may be at least partially separated by an intermediate portion that has a lesser radius of curvature than the two portions. (When it is said that the two or more portions may be "at least partially separated by" an intermediate portion, it is meant that the intermediate portion may extend the full length of the two or more portions and form a boundary therebetween; or, the intermediate portion may only extend a portion of the length between the two or more portions.) The two or more portions may have any suitable radius of curvature. The radius of curvature of the two or more portions may be the same as the other such portions, or different. Such radii of curvature of the two or more portions may range from a radius that is greater than that of the intermediate portion up to an infinite radius of curvature in the case of a flat portion of the exterior surface (or any range therebetween). Suitable radii of curvature for the intermediate portion are described below. In some cases, the two or more portions and the intermediate portion are all located on one of the top portion, bottom portion, front, back, or a side of an article such as a container, and the intermediate portion is a feature on said exterior surface that has a lesser radius of curvature than the two or more portions. The feature comprising the intermediate portion may protrude outward from the exterior surface of the article. Alternatively, the feature may be recessed into the exterior surface of the article. These features can have any suitable configurations. An example of a feature that protrudes outward from the exterior surface is a ridge. An example of a feature that is recessed into the exterior surface is a groove. Non-limiting examples of an article having such features are shown in FIGS. 18A and 18B. Of course, any given article can have more than one feature as described herein. Any given article can also have more than two portions with an intermediate portion therebetween that have a transfer material thereon as described herein. The same applies to the following types of cases.

Figure 27:
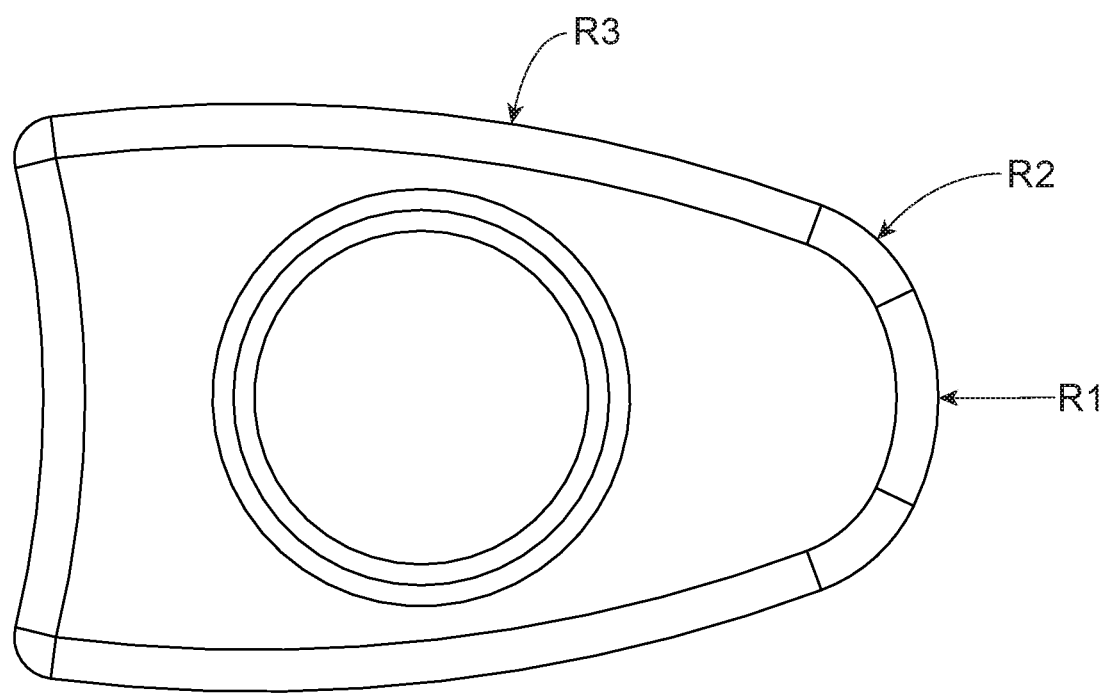
FIG. 27 is a schematic top view of an article such as a bottle where the sides of the article have a portion therebetween (an intermediate portion or connector) that has a lesser radius of curvature than the adjacent portions of the sides of the article.

In other cases, the at least two or more portions are located on different portions or locations on the surface including of the top portion, a bottom portion, a front, a back, and sides of the article, and the intermediate portion comprises an edge between the two or more portions. The apparatuses and methods described herein may, thus, be used to provide a transfer material which wraps around at least portions of two or more sides of an article (including but not limited to portions of three sides) to provide a multi-sided application of the transfer material. The transfer material may, thus, provide a continuous image on at least portions of two or more sides of an article wherein the sides of an article have a portion of the article therebetween (an intermediate portion or connector) that has a lesser radius of curvature than the portions of the sides of the article. This is shown schematically in FIG. 27. Thus, in the non-limiting example shown in FIG. 27, the intermediate portion has a radius of curvature R2 that is less than both R1 and R3. The two or more portions with radii R1 and R3 may have any suitable radius of curvature. Such radii of curvature may range from a radius that is greater than that of the intermediate portion up to an infinite radius of curvature in the case of a flat portion of the exterior surface (or any range therebetween). It should be understood that when the intermediate portion is described as having a lesser radius of curvature, the intermediate portion can have any suitable radius of curvature. Suitable radii of curvature for the intermediate portion described herein may range from greater than or equal to zero, or greater than zero to less than or equal to about any of the following: 60 mm, 40 mm, 20 mm, 15 mm, 10 mm, 5 mm, 2 mm, 1 mm, or 0.1 mm. The radius could be zero if the sides shown as being associated with radii R1 and R3 met at a right angle that was defined by a sharp, non-rounded edge. The transfer material can be wrapped around any two or more faces of the article. For instance, the transfer material can be wrapped around the front and/or back of the article and at least one of the sides or the bottom portion of the article. This can also provide the transfer material with a cleaner appearance without the visible edges typically seen on the front or back of articles which have heat transfer labels applied thereto.

The transfer component 24 may be any suitable component that is capable of receiving one or more materials that are deposited on the transfer component 24 to form a transfer material 22 and then transferring the transfer material 22 to the surface of an article 10. The transfer component 24 can comprise one or more discrete components having the properties described herein wherein each discrete component receives a single transfer material deposit for application to a single article 10. In other cases, the transfer component 24 can comprise a continuous component. The term "continuous", as used herein, refers to a transfer component that receives two or more transfer material deposits for application to different articles. Typically, a continuous transfer component 24 will be capable of receiving a plurality of transfer material deposits for application to different articles. A continuous transfer component 24 will typically have a machine direction length that is greater than the dimension of the article to which the transfer material 22 is to be transferred. Continuous transfer components can be in a number of different forms. For example, a continuous transfer component 24 can be in the form of a web that is unwound from a supply roll, and after use, rewound on a take-up roll. In other cases, the continuous transfer component 24 can be in the form of an endless (that is, a closed loop) belt. FIG. 2 shows a fragmented continuous transfer component 24 that could be in either of these forms. In some cases, more than one transfer component 24 may be used in the process.

The transfer component 24 may be a single use component such that once a transfer material 22 is transferred from the transfer component 24 to an article 10, the same portion of the transfer component that contained the transfer material is not used to transfer another transfer material to another article. In such a case, the transfer component 24 may be disposable after use, or recycled in an environmentally compatible manner. In other cases, the transfer component 24 may be reusable so that the same portion of the transfer component 24 may be used to receive and transfer more than one transfer material to different articles. When the transfer component 24 is reusable, it may be desirable to clean the transfer component 24 between the transfer of one transfer material 22 and the receipt of another transfer material 22 thereon. Therefore, the transfer component 24 may pass through a cleaning station after the transfer component 24 releases from the transfer material.

The transfer component 24 may have any suitable properties. The properties will often depend on the type of transfer component. For example, if the transfer component 24 is in the form of a pad or a roll, the transfer component 24 may have a surface, at least a portion of which is compressible so that it may conform to the surface of the article 10. In other cases, it may be desirable for the transfer component 24 to be substantially incompressible under the forces associated with carrying out the method described herein. If the transfer component 24 is in the form of a web or in the form of a belt, the web or belt will typically have two opposing surfaces that define a thickness therebetween. These surfaces may be referred to as a front or "transfer surface" 24A and a back surface 24B. In some cases, it may be desirable for the web or belt to be relatively thin and/or flexible so that it may conform to the surface 12 of the article 10 without the need to compress the surface of the transfer component 24 so that the thickness of the transfer component 24 changes substantially. In such a case, both surfaces 24A and 24B of the transfer component 24 may flex in a similar manner when the transfer component 24 and the article 10 are brought into contact with each other.

In some cases, a transfer component 24 in the form of a web or belt may have at least some portions that are unsupported (that is, span without any backing) between the transfer material receiving areas on the surface of the same. This characteristic of a transfer component 24 in the form of a web or belt is one of the ways such a web or belt transfer component is distinguishable from offset blankets that are mounted on cylinders.

The transfer component 24, whether discrete or continuous, may also be extensible in at least one direction. For example, the transfer component 24 may be extensible in one direction and in a direction perpendicular thereto in the plane of the surfaces of the transfer component 24. A continuous transfer component 24 that moves during the process will have a machine direction (MD) oriented in the direction of movement and a cross-machine direction (CD) perpendicular to the machine direction in the plane of the surfaces of the transfer component. The continuous transfer component 24 can be extensible in the machine direction and/or the cross-machine direction. In some cases, the transfer component 24 may be omni-direction extensible (extensible in all directions in the plane of the surfaces of the transfer component). In some cases, the transfer component 24 may be extensible in one direction, but due to the Poisson effect (for example), may contract in another direction (such as in a direction perpendicular to the direction in which it is extended) in the plane of the surfaces of the transfer component.

If the transfer component 24 is extensible, it may be extensible in any suitable amount under the forces associated with conforming the transfer component to the surface of the articles 10 during the process described herein. As shown, for example, in FIGS. 10A, 10B, 18A, and 18B, at least a portion of the transfer component 24 with the transfer material 22 thereon may have a first initial length L1 measured along its surface 24A before it contacts and conforms to the desired portion of the surface 12 of an article 10. As shown in FIGS. 10B and 18B, the transfer component 24 with the transfer material 22 thereon may have a second length L2 after it contacts and conforms to the desired portion of the surface 12 of an article 10. It should be understood that the first and second lengths L1 and L2 are measured following along the surface 24A of the transfer component 24, rather than the distance between two points (the dimension lines in the figures as shown merely for ease of illustration). The second length L2 may be greater than the initial length L1 when the transfer component 24 with the transfer material 22 thereon conforms to the surface curvature of a three-dimensional article. The transfer material 22 may undergo a similar change in length as that of the transfer component 24. These dimensional changes may occur in any of the embodiments described herein. In some cases, the transfer component 24 (or at least the portion thereof in contact with the surface of an article) may be extensible in amounts greater than about 0.01% up to the point of plastic deformation of the transfer component 24, or in some cases, may even approach, but not reach the point of ultimate failure of the transfer component 24. In some cases, the transfer component 24 (or at least the portion thereof in contact with the surface of an article) may be extensible so that it will be capable of increasing its dimension in at least one direction by between about 0.01% to about 500%, alternatively between about 0.01% to about 300%, or any narrower range therebetween. In some cases, it may be desirable for the transfer component 24 to be elastically extensible so that it will not only extend under force, but will return back to (or toward) its original dimensions after forces are removed. An elastically extensible transfer component 24 is useful in embodiments such as those shown in FIG. 2 when a reusable transfer component 24 is used and portions of the reusable transfer component 24 are deflected into a cavity. Such portions will be able to be deflected in more than one cycle of use.

In embodiments of the process that utilize a UV curable transfer material (decoration and/or adhesive), it is desirable that the transfer component 24 is at least partially or substantially permeable to UV radiation. Typically, in order to be permeable to UV radiation, the transfer component will comprise at least some transparent or translucent portion(s). Any suitable level of permeability that permits some curing of the UV curable material is possible. When the transfer component 24 is described herein as being "permeable" to UV radiation, either one or more portions, or all of the transfer component 24 may be permeable to UV radiation. Typically, at least those portions of the transfer component 24 that have a UV curable transfer material deposited thereon will be permeable to UV radiation. This will allow the curable transfer material to be cured by passing UV radiation through the UV permeable portions of the transfer component.

The transfer component 24 can be comprised of any suitable material. The material may depend on the type of transfer component, and whether it is desirable for the transfer component to be compressible or substantially incompressible. Suitable types of transfer components include, but are not limited to: films, belts, and discrete components. Some discrete transfer components can be comprised of film, and some can be comprised of a material similar to that used in belts. Film and discrete transfer components comprised of film may be made from materials that include, but are not limited to: polyethylene, polyester, polyethylene terephthalate (PET), and polypropylene. Belts and some discrete transfer components may be made from materials that include, but are not limited to: rubber, rubberized materials, polyurethanes, and felt. At least some of such materials may be low surface energy materials having a surface energy of less than or equal to about 45 dynes/cm. Some transfer components 24 made from films may be disposable. It may be desirable that some transfer components 24 in the form of belts may be reusable.

The transfer component 24 may be of any suitable thickness. If the transfer component 24 is in the form of a film, it may have a thickness falls within a range that is greater than about 0.1 mil (0.0001 inch or about 0.0025 mm) to less than or equal to about 0.2 inch (about 5 mm), alternatively less than or equal to about 0.125 inch (about 3.2 mm), alternatively less than or equal to about 0.08 inch (about 2 mm), alternatively less than or equal to about 0.06 inch (about 1.5 mm), or any narrower range therebetween. A disposable film may, for example, have a thickness in the range of from about 0.0001 inch (about 0.0025 mm) to about 0.001 inch (about 0.025 mm). It may be desirable for the transfer component 24 to have a thickness at the lower end of the range when the article 10 has significant surface features such as high levels of localized curvature, so that the transfer component 24 is better able to conform to the configuration of the surface of the article 10. In addition, it may be desirable for the transfer component 24 to have a greater thickness within the aforementioned range if it is reusable, than if it is disposable. If the transfer component 24 is in the form of a durable belt, for example, it may have a thickness in the range of from about 0.01 inches (about 0.25 mm) to about 0.06 inches (about 1.5 mm). In other cases, it may be desirable for a durable belt to have a thickness greater than 1.5 mm to offer some compressibility.

In some cases, the transfer component 24 may have limited compressibility in a direction normal to its surfaces 24A and 24B (that is, in the direction of its thickness). For example, in some cases, the transfer component 24 may compresses less than or equal to about 50%, 40%, 30%, 20%, or 10% of its uncompressed thickness under 20 psi pneumatic pressure applied normal to the surface of the transfer component 24. In some cases, the transfer component 24 may also be substantially incompressible. The transfer component 24 may, for example, be substantially incompressible when it is in the form of a film. When it is said that the transfer component 24 is substantially incompressible, it is meant that the transfer component 24 compresses less than or equal to about 5% of its uncompressed thickness under 20 psi (138 kPa) pneumatic pressure applied normal to the surface of the transfer component 24. In some cases, the transfer component 24 may compress less than or equal to about 1% of its uncompressed thickness under 20 psi pneumatic pressure applied normal to the surface of the transfer component 24.

The surface 24A of the transfer component 24 should be capable of receiving a deposit of a material thereon. For instance, if the material first deposited on the transfer component 24 is printing, the surface 24A of the transfer component may be described as a "print-receiving" surface. If desired, the surface 24A of the transfer component 24 may have an optional release coating thereon to facilitate transfer of the transfer material 22 to the article. Suitable release coatings include, but are not limited to oils and waxes including silicone oils and waxes. The release coating will typically be applied to the transfer component 24 before any materials are deposited on the transfer component 24. The release coating will typically remain on the transfer component 24 and will not comprise part of the transfer material 22 that is transferred to the article 10.

The material deposition devices ("deposition device(s)") 26 can deposit any suitable material (or substance) on the transfer component 24. The apparatus 20 can comprise any suitable number, arrangement, and type of deposition device(s) 26. For example, the apparatus may comprise between 1-20, or more, deposition device(s) 26. Thus, there may be a plurality of deposition devices 26.

The deposition device 26 may, in some cases be part of the apparatus 20 and process for transferring the transfer material 22 onto the articles 10 as shown in FIG. 2. In other words, the deposition device is "in-line" with the transfer process. In other embodiments, the deposition of the transfer material 22 onto the transfer component 24 can be performed using a separate apparatus and process from the process for transferring the transfer material 22 onto the surface of the article 10. For example, the material deposition portion of the process may be a separate process (such as a printing process) that is unconnected to the equipment used to transfer the transfer material 22 onto the surface of the article 10. That is, the printing of the substance may take place off-line. Thus, it is possible to deposit the transfer material 22 onto a transfer component 24 and to wind the transfer component with transfer material deposits thereon onto a roll. The roll of transfer component with transfer material deposits thereon can be brought into the process which transfers the transfer material from the roll onto the articles. In one embodiment, the application of the ink or decoration portion of the transfer material to the transfer component may take place off-line while the application of the adhesive portion takes place in-line.

The deposition devices can either be of a type that contacts the transfer component 24 directly or by indirectly applying pressure to the transfer component 24 through the material ("contacting"), or of a type that does not contact the transfer component 24 ("non-contacting"). For the purposes of this disclosure, spraying ink on a transfer component is considered to be non-contacting. The component 25 for supporting the transfer component 24 during material deposition can comprise any type of component that is capable of serving such a purpose. The component 25 providing the support surface may include, but not be limited to: a cylinder, a belt, or a static plate (e.g., an arcuate plate).

The deposition device 26 can be any suitable type of device including, but not limited to: offset printing systems, gravure printing systems, print heads, nozzles, and other types of material deposition devices. In the case of print heads, any suitable type of print heads can be used including, but not limited to piezo inkjet print heads, thermal inkjet print heads, electrostatic print heads and/or printing valve print heads. The print heads may be a drop-on-demand type of deposition device. By "drop-on-demand", it is meant that the print heads create droplets of ink at the nozzle only when needed such as to form a pattern in the form of words, figures or images (e.g., pictures), or designs. The print heads may also be "continuous" meaning drops are continuously formed at the nozzles, however only desired drops leave the print head to form the intended pattern. Ink jet print heads are typically digitally actuatable and can digitally print patterns provided by a computer. Thus, ink jet print heads are a form of a digital printing device that can digitally print material to produce the desired pattern on a portion of the transfer component 24.

Suitable materials or substances include, but are not limited to: inks (including UV-curable inks, water-based inks, and solvent-based inks), adhesives, varnishes, coatings, and lotions. The material can be deposited in any suitable form. Suitable forms include, but are not limited to: liquids; colloids including gels, emulsions, foams and sols; pastes; powders; and hot melts (the latter being solids that may be heated to flow). The material can be deposited in any suitable pattern. Suitable patterns can be regular, irregular, or random, and include, but are not limited to: words (text), figures, images, designs, an indicium, a texture, a functional coating, and combinations thereof.

Ink jet print heads will typically comprise multiple nozzles. The nozzles are typically generally aligned in rows and are configured to jet ink in a particular direction that is generally parallel to that of the other nozzles. The nozzles within each row on a print head 26 can be aligned linearly. Alternatively, the nozzles may be arranged in one or more rows that are oriented diagonally relative to the longer dimension (or length) of the print head. Both such arrangements of nozzles can be considered to be aligned substantially linearly. The inkjet print heads can comprise any suitable number and arrangement of nozzles therein. The nozzles on the inkjet print heads can have any suitable opening diameter. Suitable opening diameters may range, for example, from about 10 µm to about 200 µm, alternatively from about 10 µm to about 50 µm. One suitable inkjet print head contains approximately 360 nozzles per inch (per 2.54 cm). The Xaar 1002 is an example of a suitable print head for use herein, and is available from Xaar of Cambridge, UK. A suitable hot melt inkjet print head is the Fuji Galaxy PH 256/30 HM.

The droplets of ink formed by an ink jet print head can range in diameter from about 10 microns or less to about 200 microns, or more. The droplets of ink can be distributed in any suitable number over a given area. Typically, in ink jet printing, the ink droplets form an array or matrix in which the number of drops per inch (2.54 cm) (DPI) is specified in the direction of movement of the print head or article to be printed, and in a direction on the surface of the article perpendicular thereto. (It will be appreciated that in the process described herein, such an array or matrix will be deposited on the transfer component 24, and then transferred to an at least a partially three-dimensional (e.g., curved, including in a convex or concave form) surface.) The application of ink drops provided on the surface of the article to form a digital image can range from about 200, or less up to about 2,880 or more drops per inch (DPI) in at least one direction. In some cases, the droplets of ink can be deposited in a matrix that ranges from 700 to 1,440 drops per inch in at least one direction. In some cases, the droplets of ink may be deposited in a matrix that is greater than 1,200 drops per inch up to about 2,880 or more drops per inch in at least one direction.

When the deposition device(s) 26 comprise print heads, one or more of the deposition devices 26 may comprise a printing unit (or "printing station"). The ink jet print heads may be configured to print black or color ink or varnish, adhesives, or clear varnish. Each printing unit may comprise any suitable number of print heads, from one to four or more. For example, in some cases, the printing unit may comprise four print heads for a CMYK (cyan, magenta, yellow, and key (black)) color scheme for producing different color sets of a multicolor print. The printing unit may also comprise additional print head(s) for additional colors, e.g., white and or special colors, for a priming coat or for a base layer, e.g., an adhesive, and/or for applying a transparent sealing or protective coating. In some embodiments, there may be multiple printing stations, such as one or more for an optional base coat, one or more for a decoration coat, one or more for an adhesive, and one or more for an optional top coat.

The material 22, such as the ink(s) may be applied to the transfer component 24 in a predetermined pattern. The term "predetermined pattern", as used herein, refers to any type of printed pattern including but not limited to words, figures (e.g., pictures), images, indicia or designs that is determined prior to the initiation of printing.

The adhesive deposition device 28 may be optional in some embodiments. If the material (such as ink or varnish) previously deposited on the transfer component 24 has sufficient adhesive properties to adhere to the surface 12 of the articles 10, a separate adhesive deposition device may not be necessary. In embodiments which specify that an adhesive is being used, there will be an adhesive deposition device 28.

The adhesive deposition device 28, if present, can be any suitable type of device for depositing an adhesive onto at least a portion of the previously deposited material(s) and/or the transfer component 24. Suitable adhesive deposition devices 28 include, but are not limited to: print heads, nozzles, and other types of material deposition devices. If a print head is used to deposit the adhesive, it can comprise any of the types of print heads that are described above as being suitable for use as a deposition device.

The adhesive can be any material that is suitable for adhering the transfer material 22 to the articles 10 when the transfer component 24 is brought into contact with the surface 12 of the articles 10. This will enable the transfer material 22 to be transferred from the transfer component 24 to the surface 12 of the articles 10. Suitable adhesives include, but are not limited to: pressure sensitive adhesives, curable adhesives such as visible light, UV or Electron Beam curable adhesives, water-based adhesives, solvent-based adhesives, solid adhesives (e.g., 100% solid, monomer-based adhesives), heat setting (or thermally activated) adhesives, hybrids of any of the foregoing, and two-part or multi-part adhesives (for example two-part epoxy adhesives). In some cases, it may be desirable for the adhesive to be of a non-heat activated (or thermally-activated) type, such as in the case of heat transfer labels.

In some embodiments, the transfer material 22 has an adhesive that require curing/activation by radiation/energy (such as UV radiation). In many cases, the transfer material—including both the decoration/ink layer and the adhesive—is positioned between the transfer component and the surface of the article during application of the transfer material to the surface of the article. If the article is transparent or substantially transparent to the curing/activating radiation (e.g. UV radiation) it may be possible to cure the adhesive by transmitting the curing/activating radiation through at least a portion of the body of the article. If the article is not transparent or substantially transparent to the curing/activating radiation (e.g. UV radiation), the UV light/radiation must be transmitted through both the transfer component and the transfer material in order to reach the adhesive. Often this means that the UV light must also be transmitted through a decoration or ink layer. There are difficulties involved in passing UV light through a decoration or ink layer. These include the tendency for the decoration or ink layer to absorb and/or reflect UV light, which will result in some/much of the UV light not reaching the adhesive layer. This can result in the need for increased dosages of UV radiation in an effort to ensure that an adequate amount reaches the adhesive to cure the adhesive. It is, therefore, desirable to provide a process that provides improved efficiency in the cure-through process.

Additionally, it may be desirable to design the radiation source and the adhesive so that processes provided may utilize certain ink materials and/or certain energy wavelengths that improve the amount of UV radiation that is transmitted through decoration or ink layers. It is also desirable to provide UV curable adhesives that are more readily cured in such a cure-through process.

In such embodiments, improvements in the cure through efficiency are achieved in several manners. One manner is by utilizing UV radiation comprising at least some waves having wavelength of greater than or equal to about 400 nm, alternatively from greater than or equal to about 400 nm and less than or equal to about 700 nm, in order to improve the amount of UV radiation that is able to pass through the decoration or ink layers. Another manner is by developing and utilizing a UV curable adhesive comprising photoinitiators that activate with relatively low radiation dosing and/or which are activate-able by a UV wavelength of greater than or equal to about 400 nm, alternatively from greater than or equal to about 400 nm and less than or equal to about 700 nm. Such adhesive compositions can, then be developed that cure as fast as possible, and/or with as little UV dosage as possible, and/or at select radiation wavelengths.

Ideally, such an adhesive is capable of being applied by inkjet printing for precise application. UV curable adhesives have been developed which comprise thiol-acrylate inkjet-able adhesive compositions and thiol-ene-acrylate inkjet-able adhesive compositions. The adhesive compositions may have a viscosity under standard conditions of greater than or equal to about 5 cps and less than or equal to about 100 cps, or any suitable range therebetween such as greater than or equal to about 5 cps and less than or equal to any of about 20, 30, 40, 50, 60, 70, 80, or 90 cps, so that they are inkjet-able with conventional inkjet equipment including thermal inkjet equipment. If the viscosity is greater than 20 cps at standard conditions, it may be desirable for the viscosity to be greater than or equal to about 5 cps and less than or equal to about 20 cps at the jetting temperature, which can range from standard temperature up to about 50° C. with currently more prevalent inkjet technologies up to about 125° C. with technologies such as the Fuji HotMelt print head described herein. Viscosity is measured using a Viscometer-Rheometer-on-a-Chip (VROC)—or microfluidic/MEMs based viscometer, specifically a microVISC™ viscometer available from RheoSense of San Ramon, Calif., USA. The inkjet-able adhesive compositions may comprise a photoinitiator that has an absorbance peak at or above about 400 nm, alternatively between greater than or equal to about 400 and less than or equal to about 700 nm.

In some embodiments, the UV curable adhesive may be a thiol-acrylate inkjet-able adhesive composition comprised of ingredients comprising: (a) about 50% to about 90% of an acrylate monomer; and (b) about 10% to about 50% of a multi-functional thiol. In these and the following embodiments, if the acrylate monomer comprises a mono functional acrylate, the acrylate monomer preferably comprises a combination of a mono functional acrylate and a multi-functional acrylate. In embodiments in which the acrylate monomer comprises the combination of a mono functional acrylate and a multi-functional acrylate, the mono functional acrylate is preferably present at a wt % of less than or equal to about 10% of the composition.

As used herein, the term "multi-functional" includes two (di-functional) or more (tri-, tetra-, tetra-, penta-, etc. functionalities). In the case of thiols, it is desirable for the multi-functional thiols to have functionalities of from 2 to 5, inclusive (i.e., 2-5 thiol-moities). In some cases, it may be desirable to describe di-functional ingredients separately from multi-functional ingredients having three or more functionalities (or moieties). In such cases, the number of functionalities or moities will be specified. It should also be understood that when either of the terms "comprising" and "a multi-functional" ingredient is used in the specification and claims, the specified ingredient (e.g., thiols; or ene monomers, the latter being described below) can comprise any suitable combinations of such an ingredient in the form of di-functionality and/or two or more types of such ingredient in other than di-functionality (e.g., tri-, tetra-, tetra-, penta-, etc. functionalities). In some cases, the compositions may be described as "consisting of" only certain of the possible ingredients.

In some embodiments, the UV curable adhesive may be a thiol-ene-acrylate inkjet-able adhesive composition comprised of ingredients comprising: (a) about 10% to about 40% of an acrylate monomer; (b) about 10% to about 50% of a multi-functional thiol; and (c) about 20% to about 70% of a di-functional ene monomer, a multi-functional ene monomer, or combination thereof, In some cases of the thiol-ene-acrylate inkjet-able adhesive composition described above, the multi-functional thiol may comprise a first thiol monomer having a first degree of functionality, and the composition may further comprise from about 10% to about 60% of a second thiol monomer having a different degree of functionality than the first thiol monomer.

The components of the thiol-acrylate and the thiol-ene acrylate compositions described above may have a weighted average molecular weight between 150 g/mol and about 400 g/mol. The compositions may have a viscosity of greater than or equal to about 5 cps and less than or equal to about 100 cps, or any suitable range therebetween such as greater than or equal to about 5 cps and less than or equal to any of about 20, 30, 40, 50, 60, 70, 80, or 90 cps. In some cases it may be desirable for the dynamic viscosity of the adhesive to be less than 20 cps at the point of ejection from the inkjet nozzle in order to jet. The larger viscosity range specified above is possible since the shear thinning properties of the adhesive and higher temperature inkjet heads can achieve a dynamic viscosity of 20 cps at the point of ejection, even if the ambient viscosity under standard conditions is between 5 and 100 cps. In addition, it may be desirable for all, or substantially all, of the individual ingredients in the composition to have a weight average molecular weight of less than or equal to 10,000 g/mol.

The thiol-acrylate and thiol-ene acrylate compositions may further comprise adjunct ingredients including, but not limited to photo-initiators, adhesion promoters, inhibitors, wetting agents, surfactants, inorganic fillers, and viscosity modifiers. Inhibitors can be used for various purposes, including to extend shelf life; to protect from yellowing; and, in the case of formulations that are very light sensitive to help protect from pre-mature or unintended curing.

In some embodiments, the thiol-acrylate and thiol-ene acrylate compositions may contain either no pigment, substantially no pigment, or lesser amounts of pigment than are found in monomer-based inkjet inks, such that these compositions would not be considered to be inkjet inks. Monomer-based inkjet inks typically have 5 to 10 wt % pigment therein. In some cases, the thiol-acrylate and thiol-ene acrylate compositions may contain less than or equal to about 1 wt %, less than or equal to about 0.1 wt %, less than or equal to about 0.01 wt %, or less than or equal to about 0.001 wt % pigment. In other embodiments, the thiol-acrylate and thiol-ene acrylate compositions may comprise inkjet inks and contain pigments in the above range.

The inkjet-able adhesives may also be described in terms of their Ohnesorge number. The Ohnesorge number (Oh) is a dimensionless number that relates the viscous forces to inertial and surface tension forces. In cases in which the inkjet printer has a plurality of nozzles having openings with a diameter from about 10 μm to about 200 μm, alternatively from about 10 μm to about 50 μm, the UV curable adhesive may have an Ohnesorge number that is between about 0.1 and about 1 where the characteristic length used to calculate the Ohnesorge number corresponds to the nozzle diameter.

The thiol-acrylate and thiol-ene acrylate compositions described herein may be particularly suitable for the methods described herein because they are step-growth curing formulations or dual step growth and chain growth curing formulations as opposed to only chain growth curing formulations. The thiol-acrylate, thiol-ene, and thiol-ene acrylate compositions exhibit low to no oxygen inhibition, and rapid kinetics with a delayed gel point which may be particularly suitable for the methods described herein.

Non-limiting examples of suitable ingredients for the thiol-acrylate and thiol-ene acrylate inkjet-able adhesive compositions are as follows.

Mono functional acrylates (only to be included up to 10 wt % in a thiol-based system) include, but are not limited to phenoxyethyl acrylate (PEA), ethylhexyl acrylate, ethoxyethoxy ethyl acrylate, isobornyl acrylate, and 2-carboxyethyl acrylate.

Di-functional acrylates include, but are not limited to hexanediol diacrylate (HDDA), tripropylene glycol diacrylate (TPGDA) (such as PHOTOMER 4061™ available from IGM, St. Charles, Ill.), tricyclodecane dimethanol diacrylate (TCDDA), hydroxyl pivalic acid neopentyl glycol diacrylate (HPNDA), neopentylglycol $(PO)_2$ diacrylate (NPG$(PO)_2$DA), dipropylene glycol diacrylate (DPGDA), triethylene glycol diacrylate (TEGDA), and tetraethylene glycol diacrylate (TTEGDA).

Multifunctional acrylates (with three or more functionalities) include, but are not limited to trimethylolpropane triacrylate (TMPTA) and trimethylolpropane $(EO)_3$ triacrylate.

Di-functional thiols include, but are not limited to glycol di (3-mercaptopropionate) (GDMP) (such as THIOCURE® GDMP available from Bruno Bock, Marschacht, Germany) and glycol dimercaptoacetate (GDMA).

Multifunctional thiols (with three or more functionalities) include, but are not limited to pentaerythritol tetra (3-mercaptopropionate) (PETMP) (such as THIOCURE® PETMP available from Bruno Bock, Marschacht, Germany), trimethylolpropane tri(3-mercaptopropionate) (TMPMP), dipentaerythritol hexa (3-mercaptopropionate) (DiPETMP), tris [2-(3-mercaptopropionyloxy) ethyl] isocyanurate (TEMPIC), and pentaerythritol tetramercaptoacetate (PETMA).

Di-functional ene monomers include, but are not limited to hexanediol di-(endo,exo-norborn-2-ene-5-carboxylate) [Dinorbornene], triethyleneglycol divinyl ether [DVE-3], and trimethylolpropane diallyl ether [Diallyl].

Tri-functional ene monomers triallyl triazine trione [TATATO] (such as SR533 available from Sartomer, Exton, Pa., USA), triallyl cyanurate, and triallyl amine.

Photo-initiators include, but are not limited to: bis(2,4,6-trimethylbenzoyl)-phenylphosphineoxide [BAPO], diphenyl (2,4,6-trimethylbenzoyl)-phosphine oxide [TPO or MAPO], and bis(.eta.5-2,4-cylcopentadien-1-yl)-bis(2,6-difluoro-3-(1H-pyrrol-1-y1)-phenyl) titanium (available from Ciba of Basel, Switzerland as Irgacure™ 819, Darocur™ TPO, and Irgacure™ 784, respectively); 2,4-bis (trichloromethyl)-6-p-methoxystyryl-S-triazine (such as QL Cure TAZ™ 110); 2, 4-diethylthioxanthone (such as Kayacure DETX™ available from Nippon Kayaku of Tokyo, Japan); 4,4'-bis(diethylamino)benzophenone; a mixture of 2-isopropylthioxanthone and 4-isopropylthioxanthone; 2-Chlorothioxanthone; 1,3-di({α-[1-chloro-9-oxo-9H-thioxanthen-4-yl)oxy]acetylpoly[oxy(1-methyl ethylene)]}oxy)-2,2-bis ({α-[1-chloro-9-oxo-9H-thioxanthen-4-yl)oxy]acetyl poly [oxy(1-methylethylene)]}oxymethyl) propane; and, 1-chloro-4-propoxythioxanthone (available from Lambson, West Yorkshire, UK, as Speedcure EMK™, Speedcure ITX™, Speedcure CTX™, Speedcure 7010™, and Speedcure CPTX™, respectively); a di-ester of carboxymethoxy thioxanthone and polytetramethyleneglycol 250 (Omnipol TX™ available from IGM, St. Charles, Ill.); 5,7-diiodo-3-butoxy-6-fluorone; 2,4,5,7-Tetraiodo-3-hydroxy-6-fluorone; and 2,4,5,7-Tetraiodo-3-hydroxy-9-cyano-6-fluorone (available from Spectra Group Limited, Inc. of Millbury, Ohio, as H-Nu470™, H-Nu535™, and H-Nu635™, respectively).

Adhesion promoters include, but are not limited to phosphate methacrylate (such as Miramer SC1400™ available from Miwon of Gwanggyo, South Korea).

Inhibitors include, but are not limited to N-Nitorosophenylhydroxyl amine aluminum salt (such as Q1301™ available from Wako, Richmond, Va., USA).

In cases in which the aforementioned thiol-acrylate and thiol-ene acrylate UV-curable adhesive compositions are used, the three dimensional articles may have a surface with a transfer material joined to their surface, wherein the transfer material comprises, from the surface of the article outward: an adhesive comprising a thiol-acrylate adhesive composition, a thiol-ene-acrylate adhesive composition, or a combination thereof; and a deposit of ink on the adhesive. In such embodiments, the adhesive is positioned between the surface of the article and the ink. The articles may further comprise a protective varnish overlying the ink.

In the case of two-part epoxy adhesives, the first part can be applied by one deposition device and the second part can be applied by a second deposition device. For example, both parts of the adhesive composition can be applied on the transfer component 24, and the chemistry can be formulated so that the adhesive composition will cure sufficiently to provide the transfer within the allotted process time (for example, within the 1-10 second range). In some cases, the first part can be applied to the transfer component 24 and the second part can be applied to the surface 12 of the article 10. With any of the adhesive systems, it may be desirable to at least partially cure the adhesives prior to contacting the article in order to control squeeze out/flow of the adhesive.

The apparatus 20 may further comprise one or more optional energy sources. The optional energy source(s) such as energy sources 50A and 50B, can be used for curing any curable adhesive, ink, or varnish having adhesive properties. The optional energy source(s), such as 50A may be located adjacent to (that is, on the same side as) the transfer surface 24A of the transfer component. The energy source 50A adjacent the transfer surface 24 can be used to cure the material (such as ink or varnish) deposited on the transfer component 24 by deposition device 26. Such curing can take place prior to any adhesive being applied by the adhesive deposition device 28. There may also be another optional energy source, such as energy source 50B, that is located adjacent to the back surface 24B of the transfer component 24 to cure any adhesives applied by the adhesive deposition device 28. The type of optional energy source will depend on the type of substance being used. The optional energy source can comprise any suitable type of device including, but not limited to: a heat source (such as a heat tunnel, or an infrared lamp); a UV lamp; an electron beam; or other energy source. If a UV-curable adhesive is used, at least sections of the transfer component 24 having the transfer material thereon, as well as the overlying layers of the transfer material may need to be transparent to UV light to allow the adhesive to be cured through the overlying layers and the transfer component 24. The curing may be initiated prior to, during, or after the transfer of the transfer material from the transfer component 24 to the surface of the article. Of course, if the adhesive is of a type (such as a pressure sensitive adhesive) that does not require curing, the energy source will not be necessary.

In some cases, it may be desirable for the adhesive to have a sufficiently low tack (a first level of tackiness) during the initial stage of contacting the article 10 with the transfer component 24 (or contacting the transfer component with the article) so that at least portions of the transfer material 22 may be repositioned, such as by sliding (e.g., slip) along the surface 12 of the article 10 in order to conform to the same without damage to the transfer material 22 or the transfer component 24. If the adhesive is a type that can be cured, at this initial stage, the adhesive may be uncured, or only partially cured. Once the transfer component 24 with the transfer material 22 thereon is conformed to the surface of the article 10, pressure may be applied to the transfer component in a direction substantially normal to the surface of the article in order to conform and/or adhere the transfer material 22 to the surface of the article 10. It may be desirable for the ink component to be fully cured before normal pressure is exerted on the transfer component so that the ink will not undesirably spread, distorting any image, etc. and/or causing the ink to ooze out of the transfer material.

The apparatus 20 can also comprise a decoration station. The decoration station is a station at which a visual, tactile, or olfactory effect is applied by means of material deposition that is applied directly, or transferred to an article 10 or by transforming a property of an article, or combinations thereof. An example of transforming a property of an article without transferring a material to the surface of the article is imparting an image on the surface of an article by a laser. A single decoration station can be used to apply a single decorative effect or multiple decorative effects. Alternatively, multiple decoration stations can be used to apply the decorative effect(s). The decoration may occur before or after the printing of a material on the transfer component 24, or even directly onto the articles before or after the transfer material 22 is applied to the articles 10.

In some embodiments, the decoration station may comprise a station for depositing a metallic substance on the transfer component 24 and/or onto one of the substances thereon. (In the latter case, the metallic substance would be deposited indirectly on the transfer component 24.) A metallic substance may be used to provide the article 10 with a metallic effect. For example, as shown in FIG. 2, one or more metal deposition devices 60A and 60B may be provided adjacent to the substance deposition devices 26 for depositing a metallic material onto the transfer component. As shown in FIG. 2, a metallic deposition device 60A may be placed before (upstream of) the substance deposition devices 26. FIG. 2 also shows that a metallic deposition device 60B may be placed after (downstream of) the substance deposition devices 26. The metallic material can comprise any suitable type of metallic material including, but not limited to: (1) a metallic foil; (2) printed metallic ink; or (3) sintered metal. If the metallic material comprises a metallic ink, it can be printed by any of the processes described herein for printing the ink component. In addition, in some cases, the metallic material when applied to the transfer component 24 may be UV permeable due to small open spaces between the very small metallic material particles or "flakes". The metallic substance, however, will typically be on the bottom of the structure (i.e., one of the first things that will be applied to the transfer component 24). The remainder of the image may then be built on top of the metallic substance (or around it).

In some embodiments, the decoration station may comprise a station for adding a tactile effect to the transfer material 22 and, thus, to the article 10. The tactile effect may comprise a built up texture that is transferred to the surface 12 of the article 10. The texture can be created by depositing a textured substance on the transfer component 24 before, during or after depositing other substances on the transfer component 24. Alternatively, the texture can be created by using a textured transfer component 24. It may be desirable that the substance that creates a tactile effect on the surface 12 of the article 10 does so by creating a texture with height greater than about 3 microns.

FIG. 3 shows one example of a composite transfer material 22 on a portion of a transfer component 24. The components of the composite transfer material 22 shown in FIG. 3 may include: an optional adhesive (or varnish with adhesive properties) 52; an ink component which may be in the form of artwork, an image, etc. 54; and, an optional protective coating or component (such as a clear varnish) 56. FIG. 3 also shows an optional additive or release agent 58 that has been applied to the transfer component 24. In this case, the transfer component 24 is in the form of a relatively thin film or belt. In addition to the components shown, other optional components may be included in the composite transfer structure 22. For example, the ink component 54 may be formed by depositing CMYK (may omit white), and an optional base layer (which can be white or any suitable color) may be provided between the optional adhesive 52 and the ink component 54. In addition, an optional metallic material 62 may be provided between the optional adhesive 52 and the ink component 54, or between the ink component 54 and the optional protective component 56. It should be understood, however, that one or more of these optional layers may be omitted, and that in its simplest form the transfer material 22 may only consist of an ink component (such as a varnish or an ink layer) 54 if the ink component 54 has sufficient adhesive properties to adhere to the surface 12 of the article 10, and if the ink component has sufficient protective properties and wear resistance that it does not require a protective component. The transfer material 22 will typically be free of any release paper, such as that used to cover adhesive on decals. The transfer material 22 will typically also be free of a carrier that remains on the article after the transfer material is applied to the surface of an article, such as in the case of heat transfer labels.

It should be understood that all of the components shown in FIG. 3 may, but need not have the same dimensions and/or plan view configurations. Any of these components may have greater or lesser dimensions in any direction than any of the other components. However, it may be desirable for the optional adhesive component 52 (or ink layer with adhesive properties) to have dimensions that are equal to or greater than the underlying layers as arranged on the transfer component 24 (which will become overlying layers on the surface of the article) so that the underlying layers will be adhered to the surface 12 of the article 10. In the aspect in which the dimensions of the layer of the adhesive component are greater than that of the layer of the ink component the dimensions of the layer of the adhesive component may be only slightly larger than those of the ink component. For example the adhesive component may extend less than 2 mm or less than 1 mm outside the periphery of the ink component.

The process herein may be described in terms of depositing one or more of the materials described above on the transfer component 24. It should be understood, however, that it is not necessary that a particular material be deposited directly on the surface 24A of the transfer component 24. The depositing of the material on the transfer component 24 may include depositing the material directly on the surface 24A of the transfer component 24, or indirectly depositing a material on the surface 24A of the transfer component 24, such as by depositing one material (for example an adhesive) on top of another material (ink) that is already on the surface 24A of the transfer component 24.

In addition, although the components of the composite transfer material 22 are shown as layers in FIG. 3, one or more of these components may, but need not be in the form of a layer. For example, in the ink component 54, some ink droplets may stay discrete; some others may merge together to form a film-like structure. The components of the composite transfer material 22, if deposited in a form which may need to be cured, may also be in various states ranging from non-cured to fully cured. It may be desirable for the ink to be in the form of a pre-formed image before the transfer of the transfer material 22; otherwise, the desired pattern of ink (e.g., the image) may degrade during transfer. As used herein, the term "pre-formed" image refers to a dried image in the case of solvent or water-based inks, or a fully cured image in the case of curable inks. The ink can therefore be pre-formed (e.g., fully cured) and the adhesive can be non-cured, or only partially cured. A transfer of a pre-formed (e.g., fully cured) ink image by the transfer material differs from ink jet printing directly on an article wherein the droplets of ink are deposited on an article and then dried or cured.

The release agent 58 may be used to ensure that the transfer material 22 releases cleanly from the transfer component 24 and transfer to the surface 12 of the articles 10. The release agent 58 may be continuous in the machine direction as shown in FIG. 3, or it may be in the form of discrete patches that only underlie the transfer material 22.

The conveyor 30 may be any suitable type of conveyor. In FIG. 2, the conveyor 30 is in the form of an endless belt having one or more pockets 32 therein, and is supported by rolls 34 and 36 having axes of rotation A. The pockets 32 may be configured to receive the articles 10 therein. The conveyor 30 brings the articles 10 into proximity with the conforming component 40 which has at least one cavity 42 therein. The conforming component 40 is used for conforming the transfer component 24 with the transfer material 22 thereon to at least a portion of the surface of an article 10. In FIG. 2, the conforming component 40 is in the form of an endless belt having a plurality of cavities 42 therein that is supported by rolls 44 and 46.

The apparatus 20 shown in FIG. 2 is described as a top view. In this case, the axes of rotation A of the conveyor 30 are oriented vertically. However, the entire apparatus 20 can be reoriented so that the axes A of the rolls are horizontal, in which case FIG. 2 would be a side elevational view. In other embodiments, the apparatus 20 can be oriented in any configuration between horizontal and vertical.

The conveyor 30 can be any suitable type of device for conveying the article(s) 10 so that the articles 10 may contact, or be contacted by, the transfer component 24 and have the transfer material 22 transferred to the surface 12 of the articles 10. The term "conveyor", as used herein, refers to devices that move articles generally, and is not limited to conveyor belts. Suitable conveyors include, but are not limited to: turret conveyors, star wheel conveyors, endless loop conveyors which may be in the form of tracks, belts, chains, and the like, puck conveyors, and magnetic servo car conveyors.

In the embodiment shown in FIG. 2, the article conveyor 30 is an endless loop conveyor that is in a race track configuration. The conveyor 30 can comprise any suitable type of holder for holding the articles 10 thereon. In the embodiment shown in FIG. 2, the conveyor 30 comprises an endless belt with a plurality of pre-formed holders 32 therein, or joined to the endless belt, for holding the articles 10. The term "joined to" as used throughout this disclosure, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The holders 32 can be configured to hold articles having a variety of configurations, or they can be configured more precisely correspond to the shape of the portion of the articles 10 that faces away from the transfer component 24. The conveyor 30 may rotate at a constant velocity, or the velocity of rotation may be varied, if desired. The rotation of the conveyor 30 may be continuous, or if desired, intermittent.

The conforming component 40 can be any suitable type of component for conforming the transfer material 22 to the surface 12 of the article 10. It should be understood, however, that the conforming component 40 is not necessary in the second and third categories of processes described herein. It should also be understood that although the aforementioned categories of processes may be shown as continuous processes, they can also be carried out as intermittent processes at fixed stations. The conforming component 40 can be in forms that include, but are not limited to: stationary cavities, and conveyors with cavities thereon.

The conforming component 40 shown in FIG. 2 comprises a conveyor with one or more spaced apart cavities 42 therein for articles 10. The conveyor for the conforming component 40 may be in the form of a flexible belt having two surfaces, a front surface 40A for receiving articles 10 and an opposing back surface 40B. The cavities 42 may be configured to at least generally conform to the configuration of a portion of the surface (the "target surface") of the three-dimensional article 10 to be decorated. The term "target surface" may optionally be used herein to refer to the portion of the surface of the article 10 to which the transfer material 22 is applied (since in many cases, the transfer material 22 will not be applied to the entire surface 12 of the article). It should be understood, therefore, that when the transfer material 22 is described as being transferred to the surface 12 of the article 10, it may only be applied to a portion of the surface 12 of the article 10.

The conforming component 40 may comprise at least one of the components of a station for modifying the transfer component 24 with the transfer material 22 thereon so that the transfer material 22 conforms to the surface 12 of the article 10. The transfer component 24 with the transfer material 22 thereon will have initial dimensions and an initial configuration prior to the modifying step. The terms "modify" or "modifying", as used herein with respect to the transformation that the portion of the transfer component 24 with the transfer material 22 thereon undergoes may include at least one of: (1) changing the dimensions of the portion of the transfer component 24 with the transfer material 22 thereon by increasing their dimensions in at least one direction by stretching the same; (2) changing the dimensions of the portion of the transfer component 24 with the transfer material 22 thereon by reducing their dimensions in at least one direction such as by shrinking or contracting the same; or (3) at least temporarily deforming, deflecting, flexing, or bending a portion of the transfer component 24 with the transfer material 22 thereon to conform to the configuration of the surface 12 of the article 10.

It should be understood that when the conforming component 24 with the transfer material 22 thereon is described herein as undergoing a modification, the transfer material 22 will be similarly modified. Thus, if the transfer component 24 with the transfer material 22 thereon is stretched (for example), the transfer material (which may be in the form of an image or the like) will also be stretched. If the portion of the transfer component 24 with the transfer material 22 thereon is thereafter relaxed and contracts, the image will also contract.

In some embodiments, the term "modify" may be further specified herein as either including or excluding substantial compression of the thickness of the transfer component 24 (that is, compression greater than about 5% of the uncompressed thickness of the transfer component 24) as the primary type of modification, or as an aspect of the modification. It should be understood, however, that although the modification may, for example, be one of stretching to modify the transfer component 24 with the transfer material 22 thereon, the transfer itself may rely on some level of compressive force being applied in the direction of the thickness of the transfer component 24 to ensure good contact for the transfer of the transfer material 22 to the surface 12 of the article. In some embodiments, the term "modify" may be further specified as excluding bending or wrapping the transfer component 24 about a cylindrical object. In such cases, the transfer component 24 may be said to be modified other than in the configuration of a portion of a cylindrical surface. That is, if bent, the transfer component 24 with the transfer material 22 thereon is bent such that it may have portions with different radii and/or axes of curvature.

In the various different types of processes described herein, there can be several aspects to transferring the transfer material 22 from the transfer component 24 to the surface of the article 10. As described above, a portion of the transfer component 24 with the transfer material 22 thereon, may be modified. These aspects comprise: contacting, conforming, and transferring. More specifically, the transfer operation will involve an aspect of contacting the article 10 with the transfer material 22. The transfer operation may also involve an aspect of conforming the transfer material 22 to the configuration of the target surface 12 of the article 10. The transfer operation will also involve a transfer of the transfer material 22 from the transfer component 24 to the target surface of the article 10. The order in which some of these aspects occur relative to each other may vary depending on the type of process used herein.

The aspect of modifying the transfer component 24 with the transfer material 22 thereon can occur at any of the following times: prior to contact between the article 10 and the transfer material 22; simultaneously with contacting; after contacting; or any combination thereof. The contact may occur in any of the following manners, by: moving the article 10 to make contact with the transfer component 24; moving the transfer component 24 to make contact with the article 10; or moving both the article 10 and the transfer component 24 to contact each other.

The aspect of conforming the transfer material 22 to the configuration of the surface 12 of the article 10 is typically associated with the aspect of modifying the transfer component 24 with the transfer material 22 thereon. In some cases, the aspect of conforming the transfer material 22 to the configuration of the surface 12 of the article 10 can occur before the transfer material 22 is brought into contact with the surface 12 of the article 10, simultaneously with contacting, or after contacting, or any combination thereof.

The aspect of contacting the article 10 with the transfer material 22 typically occurs before there can be a transfer of the transfer material 22 to the surface 12 of the article 10. The aspect of transferring the transfer material 22 from the transfer component 24 to the surface 12 of the article 10 may occur simultaneously, or after contacting the article 10 with the transfer material 22.

It may be desirable to ensure that the transfer material 22 conforms closely to the surface 12 of the articles 10. This will reduce the chance that there will be wrinkles in the transfer material 22 and that air is trapped or entrained between the surface 12 of the article and the transfer material 22. This will also reduce the chance that portions of the transfer material 22 will span between portions of the surface 12 which may have a depression therein, rather than adhering closely to the surface of the article in those depressions. Also, if there is too large of a gap between the transfer material 22 and the article, then the adhesive will not contact the surface 12 of the article 10 and possibly not transfer that portion of the transfer material 22 to the article 10.

In addition to the foregoing, in some cases, it may be desirable to optionally pre-stretch an extensible transfer component 24 prior to and during the deposit of a material thereon. The transfer component 24 with the transfer material 22 thereon can then be temporarily relaxed before conforming the same to the surface of an article 10. Following the relaxation, the transfer component 24 with the transfer material 22 thereon can then be modified, such as by stretching, to conform the same to the surface of an article 10. Applying the transfer material 22 to a pre-stretched transfer component 24 may reduce or eliminate any negative effects on the transfer material during the subsequent step of modifying (such as by stretching) the same when conforming the transfer component 24 with the transfer material 22 thereon to the surface 12 of an article 10. The negative effects may include, but are not limited to damage to any image on the transfer material, and/or reduction in the quality of the image. For example, if the deposition device 26 comprises an ink jet printer, and the transfer component 24 is unstretched during printing, the number of drops of ink per inch (DPI) applied during printing will have a first value, $DPI^1$. After stretching the transfer component with the transfer material 22 thereon to conform the same to the surface 12 of an article 10, the DPI as applied to the surface 12 of the article 10 will have a second value $DPI^2$ that is reduced due to the stretching. If the transfer component 24 is stretched prior to and held in a stretched condition during the printing process, however, when the transfer component 24 with the transfer material thereon 22 is subsequently stretched to conform the same to the surface 12 of an article 10, the $DPI^2$ in this case as applied to the surface 12 of the article will be greater than it would have been if the transfer component was not pre-stretched. In the latter case, $DPI^2$ may approach $DPI^1$, or equal $DPI^1$, or even be greater than $DPI^1$ (the latter case occurring if the pre-stretching is greater than stretching during conformation).

In the first category of processes shown in FIGS. 1A and 2, the step of modifying the transfer component 24 with the transfer material 22 thereon occurs prior to the step of contacting the transfer material 22 with the surface 12 of the article 10. More specifically, prior to the step of contacting, portions of the transfer component 24 are drawn into the cavities 42 of the conforming component 40 to modify the transfer component 24 with the transfer material 22 thereon.

Figure 4A:
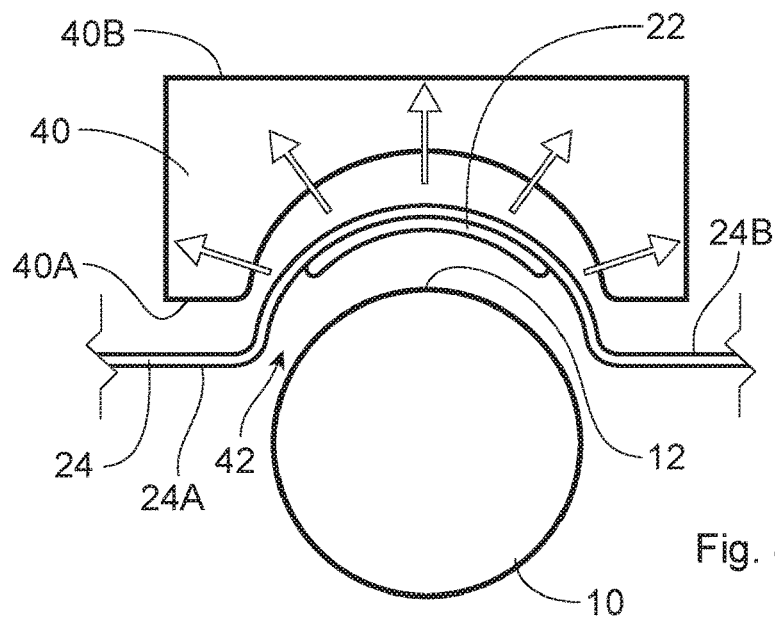
FIG. 4A is an enlarged schematic top view of one embodiment of a cavity for an article in which a portion of the transfer component is the initial state of being drawn into the cavity before the article is fit (at least partially) into the cavity in order to transfer the transfer material to the surface of the article.
Figure 4B:
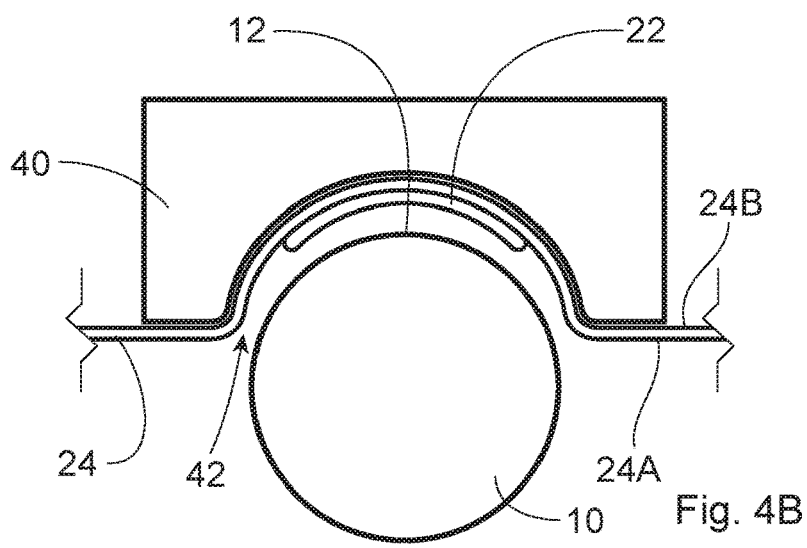
FIG. 4B is an enlarged schematic top view of the embodiment shown in FIG. 4A with the transfer component drawn flush against the cavity.
Figure 4C:
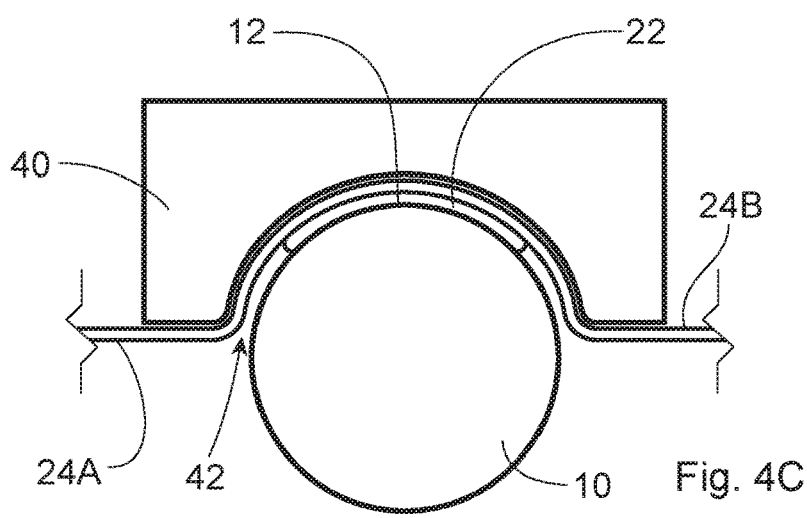
FIG. 4C is an enlarged schematic top view of the embodiment shown in FIG. 4A with the article in position at least partially within the cavity.

FIGS. 4A to 4C are enlarged views of a variation of the cavities 42 of the conforming component 40 of the apparatus 20 shown in FIG. 2. In FIGS. 4A to 4C, the cavities 42 are shown as being in stationary forming components 40, rather than in the form of a continuous belt as shown in FIG. 2.

As shown in FIG. 4A, the three-dimensional article 10 is outside the cavity 42, and the transfer component 24 is brought between the cavity 42 and the article 10. The transfer component 24 is provided with the transfer material 22 thereon facing outward from the cavity 42 toward the article 10. FIG. 4A shows the initial stage of drawing and deforming (modifying) a portion of the transfer component 24 with the transfer material 22 thereon into the cavity 42 in the direction of the arrows using vacuum. FIG. 4B shows the portion of the transfer component 24 with the transfer material 22 thereon drawn completely into the cavity 42 so that the back surface 24B of the transfer component 24 is flush with the surface of the cavity 42. FIG. 4C shows that the article 10 is brought into alignment with the cavity 42 so that at least the target portion of the surface 12 of the article 10 is within the cavity 42 and is in contact with the transfer material 22. This places the outwardly-facing adhesive 52 shown in FIG. 3 (or, if no adhesive is used, the ink component 54 having adhesive properties) in contact with the target surface of the article 10.

It may then be desired to take additional optional steps to further conform the transfer component 24 with the transfer material 22 thereon to the surface 12 of the article 10. This may be done by pulling the transfer component 24 toward the article 10, or exerting a pushing force on the back surface 24B of the transfer component 24, or by a combination of such forces. The following figures show several non-limiting ways of further conforming the transfer component 24 with the transfer material 22 thereon to the surface 12 of the article 10.

Figure 5:
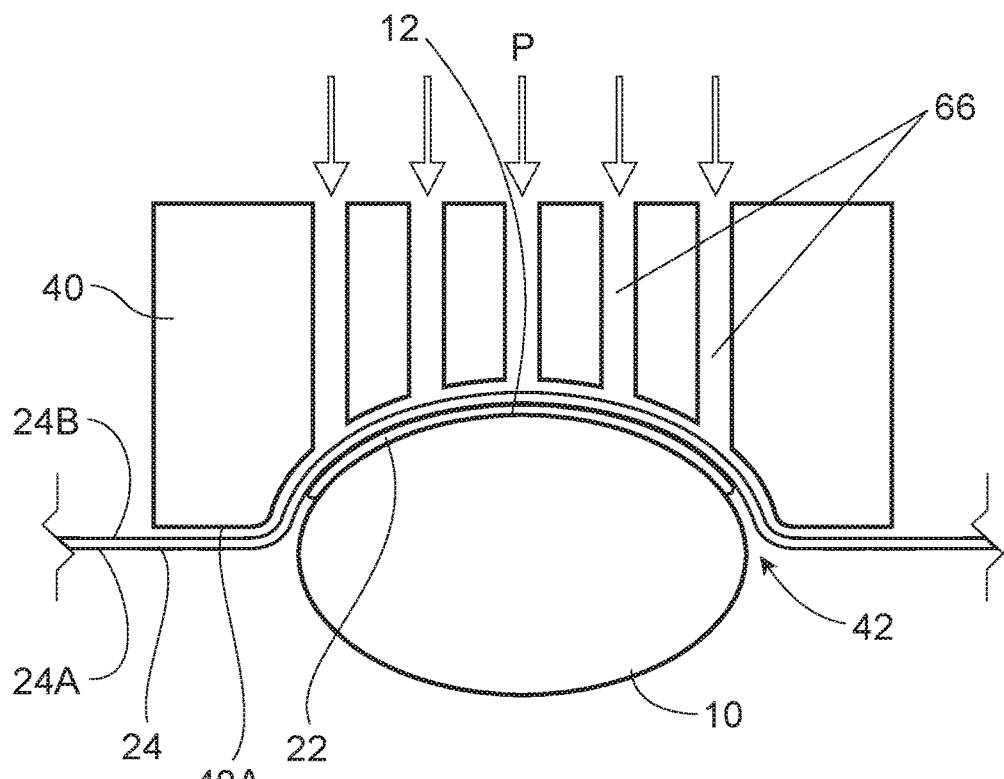
FIG. 5 is an enlarged schematic top view of a cavity for an article in which the transfer component with the transfer material thereon is brought into closer contact with the surface of the article by exerting a pushing force on the back side of the transfer component using air pressure through a plurality of conduits.

FIG. 5 shows one non-limiting embodiment for further conforming the transfer component 24 with the transfer material 22 thereon to the surface 12 of the article 10. In this embodiment, the transfer component 24 with the transfer material 22 thereon is further conformed to the surface 12 of the article 10 by exerting a pushing force on the back surface 24B of the transfer component 24 using air pressure, P, through a plurality of passageways such as conduits 66. In some versions of this embodiment, at least some of the conduits 66 can be used to draw the transfer component 24 into the cavity 42 during the steps shown in FIGS. 4A to 4C. In some variations of such an embodiment, it is not necessary that the passageways be linear as shown in FIG. 5. The element with the cavity 42 therein can have passageways in any suitable configuration. For example, such an element may comprise a sintered cavity, or a porous cavity. Following the application of air pressure, the transfer material 22, may more closely conform to the contours of the surface 12 of the article 10.

Referring back to FIG. 2, if the adhesive 52 (or, the ink component having adhesive properties) is of a type that requires curing to fully adhere to the surface 12 of the article 10, the adhesive or ink component, as the case may be, can be cured by the energy source 50B adjacent to the cavity 42. This adheres the transfer material 22 to the surface 12 of the article 10. Such a curing step can be used after the article 10 is brought into contact with the transfer component 24 with the transfer material 22 thereon (such as is shown in FIG. 4C), or after any of the embodiments contemplated herein for bringing the transfer component 24 with the transfer material 22 thereon into closer contact with the surface 12 of the article 10 such as after the optional step shown in FIG. 5.

Figure 6:
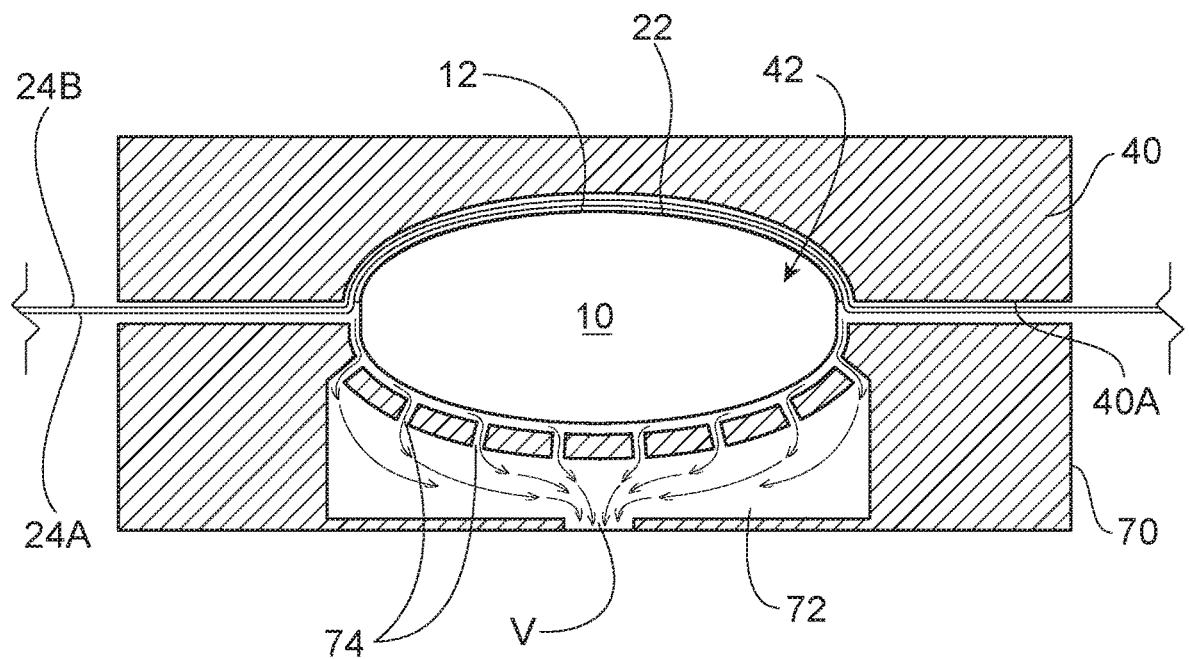
FIG. 6 is an enlarged schematic top view of a cavity for an article showing an embodiment for bringing the transfer component into closer contact with the surface of the article by exerting a force on the transfer component wherein the transfer component is pulled toward the article using a vacuum.

FIG. 6 shows another non-limiting embodiment for bringing the transfer component 24 with the transfer material 22 thereon into closer contact with the surface 12 of the article 10. In this embodiment, this is done by pulling the transfer component 24 toward the article 10. In this embodiment, a component 70 comprising a closed chamber 72 is brought adjacent to the transfer component 24 in order to form a substantially air tight seal against the portion of the conforming component 40 with the cavity 42 therein. In order to bring the component 70 with the closed chamber 72 into position, in some cases, it may first be necessary to move the conveyor 30 away from the transfer component 24. Alternatively, the component 70 comprising the closed chamber 72 could be part of the conveyor 30. Then, a vacuum, V, is drawn through conduits 74 in the component 70 comprising the closed chamber 72. The vacuum V exerts a pulling force on the transfer component 24 to further conform the portion of the transfer component 24 with the transfer material 22 thereon to the surface 12 of the article 10.

FIGS. 7A to 7C show another embodiment of the first category of processes. This embodiment utilizes a conforming component with a different configuration that is capable of applying a transfer material 22 to multiple portions of the surface of an article 10. There are several steps in carrying out this embodiment. First, the transfer component 24 with the transfer material 22 thereon is formed into a tube having an interior. The transfer material 22 is located on the interior surface of the tube. The initial diameter, D1, of the tube should be less than the cross-sectional dimension, D, of the article 10. (In FIG. 7A, this initial step has already been completed.) As shown in FIG. 7A, the tube-shaped transfer component 24 is then placed into a component 80 having a cavity 82 that substantially surrounds the transfer component 24 on all sides. As shown in FIG. 7A, the transfer component 24 is then expanded by drawing it against the sides of the cavity 82 using vacuum. As shown in FIG. 7B, the article 10 is inserted into the cavity 82 inside the tube-shaped transfer component 24. The vacuum or other force drawing the tube-shaped transfer component 24 against the sides of the cavity 82 is released. This causes the tube-shaped transfer component 24 to contact and closely conform to the surface of the article 10. The transfer component 24 then releases the transfer material 22, transferring the same to the surface 12 of the article 10. The article 10 is then removed from the cavity as shown in FIG. 7C. This embodiment provides the advantage that it can apply the transfer material 22 onto all sides of an article (360° around the article).

III. Second Category of Processes.

Figure 8:
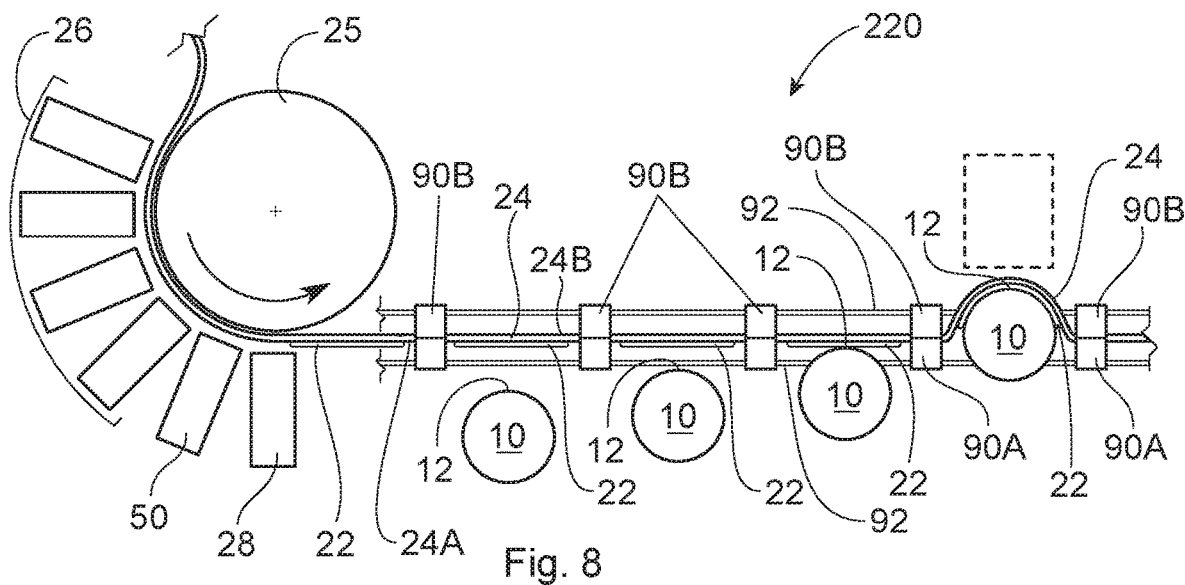
FIG. 8 is a schematic top view of a second type of process and apparatus for conforming a transfer component to the surface of an article in which the transfer component spans between spaced apart constraining members and the article is pushed into the transfer component.

FIG. 8 shows another type of an apparatus 220 and method in which the transfer component 24 and the articles 10 may be brought into contact with each other. The embodiment shown in FIG. 8 can be considered to be an example of the second category of processes shown in the flow chart of FIG. 1B.

As shown in FIG. 8, the apparatus 220 comprises a transfer component 24, a component providing a support surface for supporting the transfer component while printing such as cylinder 25, a material deposition device 26, an optional adhesive deposition device 28, a conveyor (not shown), and several spaced apart constraining components 90. The constraining components may be designated generally by reference number 90, or more specifically as 90A and 90B. The articles 10, the apparatus 220 orientation (horizontal, vertical, or other orientation), the components of the apparatus 220 shown in FIG. 8, including the transfer component 24, the deposition device 26 (and material(s) deposited thereby), the optional adhesive deposition device 28, and the conveyor may have any of the properties, or be in any of the forms, and include any of the optional additional devices (such as optional decoration station(s), and energy sources) described in preceding sections of this Detailed Description. Therefore, a description of these components and their properties will not be repeated herein.

In the embodiment shown in FIG. 8, the transfer component 24 is in the form of a web having portions that may be maintained in tension by spaced apart constraining components 90. In this type of apparatus 220, the articles 10 are pushed into the transfer component 24 in order to conform the transfer component 24 with the transfer material 22 thereon to the surface 12 of the article 10. FIG. 8 shows a transfer component 24 which runs along only one side of the articles. In other embodiments, two transfer components can be provided wherein a transfer component is provided on both sides of the article.

The constraining components 90 can be any suitable type of components that are capable of maintaining a portion of the transfer component 24 in tension so that the article 10 can be moved into the constrained portion of the transfer component 24 to conform the transfer component 24 to a portion of the surface 12 of the article 10. The portion of the transfer component may be pulled taut. In other cases, the portion of the transfer component need only be held in a manner that provides resistance when the article is pushed into the constrained portion of the transfer component 24. The constraining components 90 may also ensure that any stretching of the constrained portion of the transfer component 24 during the conformation step is isolated so that adjacent portions of the transfer component 24 are not stretched. In a continuous process, the constraining components 90 may also be capable of allowing the transfer component 24 to move in the machine direction.

Suitable constraining components 90 include, but are not limited to: constraining blocks, clamps, and frames (the latter which may have a configuration similar to a picture frame). In the embodiment shown in FIG. 8, the constraining components 90 comprise constraining blocks in which each of the constraining components 90 comprises a first constraining component or first block such as first side (or front) block 90A and a second constraining component or second block such as second side (or back) block 90B. When the constraining components 90A and 90B are viewed from the side (looking in the cross-machine direction perpendicular to the surface of the transfer component 24), they may have the appearance of spaced bars. Such spaced bars may be oriented parallel to the plane of the transfer component 24 and be positioned between the spaced apart transfer materials 22.

Figure 9:
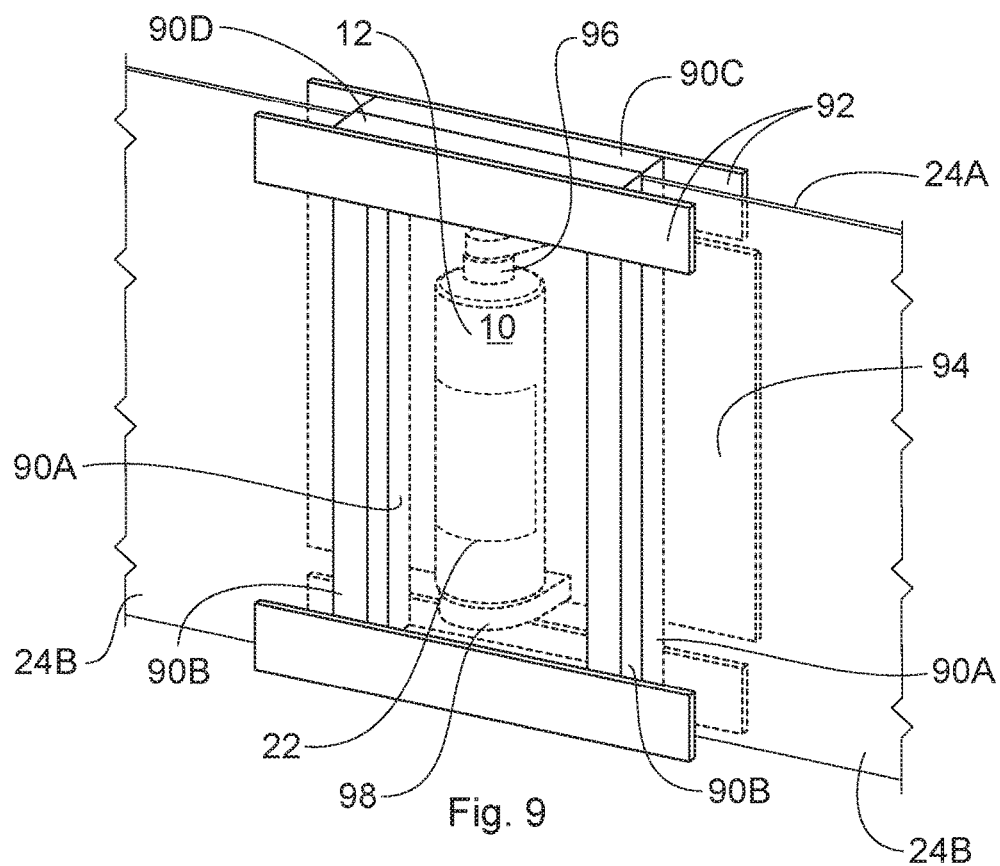
FIG. 9 is a perspective view showing an article positioned between a section of the conveyor used to convey the constraining members shown in FIG. 8.

In other embodiments, such as shown in FIG. 9, the constraining components 90 can be in the configuration of a frame. In such a case, portions of the constraining components 90 will also be located above and below the transfer material 22 to form a frame around the transfer material 22, in addition to bars between the spaced apart transfer materials 22. More specifically, two spaced apart first side constraining components 90A can be connected at or near their ends by a pair of spaced apart machine-direction oriented components 90C. Likewise, two spaced apart second side constraining components 90B can be connected at or near their ends by a pair of spaced apart machine-direction oriented components 90D. In the embodiment shown in FIG. 9, the articles 10 are conveyed by an article conveyor 94 that has elements 96 and 98 for engaging the ends, such as the top and bottom of an article 10. In operation, the transfer component 24 will be fed between the two frames 90A and 90B. The article conveyor 94 will push the article 10 into the transfer component 24 to conform the transfer component 24 with the transfer material 22 thereon to the surface of the article 10. Such embodiments would provide the advantage that the frame structure may be used to isolate the stretching of the constrained portion of the transfer component 24 in all directions.

The constraining components 90 may be joined to a constraining component conveyor 92 that moves the first and second constraining components 90A and 90B in the machine direction. The constraining component conveyor 92 can travel in the machine direction with the transfer component 24. The transfer component 24 is fed between the opposing first and second blocks 90A and 90B. The first and second blocks 90A and 90B may be movable toward and away from each other to clamp the transfer component 24 therebetween. The first and second constraining components 90A and 90B may also be movable relative to adjacent pairs of first and second constraining components 90A and 90B so that they may be adjusted to place the proper amount of tension on the portion of the transfer component 24 that spans between adjacent constraining components 90. The constraining components 90 isolate a portion of the transfer component 24 so that when an article 10 is pushed into the isolated portion of the transfer component 24, only the isolated portion of the transfer component 24 is stretched, and the adjacent portions of the transfer component 24 are not stretched.

Prior to and after clamping, there may be relative motion between the transfer component 24 and the constraining components 90. The transfer component 24 may be moved past the constraining components 90 at a constant velocity, or the velocity of the transfer component 24 may be varied, if desired. The movement of the transfer component 24 may be continuous, or if desired, intermittent. The constraining components 90 will be moving at the same velocity as the transfer component 24 after the constraining components are clamped onto the transfer component 24. After clamping, the transfer component 24 and constraining component conveyor 92 may move at a constant velocity, or the velocity of the transfer component 24 may be varied, if desired. The movement of the transfer component 24 and constraining component conveyor 92 may be continuous, or if desired, intermittent. The article 10 will be generally moving in the machine direction as well, but may also have a relative velocity towards the transfer component 24 until fully contacting the transfer component 24. After fully contacting, the article 10 and the transfer component 24 may have no relative motion but may travel together in the machine direction until the transfer is complete.

Figure 10A:
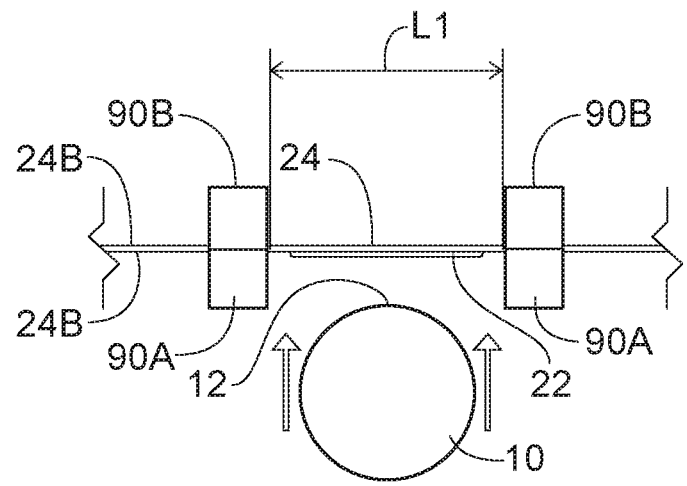
FIG. 10A is an enlarged schematic top view of one embodiment of a section of the apparatus shown in FIG. 8 showing the article before it is pushed into the transfer component.
Figure 10B:
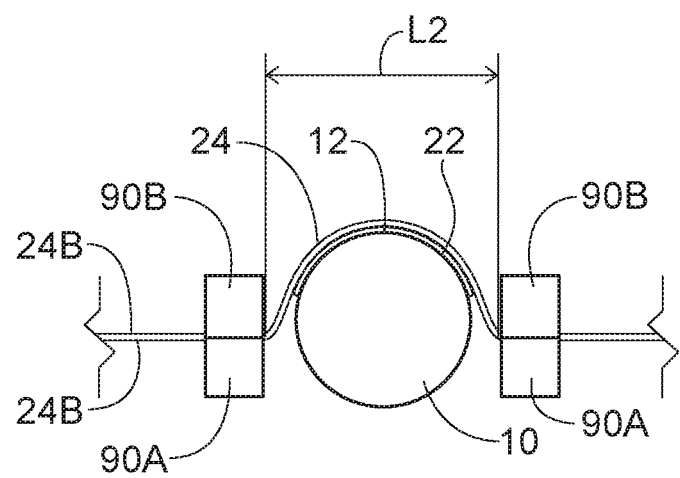
FIG. 10B is an enlarged schematic top view similar to that of FIG. 10A showing the article being pushed into the transfer component.

FIG. 10A shows an article 10 being brought into position (such as by a conveyor) in proximity with a portion along the length of the transfer component 24 that spans between two adjacent pairs of constraining components 90A and 90B. FIG. 10B shows the article 10 being pushed into this portion of the transfer component 24 in order to conform the transfer component 24 with the transfer material 22 thereon to the surface 12 of the article 10. The article 10 can be pushed into the transfer component 24 by any suitable mechanism. For example, a conveyor similar to conveyor 30 shown in FIG. 2 can be used to push the article 10 into the transfer component 24. Such a conveyor can comprise a first portion that is angled to bring the articles 10 into position along a path similar to the path along which the articles 10 are shown as moving in FIG. 8. At the location where the article 10 contacts the transfer component 24, the conveyor can comprise a second portion that runs parallel with the transfer component 24 and the constraining component conveyor 92 until the transfer is complete. Alternatively, the conveyor can be in the configuration of article conveyor 94 shown in FIG. 9. In other embodiments, a pushing or translating mechanism can be used to push the article 10 into the transfer component 24. Such a mechanism may be joined to the article conveyor, or it can comprise a mechanism adjacent to the article 10 when the article 10 is in aligned with the desired portion of the transfer component 24. Suitable pushing or translating mechanisms include, but are not limited to: air nozzles, and elements or rams that are connected to a servomotor or a linear motor.

Figure 11:
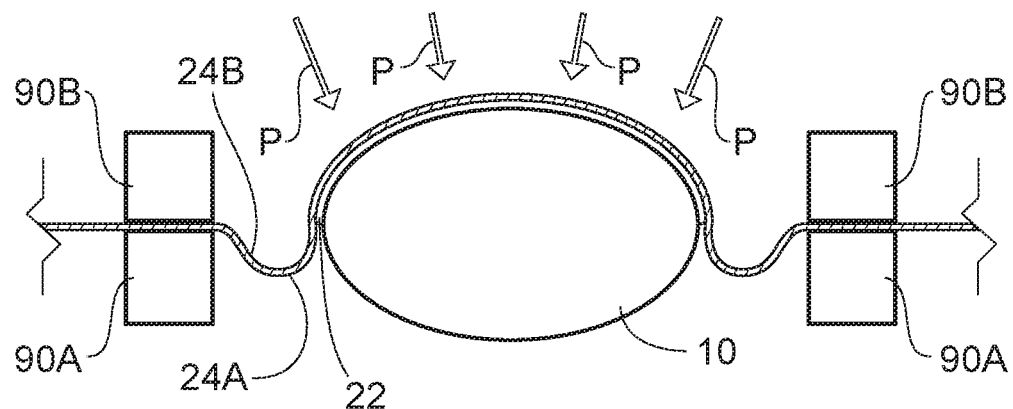
FIG. 11 is an enlarged schematic side view similar to that of FIG. 10B in which the transfer component with the transfer material thereon is brought into closer contact with the surface of the article by exerting a pushing force on the back side of the transfer component using air pressure.

As in the case of the first category of processes, it may also be desirable to further conform the transfer component 24 with the transfer material 22 thereon to the surface 12 of the article 10 in the second category of processes. FIG. 11 shows one non-limiting embodiment for bringing the transfer component 24 with the transfer material 22 thereon into closer contact with the surface 12 of the article 10. In this embodiment, the transfer component 24 with the transfer material 22 thereon is brought into closer contact with the surface 12 of the article 10 by exerting a pushing force on the back surface 24B of the transfer component 24 using air pressure, P.

Figure 12:
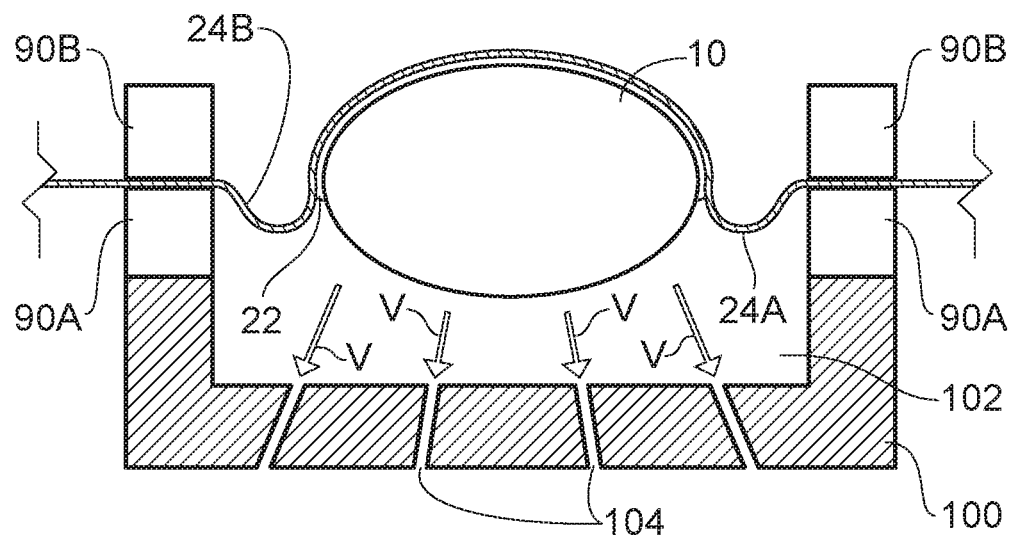
FIG. 12 is an enlarged schematic top view similar to that of FIG. 10B showing an embodiment for bringing the transfer component into closer contact with the surface of the article by exerting a force on the transfer component wherein the transfer component is pulled toward the article using a vacuum.

FIG. 12 shows a non-limiting embodiment for bringing the transfer component 24 with the transfer material 22 thereon into closer contact with the surface 12 of the article 10 by pulling the transfer component 24 toward the article 10. In this embodiment, a component 100 comprising a closed chamber 102 is brought adjacent to the conforming component 24 in order to form a substantially air tight seal around the portion of the transfer component 24 constrained between the pairs of constraining components 90A and 90B. Alternatively, the component 100 comprising the closed chamber 102 could be part of the article conveyor. Then, a vacuum, V, is drawn through conduits 104 in the component 100 comprising the closed chamber 102 The vacuum V exerts a pulling force on the transfer component 24 to further conform the portion of the transfer component 24 with the transfer material 22 thereon to the surface 12 of the article 10.

Figure 13:
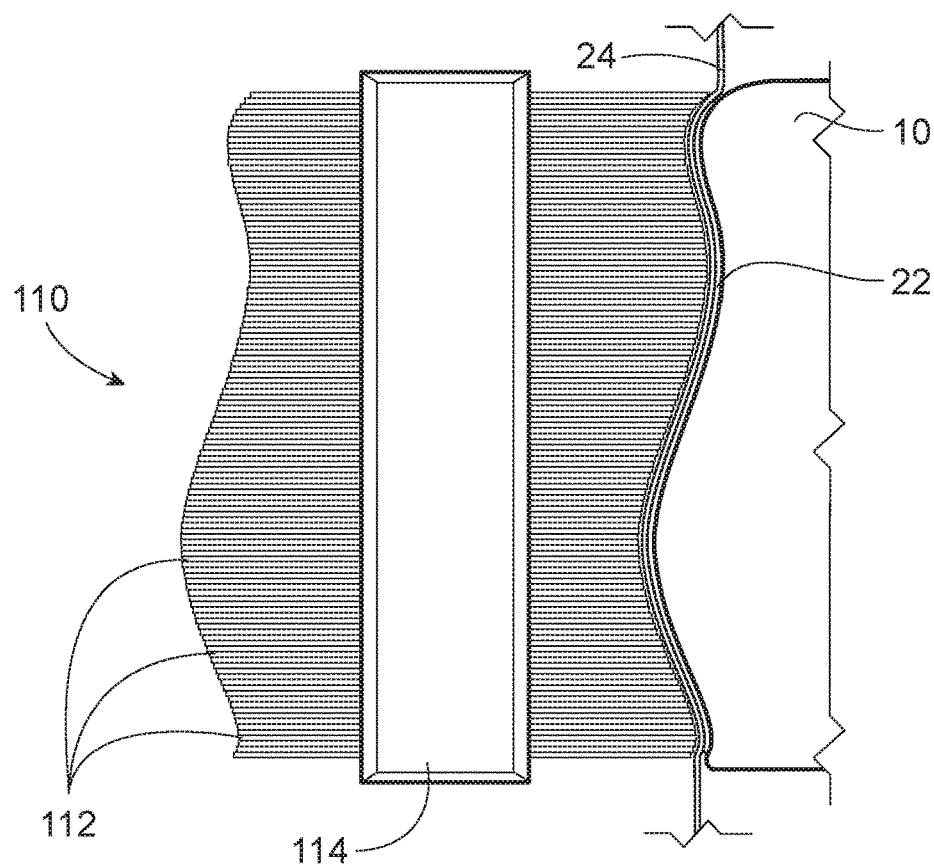
FIG. 13 is a side view of an alternative mechanism for conforming the transfer component to the surface of an article, which mechanism comprises a digitally conforming wiper.

FIG. 13 shows another alternative mechanism for bringing the transfer component 24 with the transfer material 22 thereon into closer contact with the surface 12 of an article 10. The mechanism shown in FIG. 13 is a digitally conforming wiper 110 that comprises plurality of elements 112 protruding from a holder 114. This mechanism can be constructed similarly to a profile gauge. The elements 112 may be extendable from and retractable into the holder 114. The elements 112 can be in any suitable configuration including in the configuration of pins with rounded ends. The elements 112 may be made of any suitable material including, but not limited to metal or plastic. When a relatively thin and flexible transfer component 24 with the transfer material 22 thereon is placed between the mechanism 110 shown in FIG. 13 and an article 10 with the transfer material 22 on the transfer component 24 facing the article 10, the mechanism can be used to further conform the transfer component 24 and transfer material 22 to the surface 12 of the article 10. The mechanism can vary the position of the elements 112 to conform the transfer component to different portions of the surface 12 of the article 10 as the article and the transfer component 24 are moved relative to the mechanism. In some cases, the mechanism, such as the digitally conforming wiper 110 can be stationary. In other cases, the mechanism 110 may move along or relative to the surface of the article 10 to squeegee out the entrapped air between the transfer material 22 and the surface 12 of the article 10.

Figure 14:
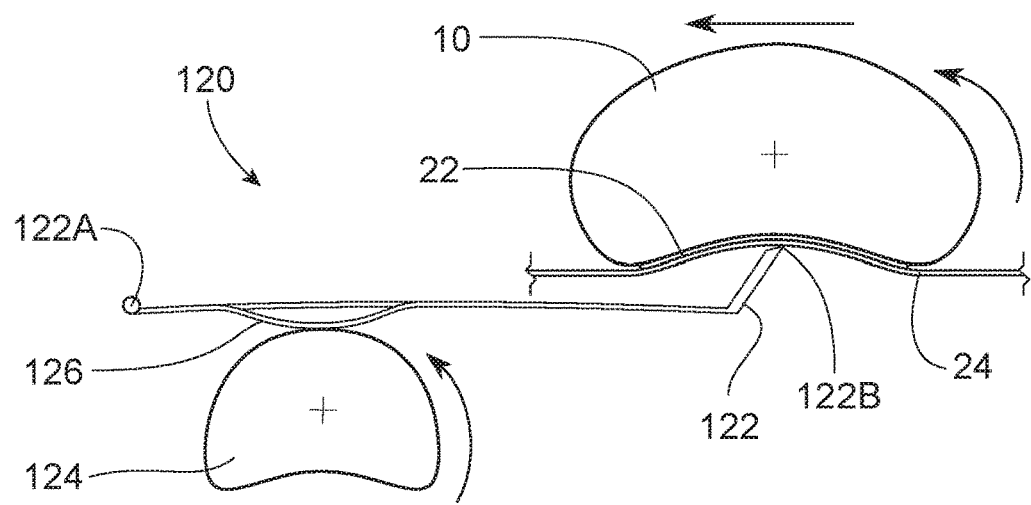
FIG. 14 is a top view of a cam mechanism for maintaining the transfer component in contact with the article.

FIG. 14 shows another alternative mechanism 120 for bringing the transfer component 24 with the transfer material 22 thereon in closer contact with the surface 12 of the article 10. This mechanism 120 comprises a plurality of articulating wipers 122 that are operatively associated with a cam 124. Only one wiper 122 is visible when viewed from the direction shown in FIG. 14. However, it understood that there are a plurality of similar wipers 122 behind the wiper shown (in a direction into the page). The wipers 122 may have a cam follower 126 thereon. The wipers may have a fixed end 122A and a free end 122B that is movable to follow the configuration of the surface of the article 10. The cam follower 126 interacts with a rotatable cam 124 that is configured to follow the configuration of the target surface of the article 10. The article 10 may rotate such as in the direction of the curved arrow shown in FIG. 14, or it may be movable in translation relative to the free end 122B of the wiper 122 (such as shown by the straight arrow). If it is desired to change to articles of a different configuration, this mechanism 120 can be adapted to work with articles of the new configuration by replacing the cam 124 with a cam that corresponds to the configuration of the new articles.

Figure 15:
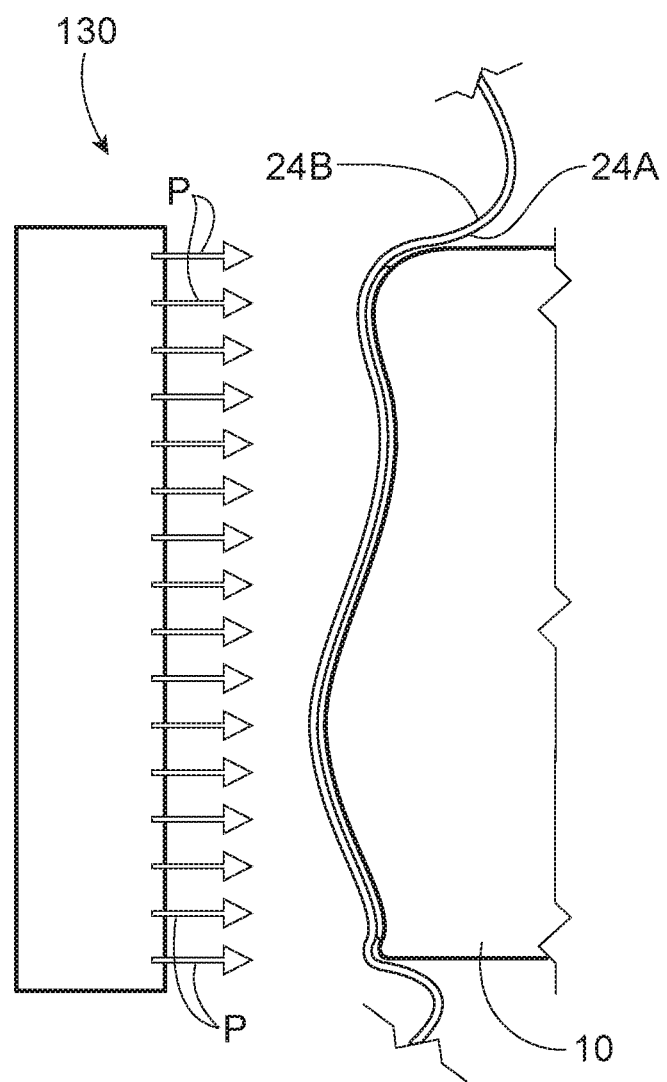
FIG. 15 is a schematic side view of a mechanism that uses air pressure in the form of a line of air for maintaining the transfer component in contact with the article.

FIG. 15 shows another mechanism 130 for bringing the transfer component 24 with the transfer material 22 thereon in closer contact with the surface 12 of the article 10. This mechanism 130 comprises an air pressure wiper. This mechanism uses air pressure in the form of a line of air that contacts the back surface 24B of the transfer component 24 as article 10 traverses by the mechanism 130. The mechanism 130 can, in some cases, be stationary. In other cases, the mechanism 130 may move along or relative to the surface of the article 10 to squeegee out the entrapped air between the transfer material 22 and the surface 12 of the article 10.

Figure 16:
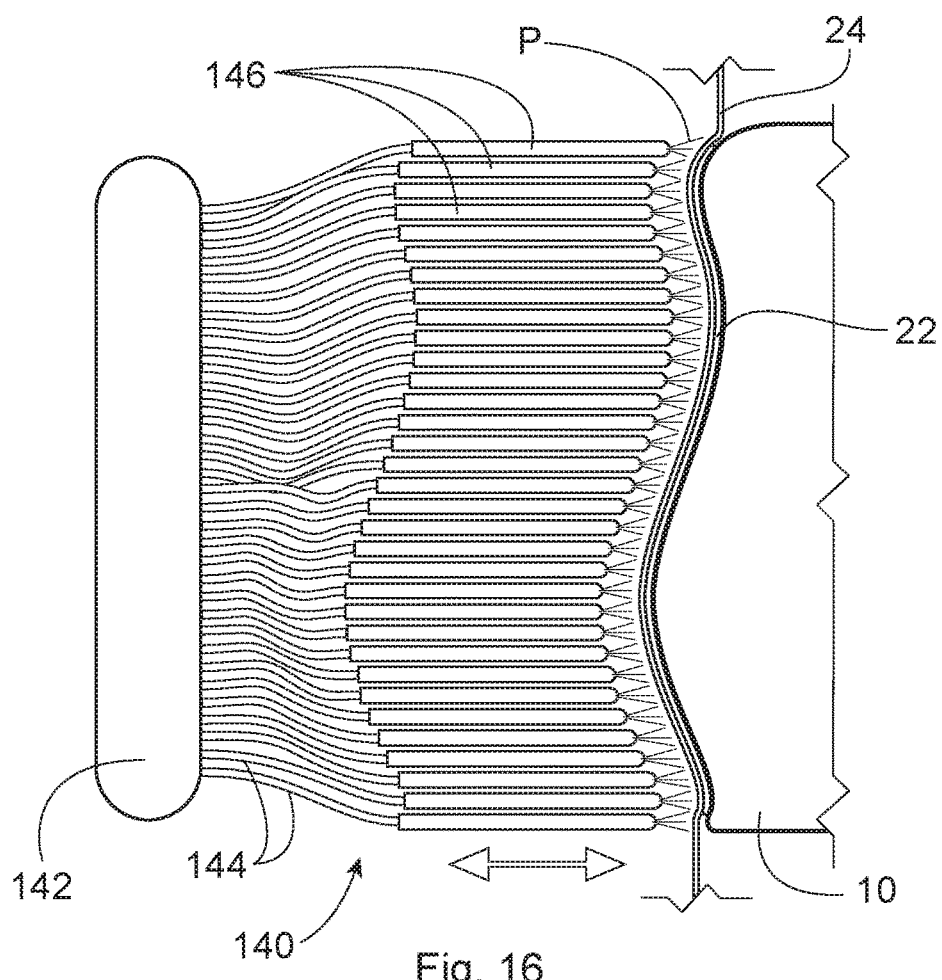
FIG. 16 is a schematic side view of a mechanism that comprises a plurality of separate air tubes and nozzles for maintaining the transfer component in contact with the article.

FIG. 16 shows another alternative mechanism 140 for bringing the transfer component 24 with the transfer material 22 thereon in closer contact with the surface 12 of the article 10. This mechanism 140 is an air pressure wiper. This mechanism 140 comprises an air source 142, a plurality of separate air hoses 144 and nozzles 146. The air nozzles 146 can each be connected to the air source 142 by the flexible air hoses 144. The air nozzles 146 may be held by a holder that allows them articulate toward and way from the surface 12 of the article (in the direction of the arrow). The mechanism shown in FIG. 16 is similar to the mechanism shown in FIG. 13 in that it is capable of exerting pressure at a plurality of locations on the back surface 24B of a relatively thin and flexible transfer component 24 that is placed between the mechanism and an article 10 in order to conform the transfer component 24 and transfer material 22 to the surface of the article. The embodiment shown in FIG. 16, however, exerts pressure using a plurality of air jets rather than with mechanical elements as in the mechanism shown in FIG. 13. Such a mechanism can, in some cases, be stationary. Alternatively, it can move along or relative to the surface of the article 10 to squeegee out the entrapped air between the transfer material 22 and the surface 12 of the article 10.

Figure 17:
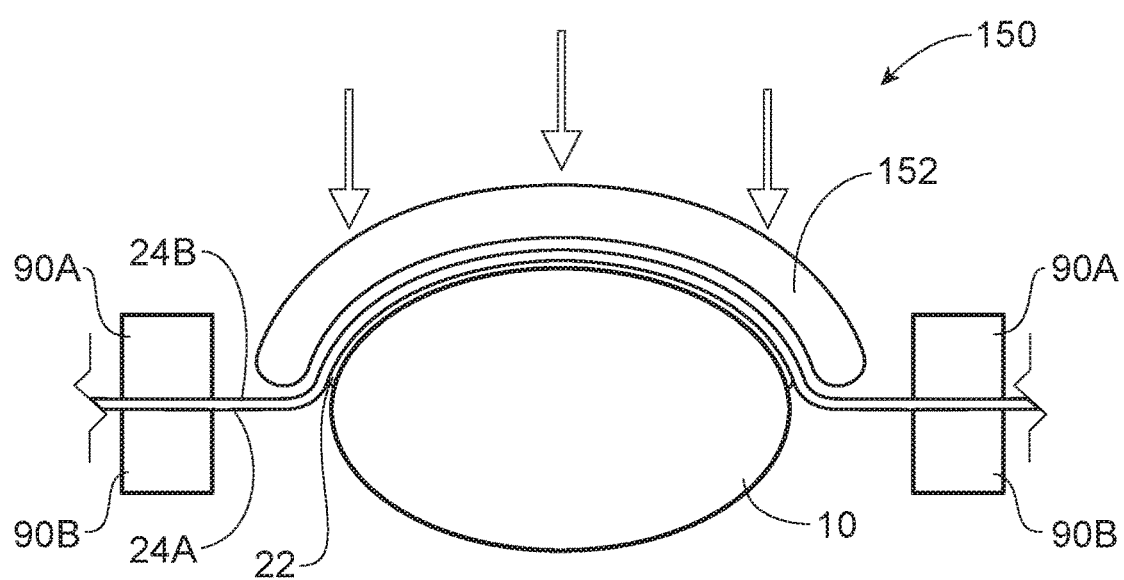
FIG. 17 is an enlarged top view of an embodiment for bringing the transfer component into closer contact with the surface of the article in the process and apparatus shown in FIG. 8 by exerting a pushing force on the back side of the transfer component using an inflatable bladder (shown in an inflated condition).

FIG. 17 shows another alternative mechanism 150 for bringing the transfer component 24 and transfer material 22 into closer contact with the surface 12 of the article in the process and apparatus shown in FIG. 8. This mechanism 150 exerts a pushing force on the back surface 24B of the transfer component 24 using a compliant element 152. The compliant element 152 can be any suitable type of component including, but not limited to a compliant material such as MEMORY FOAM®, or an inflatable bladder (shown in an inflated condition).

FIGS. 18A and 18B show another alternative mechanism 160 for bringing the transfer component 24 and transfer material 22 into closer contact with the surface 12 of the article in the process and apparatus shown in FIG. 8. In this embodiment, the mechanism 160 comprises a shaped back-up element 162 having a surface 164 that is configured to conform the transfer component 24 and transfer material 22 thereto to the shape of the target surface 12 of the article 10. FIG. 18A shows the transfer component 24 in partial conformance with the surface of the article before the step of pressing the shaped back-up element 162 against the back surface 24B of the transfer component 24. FIG. 18B shows the second step of using the shaped back-up element 162 shown in FIG. 18A to further conform the transfer component 24 and substance 22 thereon to the shape of the surface 12 of the article 10.

IV. Third Category of Processes.

Figure 19:
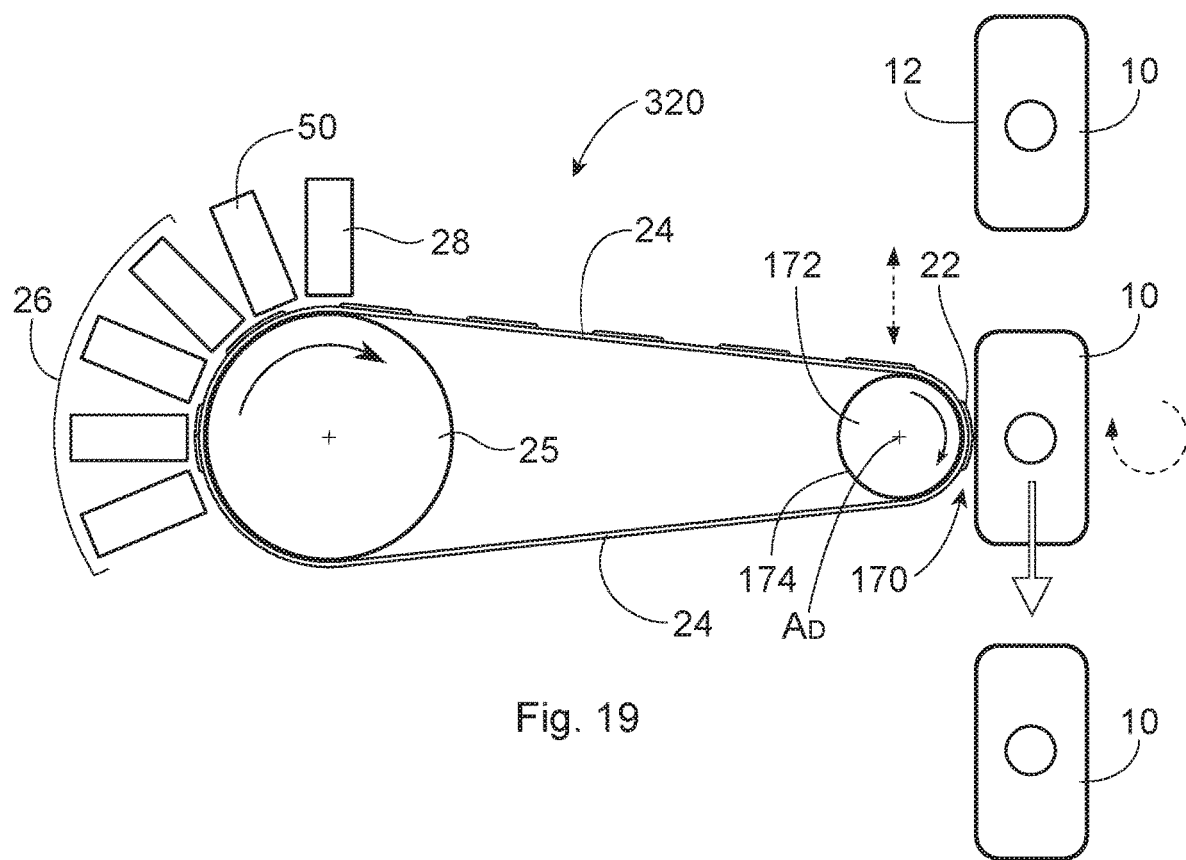
FIG. 19 is a schematic top view of a third type of a process and apparatus for applying a transfer material onto an article using a transfer process in which the transfer component is brought into contact with the surface of the article by passing the transfer component through a nip formed by the article and a shaped element.

FIG. 19 shows another apparatus 320 and method for applying a transfer material 22 onto the surface 12 of the articles 10. The embodiment shown in FIG. 19 can be considered to be an example of the third category of processes shown in the flow chart of FIG. 1C.

In the embodiment shown in FIG. 19, the transfer component 24 with the transfer material 22 thereon is brought into contact with the surface 12 of the article 10 by passing the transfer component 24 with the transfer material 22 thereon through a nip 170 that is formed by the surface 12 of the article 10 and the surface 174 of a shaped element, such as shaped die (or simply "die") 172.

As shown in FIG. 19, the apparatus 320 comprises a transfer component 24, a component providing a support surface for supporting the transfer component while printing such as cylinder 25, a substance deposition device 26, an optional adhesive deposition device 28, and shaped die 172. The articles 10 can be moved into the nip 170 by any suitable type of conveyor. The articles 10, the apparatus 320 orientation (horizontal, vertical, or other), the components of the apparatus 320 shown in FIG. 19, including the transfer component 24, the substance deposition device 26 (and substance deposited thereby), optional adhesive deposition device 28, optional energy source(s), optional decoration station(s), and the conveyor may have any of the properties described in preceding sections of this Detailed Description, and, therefore, a description of these components and their properties will not be repeated herein. The transfer component 24 is shown in FIG. 19 in the form of an endless belt that travels around the cylinder 25 and the shaped die 172.

The shaped die 172 can be any suitable component that is capable of forming a nip 170 with the surface 12 of an article 10 and is configured to force the transfer component 24 with the transfer material 22 thereon into close contact with the target surface of the article 10. The shaped die 172 can be of any suitable configuration. The shaped die 172 can have a surface 174 comprising portions that are planar, concave, convex, or combinations thereof. The overall configuration of the shaped die 172 will depend on the motion that the die 172 undergoes during the process.

There can be any suitable type of relative motion between the article 10 and the shaped die 172. The articles 10 may either be translated or rotated through the nip 170. The shaped die 172 may also either be translated or rotated through the nip 170. The articles 10 and the shaped die 172 may be movable by the same type of motion (e.g., both may rotate; or both may translate). In other embodiments, the type of movement of the articles 10 and the shaped die 172 may differ. For example, the articles 10 may move by translation, and the shape die 172 may move by rotation. Alternatively, the articles 10 may rotate and the shaped die 172 may move by translation.

As shown by the solid arrows in FIG. 19, the shaped die 172 may be rotatable about an axis $A_D$, and the articles 10 may move in translation. Alternatively, as shown by the dashed arrows, the shaped die 172 may move in translation, and the articles 10 may be rotatable about an axis such as their own axis. In the latter case, the die 172 may be in the configuration of a translating plate. The plate may be translated to match the rotational surface speed of the article 10.

Figure 20:
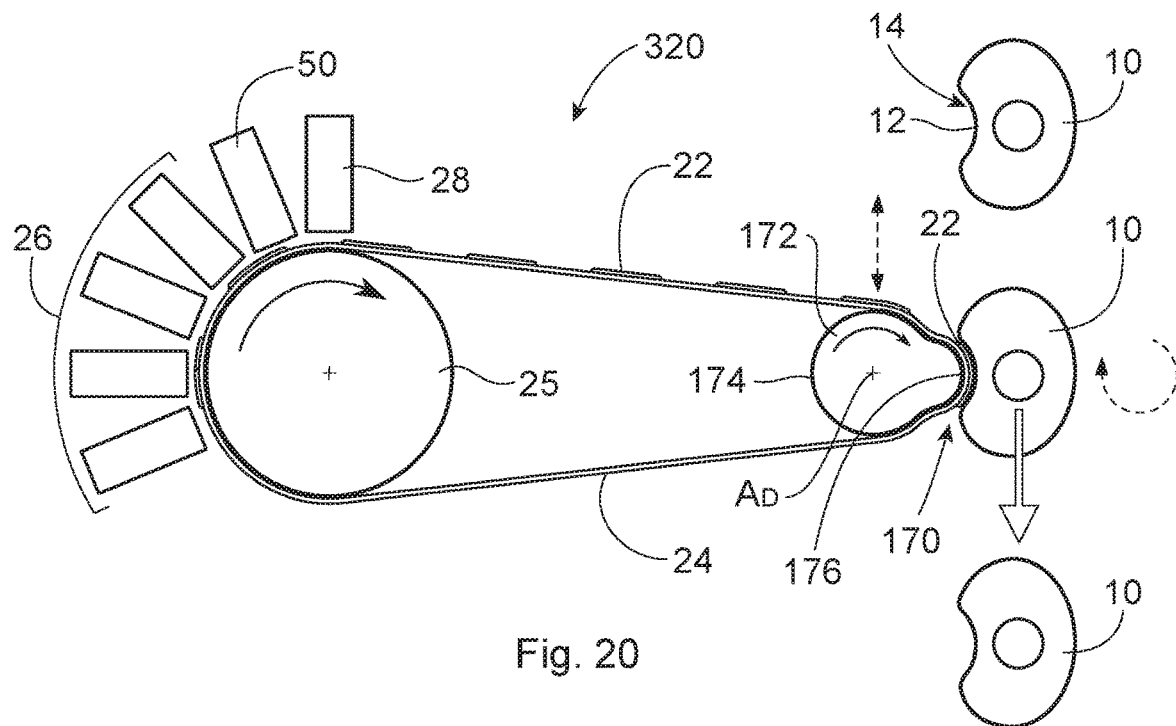
FIG. 20 is a schematic top view of an alternative embodiment of the third type of process and apparatus for applying a transfer material onto an article shown in FIG. 19 which comprises a shaped nip to conform to the contour of the article.

FIG. 20 shows a variation of the apparatus 320 shown in FIG. 19 in which the target surface 12 of the article 10 has a concavity 14 therein. In this embodiment, a portion of the surface 174 of the shaped die 172 may comprise a protrusion 176 that protrudes outwardly away from the axis $A_D$. The protrusion 176 is substantially configured to force the transfer component 24 with the transfer material 22 thereon into close contact within the concavity 14 in the surface 12 of the article 10. A shaped die 172 with such a configuration is useful where article 10 has non-cylindrical cross section.

Figure 21A:
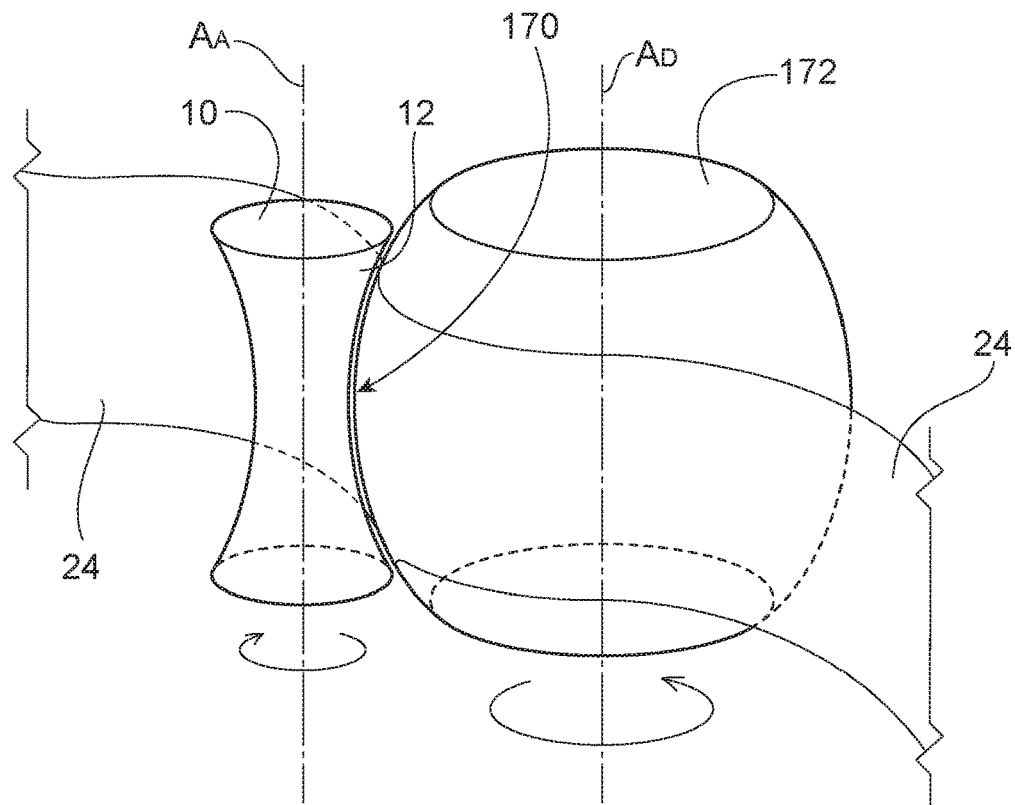
FIG. 21A is a schematic perspective view of an axially symmetric die for maintaining the transfer component in contact with the article.
Figure 21B:
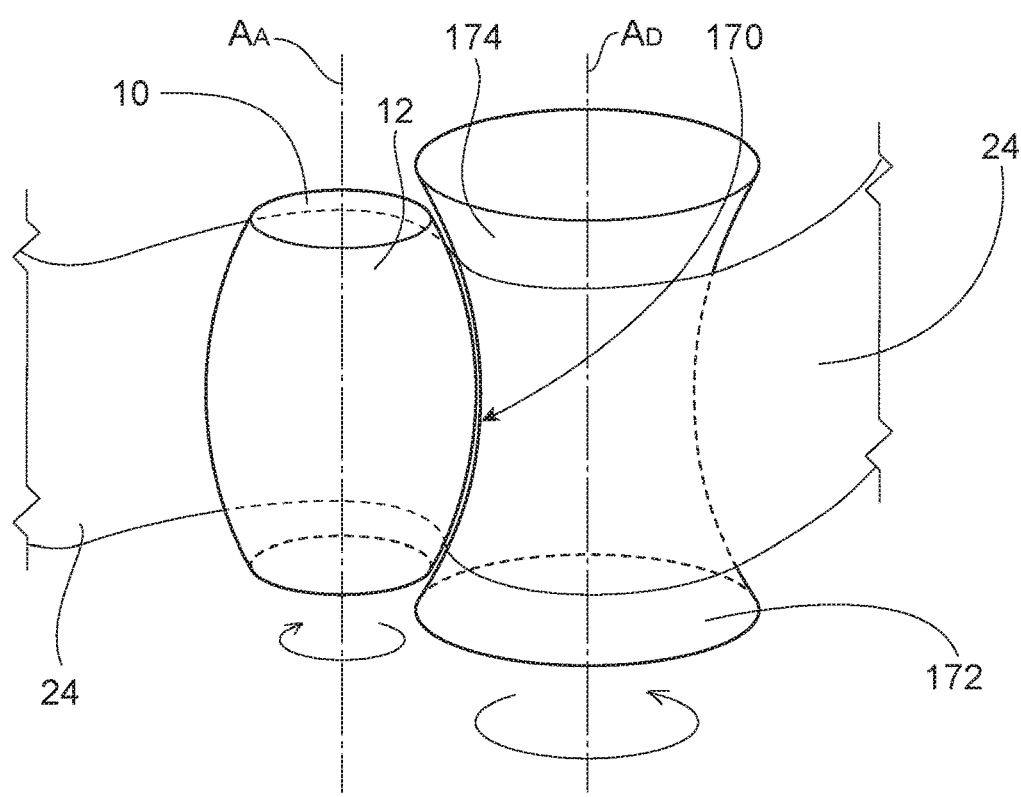
FIG. 21B is a schematic perspective view of another axially symmetric die for maintaining the transfer component in contact with the article.

FIGS. 21A and 21B show two examples of apparatuses of the type shown in FIG. 19 that have shaped elements that are symmetrical about their axis of rotation $A_D$ (axially-symmetrical dies) for maintaining the transfer component 24 in contact with the article 10. FIG. 21A shows an embodiment in which the nip 170 is formed between an article 10 having a surface with a concave curvature and a shaped die 172 comprises an element with a convex curvature. FIG. 21B shows an alternative embodiment in which the nip is formed between an article 10 having a surface with a convex curvature and a shaped die in which at least a portion of the shaped die has a concave configuration. If the articles in these embodiments 10 have other than a circular cross-section (e.g., are oval), the axis AA of the article and/or the die can be mounted so that they can move towards and/or away from each other as the article and the die rotate to adjust to the configuration of the article.

The apparatus 20 may further comprise one or more additional stations or devices that are positioned at any desired location along the article conveyor. Such additional devices may include, but are not limited to pre-treatment devices for pre-treating the surface of the articles, such as flame treatment, corona treatment, and plasma jet treatment devices.

Figure 22:
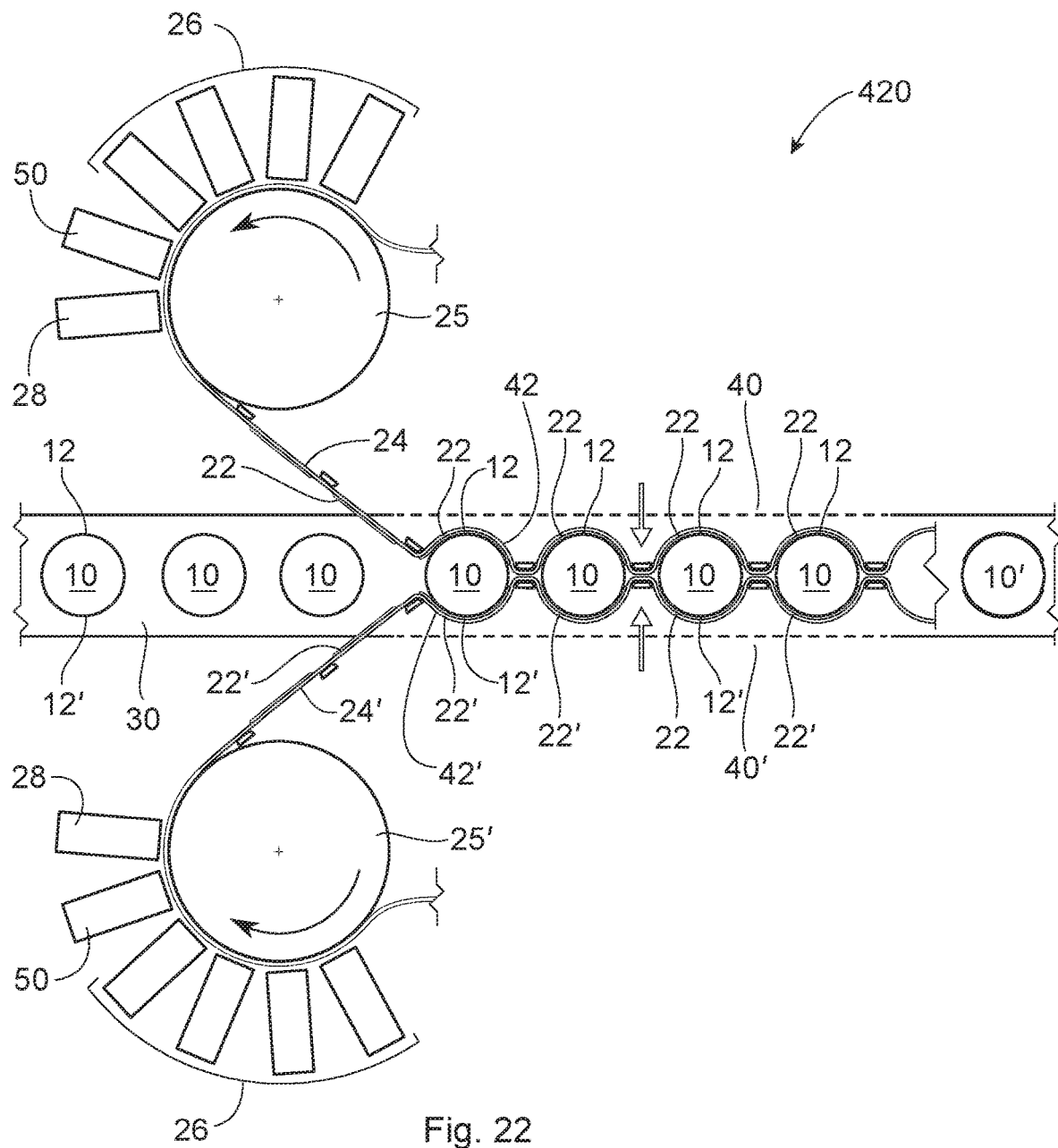
FIG. 22 is a schematic top view of one embodiment of a process and apparatus for applying a transfer material onto two sides of an article using a transfer process.

Numerous variations of the embodiments described herein are possible. For example, FIG. 22 shows a variation of the embodiment shown in FIG. 8 which has two transfer components 24 and 24' which are capable of transferring a separate transfer material to two portions of the surface 12 and 12' of an article 10. The articles 10, the apparatus 420 orientation (horizontal, vertical, or other orientation), the components of the apparatus 220 shown in FIG. 8, including the transfer component 24, the deposition device 26 (and material(s) deposited thereby), the optional adhesive deposition device 28, and the constraining components may have any of the properties, or be in any of the forms, and include any of the optional additional devices (such as optional decoration station(s), and energy sources) described in conjunction with FIG. 8. Therefore, a description of these components and their properties will not be repeated herein.

The portions of the surface 12 and 12' may be opposing portions of the surface (e.g., on opposite sides of the article) and/or portions of the surface that may be spaced apart. The opposite sides can, for example, be the front and the back of the article; or, two different sides of the article. In such cases, or in other cases, however, some or all portions of the surface 12 and 12' to which the apparatus is capable of transferring material need not be opposing portions, and some or all portions of the surface 12 and 12' may be contiguous and, thus not spaced apart. In one non-limiting example of the former, one transfer material could be applied to at least a portion of the front of the article and may also wrap around a portion of the bottom of the article. Another transfer material could be applied to at least a portion of the back of the article and also wrap around a portion of the bottom of the article. Since both transfer materials wrap around a portion of the bottom of the article, the portions that wrap around the bottom of the article would not be considered to be on opposing surfaces of the article since they would both be disposed on the bottom of the article.

In the embodiment shown in FIG. 22, two transfer components 24 and 24' are provided, with each one alongside one of the sides of the articles 10, and the articles therebetween. It should be understood that the transfer components 24 and 24' can be brought into contact with the articles 10 from different angles including but not limited to pivoting from the side of the articles, pivoting from the top of the articles, pivoting from the bottom of the articles, or through parallel engagement. Once the transfer components are brought into contact with the articles 10, a vacuum port can be inserted between the two transfer components 24 and 24', and this is used to draw both transfer components into closer contact with the surface of the article. The embodiment shown in FIG. 22 can be used in a continuous high speed process in which the multiple articles are being decorated simultaneously, but on progressive timing (each article being processed is at different state of process than neighboring articles).

Figure 22A:
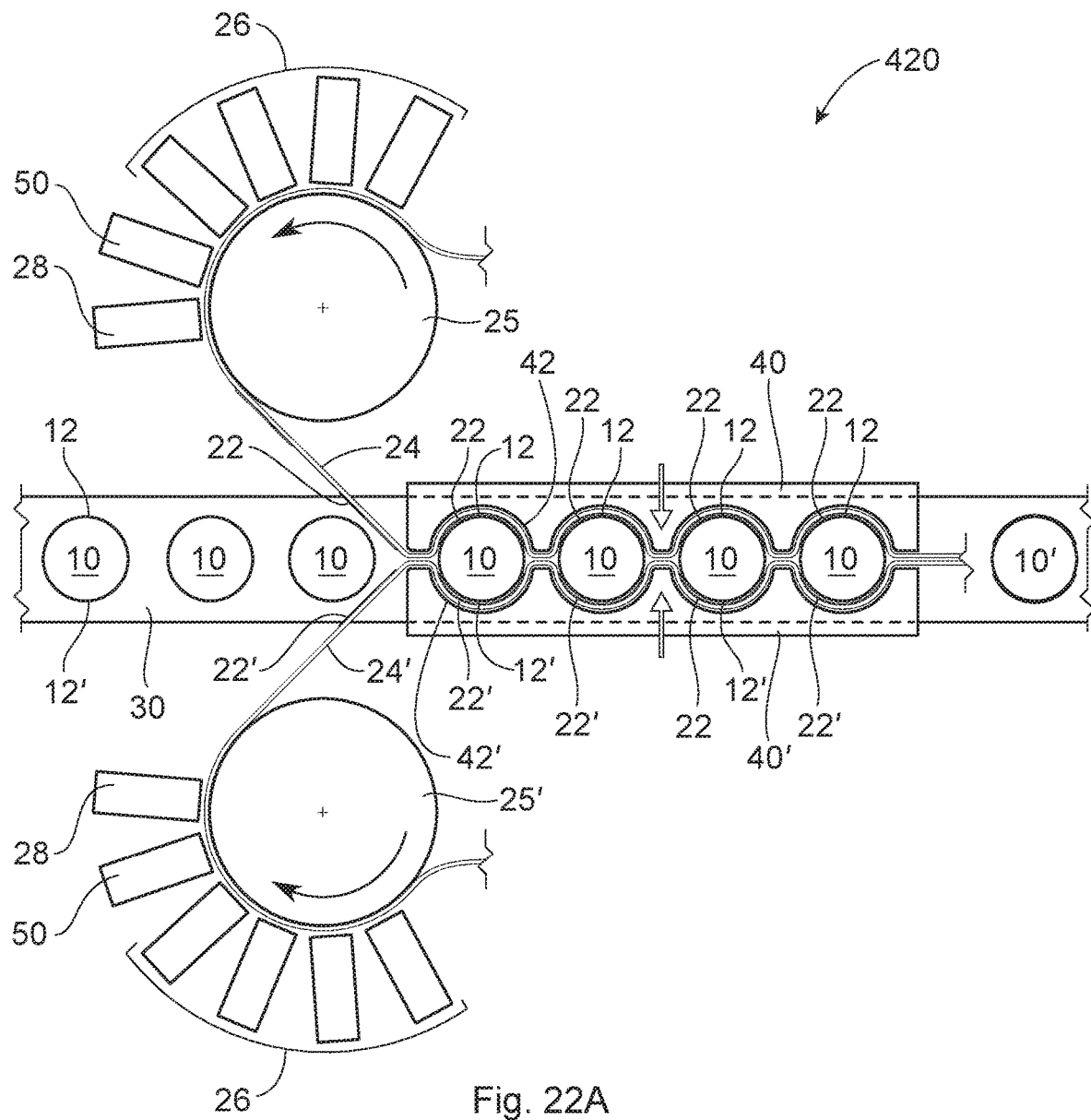
FIG. 22A is a schematic top view of another embodiment of a process and apparatus for applying a transfer material onto two sides of an article using a transfer process.

FIG. 22A shows a variation of the embodiment shown in FIG. 2 which is capable of transferring a transfer material to two portions of the surface 12 and 12' of an article 10. The portion of the apparatus 420 shown in FIG. 22 that is at the top of FIG. 22A is similar to the apparatus 20 shown in FIG. 2. The conveyor at the bottom of FIG. 2 is, however, replaced with a second conforming component 40' having a series of second cavities 42' therein. The second transfer component 24' may be brought into contact with a second surface 12' of the articles 10. In the case of the apparatus 20 shown in FIG. 22A, the second transfer component 24' may be brought into contact with the second portion of the surface of the articles 10 by first modifying the second transfer component 24' by drawing/deforming a portion of the second transfer component 24' with a second transfer material 22' thereon into one of the second cavities 42' of the second conforming component 40' such that the second transfer material 22' is facing the second portion of the surface 12' of the article 10. The article 10 is then brought into alignment so that the target portion of the second portion of the surface 12' of the article 10 is within the second cavity 42'. The embodiment shown in FIG. 22A can be thought of as a walking beam type execution which will decorate multiple articles on identical timing.

Figure 23:
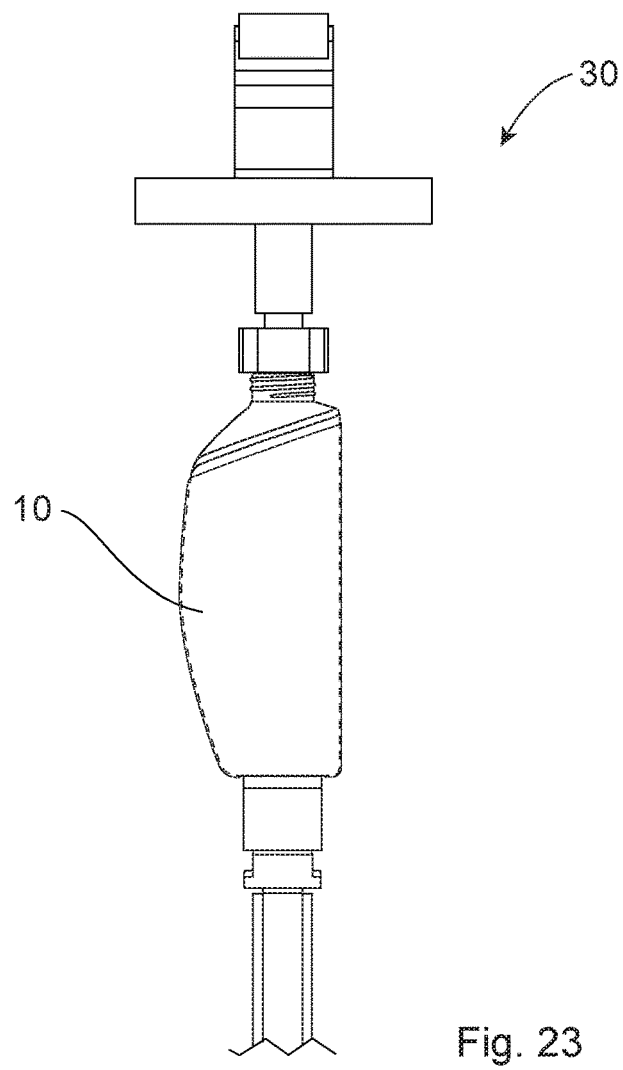
FIG. 23 is a side view of a portion of one embodiment of a conveyor that can be used in the process and apparatus shown in FIG. 22.

In the embodiments shown in FIGS. 22 and 22A, the articles 10 may be conveyed between the first and second transfer components 24 and 24' by any suitable type of conveyor 30. A portion of the article holders of one type of conveyor that can be used is shown in greater detail in FIG. 23. As shown in FIG. 23, the articles 10 can be held at their top and bottom so that their sides can be contacted by the transfer components 24 and 24'. The base holder or platform can be of any suitable size and shape. In the embodiment shown, the dimensions of the base holder are smaller than that of the base of the article. This provides clearance so that the transfer material may be applied to and/or wrapped at least partially around onto the bottom surface of the article.

The apparatuses shown in FIGS. 22 and 22A are only two examples of apparatuses suitable for transferring a substance to two portions of the surface of an article. Any of the other apparatuses described herein may be similarly modified for transferring a substance to two or more portions of the surface of an article.

Figure 22B:
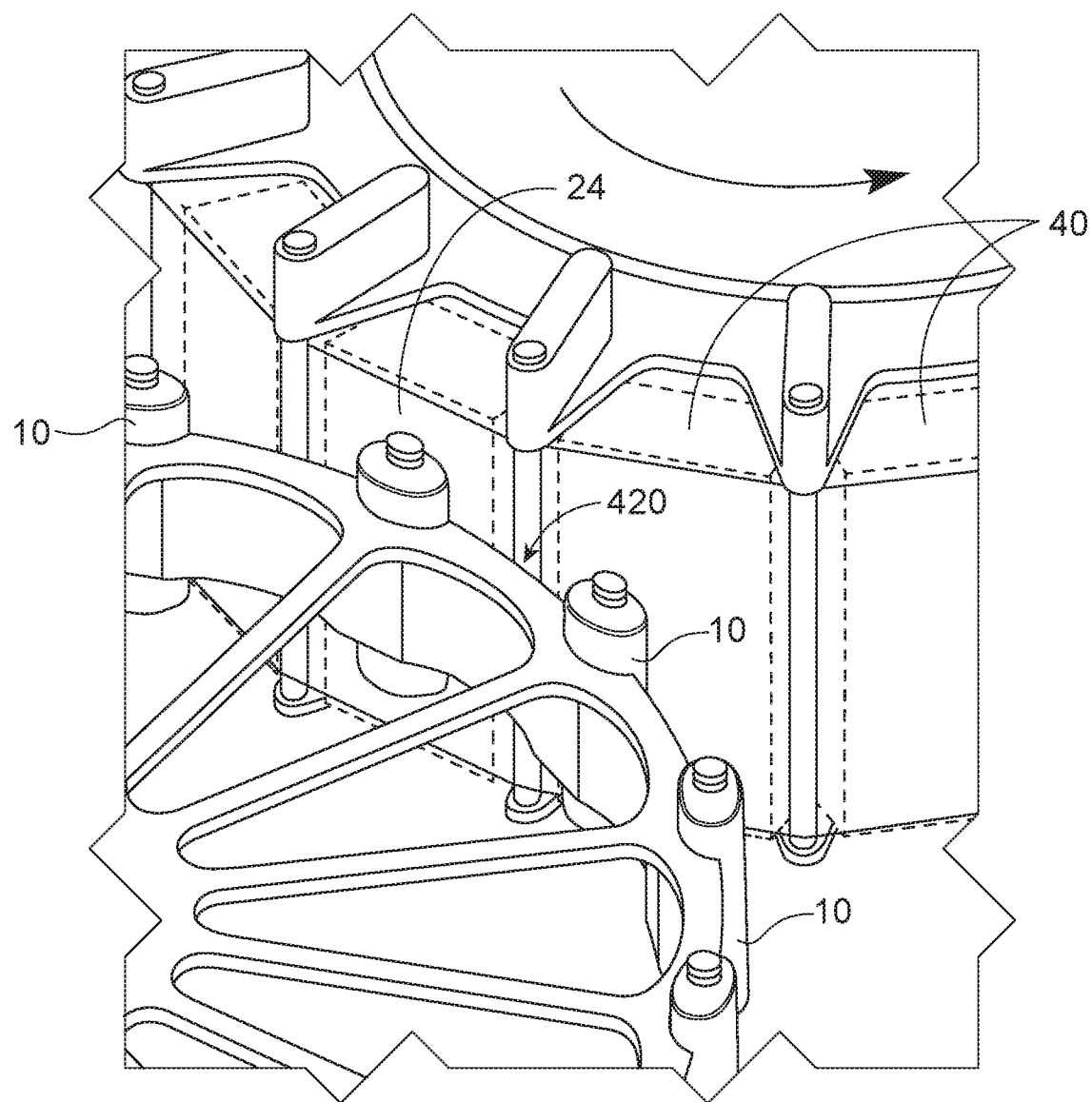
FIG. 22B is a perspective view of a portion of an apparatus for yet another alternative embodiment.

FIG. 22B shows an embodiment in which the conforming component 40 is brought into the process at a single location where it makes contact with a single article. As shown in FIG. 22B, the articles, such as bottles 10, may be brought into the process by a conveyor, such as a rotating conveyor. The conveyor brings the articles 10 into contact with a transfer component 24 that is disposed between the articles 10 and the conforming component 40. In this embodiment, the conforming components 40 are shown in the form of generic rectangular boxes. The rectangular boxes represent a conforming component 40 of any suitable type or configuration. Such an embodiment is particularly suitable for using a compressible conforming component such as a foam backer, or a conforming mechanism such as air jets and the other conforming mechanisms such as those shown in FIGS. 13-17.

Figure 24:
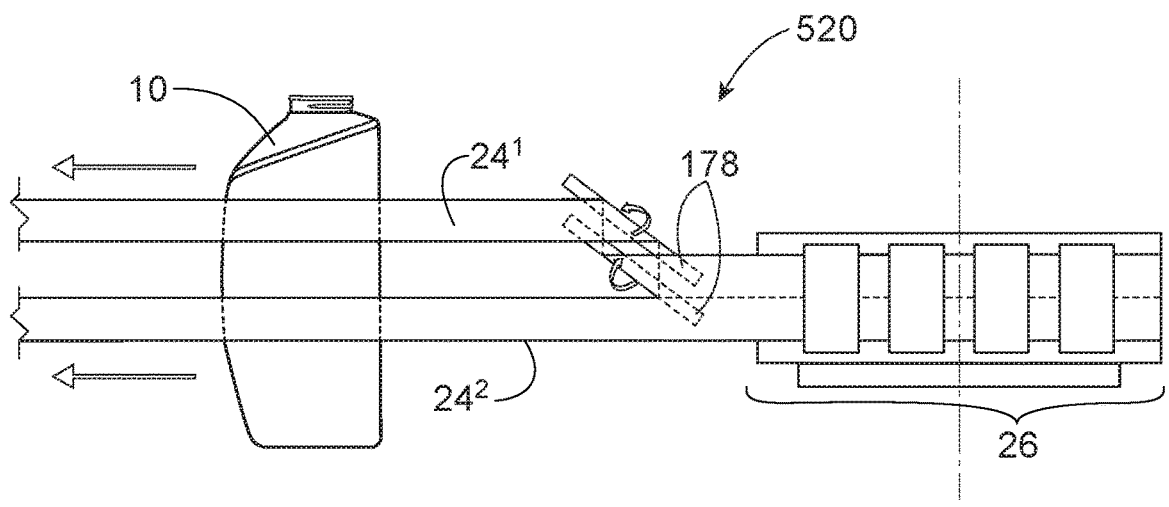
FIG. 24 is a schematic side view of a portion of one embodiment of an apparatus for applying a transfer material to spaced apart locations on the surface of an article.

FIG. 24 shows a portion of another variation of an apparatus 520 that is suitable for applying a transfer material to separate locations on the surface 12 of an article 10. The apparatus shown in FIG. 24 has the advantage that it is able to apply separate transfer materials 22 to different parts of the surface 12 of an article 10 using a single set of deposition devices 26. The apparatus also provides a great deal of flexibility in terms of the portions of the surface 12 of an article 10 to which the separate transfer materials 22 are applied. In some cases, the apparatus shown in FIG. 24 can apply a transfer material 22 to spaced apart locations on two parts of the same side of the surface 12 of an article 10. In other cases, the apparatus shown in FIG. 24 can apply a transfer material 22 to separate locations on two different sides of the surface 12 of an article 10.

In this embodiment, the transfer component 24 may be transported past a printing station comprising a substance deposition device 26. The transfer component 24 may then be transported past an optional curing device, and an optional adhesive application device (similar to those shown in the other drawing figures herein). Following the application of the desired substances to the transfer component 24, the transfer component 24 is separated longitudinally into separate webs. The transfer component 24 can be separated into separate webs in any suitable manner. In some cases, the transfer component 24 may comprise multiple side-by-side webs that are merely diverted such as by turning bars 178 to separate the same. In other cases, the transfer component 24 may be slit to separate the webs. In this case, the first web, upper web $24^1$, applies the transfer material 22 to a first portion, such as an upper portion, on the surface of an article 10. The second web, lower web $24^2$, applies the transfer material 22 to a second portion, such as a lower portion, on the surface of an article 10.

The embodiment shown in FIG. 24 is not limited to separating the transfer component 24 into two separate webs. The transfer component 24 may be separated into three or more separate webs. In addition, the separate webs are not required to be of equal width as measured in the cross-machine direction. The widths of the separate webs can be in any suitable ratios relative to each other. This embodiment is also not limited to applying the transfer material 22 to an upper portion and a lower portion on the article. The two portions on the surface of the article 10 only need to be separated by a greater distance than they were during the application of the substance(s) on the transfer component 24. This embodiment provides the advantage that a single printing station can create a transfer material 22 for spaced apart locations on the surface of an article 10.

In addition, depending on the arrangement of the turning bars 178, the embodiment shown in FIG. 24 can be used to transfer a transfer material 22 to two opposing sides (such as 12 and 12' in FIG. 22) of an article 10.

Figure 25:
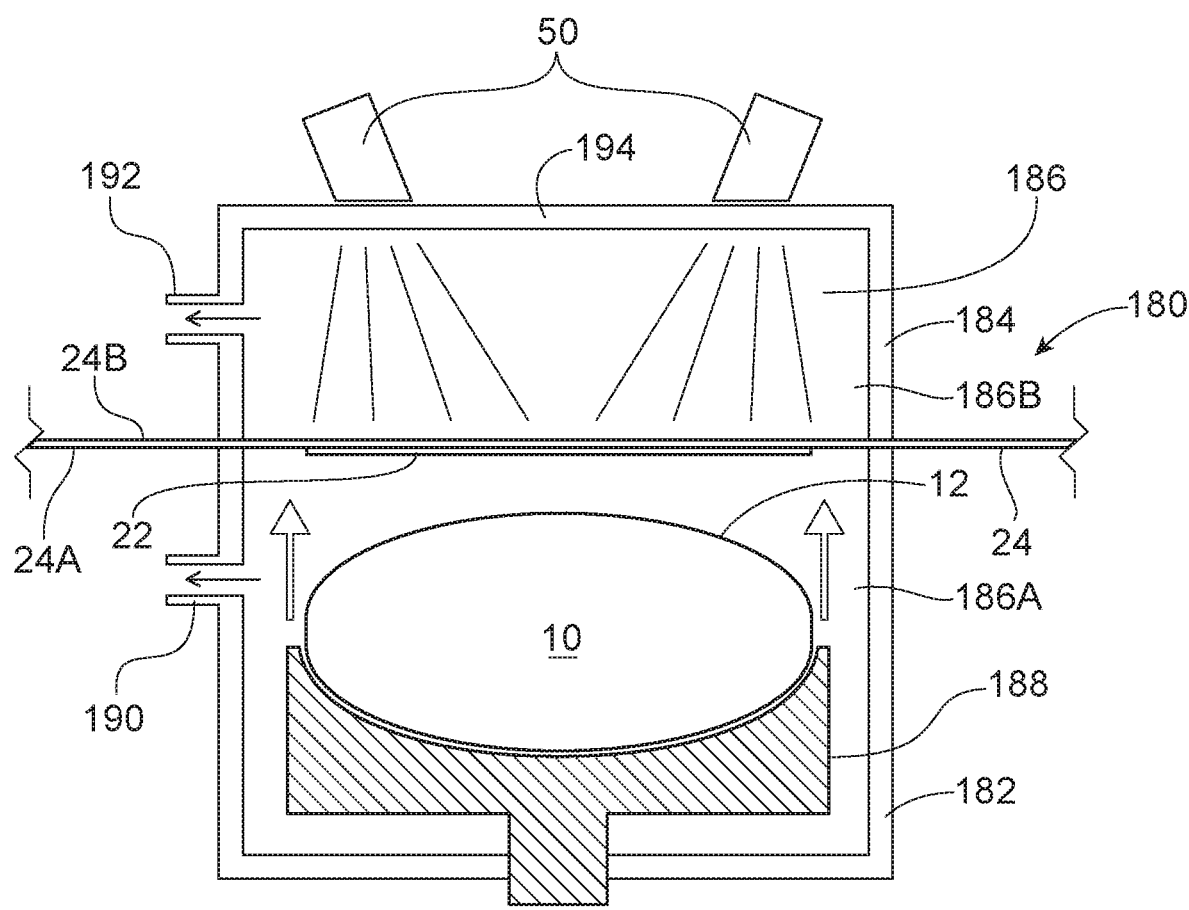
FIG. 25 is a schematic side view of an optional step of evacuating the air between the transfer material and the target surface of the article before the target surface of the article and the transfer material are brought into contact with each other.

FIG. 25 shows a further optional process variation for removing entrained air between the target surface 12 of an article 10 and the transfer material 22. Such a process variation can be used, for example, in the first and second categories of processes described herein. This variation is particularly useful in avoiding trapping air bubbles between the transfer material 22 and the surface 12 of the article 10. In this process variation, an air tight chamber 180 is formed around the transfer component 24. In the variation shown in FIG. 25, this may be done by providing two components 182 and 184 that form a closed chamber. In general, a balanced vacuum is created on both sides of the transfer component 24, and then air is removed between the transfer material 22 and the surface 12 of the article 10 by adjusting the air pressure in the different portions of the chamber 180 through ports 190 and 192. This optional process variation may be used regardless of whether the transfer component 24 with the transfer material 22 thereon is impervious to air, or air pervious, although air impervious transfer components 24 may be advantageous.

The particular embodiment shown in FIG. 25 is an example of the use of this process variation in the second category of processes described herein. More specifically, in this embodiment, the transfer component 24 is held in tension within the chamber 180. The article 10 is then pushed into the transfer component 24 to conform the transfer component 24 with the transfer material 22 thereon to the surface of the article 10.

While the vacuum is retained in the portion 186A of the chamber enclosing the first surface 24A of the transfer component 24 (the surface adjacent to the article 10), the air pressure is increased in the portion 186B of the chamber on the opposite surface 24B of the transfer component 24. This provides additional force to push the transfer component 24 against the surface 12 of the article 10. The air pressure can be increased in the portion 186B of the chamber on the opposite surface 24B of the transfer component 24 in any suitable manner, including by venting this portion of the chamber to the atmosphere, and by adding air to this portion of the chamber through port 192. In some cases, it may be desired to have a slight positive pressure differential in the portion 186B of the chamber on the opposite surface 24B of the transfer component 24 so that the transfer component 24 bends toward the article 10 before the article 10 is pressed into the transfer component 24.

Any curing of the transfer material 22 (or portions thereof such as curable adhesives or varnishes) on the surface 12 of the article 10 can then take place, such as by UV light, etc. In order to cure by UV light, the component 184 on the side of the transfer component 24 opposite the article 10 can have a window 194 therein that is made of a transparent material such as glass, PLEXIGLAS®, or other transparent material. The transfer component 24 should also be transparent to UV light. In cases in which the transfer material 22 comprises a heat curable component, this component can be cured by heat using a heating element located inside the chamber 186. Of course, it the adhesive is not of a type that requires curing by an energy source, such as a pressure sensitive adhesive or a 2-part adhesive chemistry, then it is not necessary to use any energy source. The transfer component 24 transfers the transfer material 22 to the surface 12 of the article 10 and is then removed from contact with the surface 12 of the article 10. This optional process variation may reduce the amount of air that is trapped between the transfer component 24 with the transfer material 22 thereon and the surface 12 of the article 10 so that there are no visible air bubbles after the transfer material 22 is adhered to the article 10.

Figure 7:
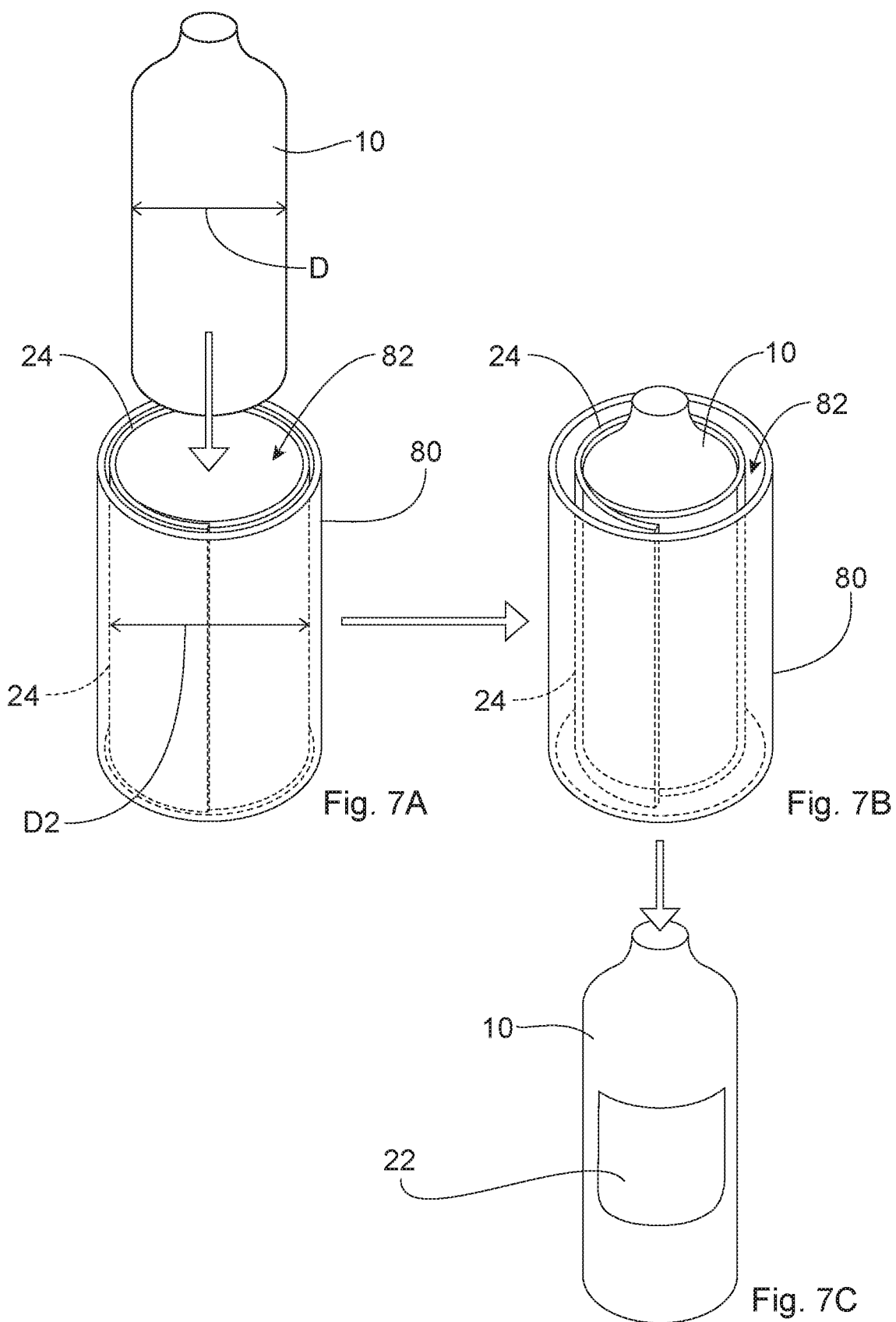
FIG. 7A is a perspective view of an initial step of an embodiment in which the transfer component is formed into a shrink tube inside a cavity for wrapping the transfer component around an article.
FIG. 7B is a perspective view of a subsequent step of the embodiment shown in FIG. 7A in which the transfer component is wrapped around the article.
FIG. 7C is a perspective view of the article with the transfer material applied thereto.

In the case of the first category of processes, similar adjustments to the pressure on either side of the transfer component 24 can be made by using an element 40 with a cavity 24 therein such as that shown and described in FIG. 6 in conjunction with a component 70 comprising a closed chamber 72 as shown and described in FIG. 7.

The methods and apparatuses described herein are particularly useful for transfer printing on articles with curved surfaces. For instance, instead of attaching a pre-printed label to an article such as a bottle, the apparatus and method can be used to transfer the subject matter of the label on the article. Of course, the apparatus and method are not limited to printing subject matter which serves as a label on the articles. The apparatus and method are also useful in indirectly printing designs and the like on articles.

The transfer processes and apparatuses described herein may provide a number of advantages. It should be understood, however, that such advantages are not required to be present unless set forth in the appended claims. The processes and apparatuses may be capable of decorating portions of articles that are currently difficult to print by direct printing, or transfer processes. Specifically, the processes described herein can be capable of transferring a transfer material from the transfer component to articles with complex three-dimensional shapes and/or which have surface features that differ in height (or depth) by more than a limited extent. The transfer processes described herein provide several advantages over conventional compressible pads that are used for transferring materials, including the advantage that the thickness of the transfer component 24 does not vary extensively when transferring the transfer material to an article, and thus reduces and variations in the printed image that may occur over time due to wear on a compressible pad. The transfer process described herein may also provide advantages over methods that use a conventional transfer pad to transfer the material in which air can be trapped between a depression in the surface of the article and the transfer pad. These and at least some of the other distinctions and advantages over various known methods and articles produced by such methods are described below.

The transfer methods and articles described herein provide advantages over heat transfer label processes and screen printing processes and the articles formed thereby in that heat transfer label processes and screen printing processes are not believed to be capable of forming a continuous image on multiple portions of the surface of a three-dimensional article as described herein. The transfer methods and articles described herein provide advantages over vacuum sublimation processes and hydrographic processes and the articles formed thereby. The inks applied to articles by vacuum sublimation processes penetrate into the surface of the articles, and the inks applied to articles by hydrographic (water transfer printing) processes are etched into the surface of the articles. This makes these articles less suitable or unsuitable for recycling (which requires removal of the inks) than the articles formed by the transfer methods described herein on which the inks are applied on top of the surface (and may follow any contours on the surface, such as small waviness which may be present on plastic surfaces), but do not penetrate into the surface, and thus can be substantially completely removed for recycling and/or during a recycling process.

The transfer methods and articles described herein provide additional advantages over hydrographic processes and the articles formed thereby. Such processes are relatively slow and involve: preparing the surface of the substrate; priming the surface; painting the surface; and, processing the substrate by preparing a printed water-soluble polyvinyl alcohol film which is believed to utilize solvent-based ink, placing the film in a water dipping tank, applying an activator solution to the film to soften the base coat on the substrate, dipping the substrate into the water on top of the film to transfer the printing from the film to the substrate, rinsing and drying the substrate, and applying a clear coating. The transfer methods described herein take place in a non-aqueous environment in which no part of the article is at least partially submerged in water which require that the article be rinsed and dried. The articles described herein may be free of a softenable base coat and an activator (e.g., residual activator).

The transfer methods and articles described herein are also distinguishable from pre-printed thermoforms. Pre-printed thermoforms are articles that are typically made of plastic. After the article is printed, the article with the printing thereon is thermoformed (placed in an oven and formed) into the desired configuration. As a result, the article and the printing thereon are typically stretched the same amount during the thermoforming process. In the case of the transfer methods and articles described herein, the article, such as a blow molded plastic container, may have been stretched during formation (during the blow molding process). The transfer material may be stretched during application to the surface of the article. As a result, the plastic container will typically be stretched a different amount than the transfer material.

After the transfer material 22 is transferred to the article(s) 10, the article(s) may be transferred by the conveyor to another conveyor or apparatus for further processing. For example, if the article(s) 10 are bottles, the bottles may be transferred from the conveyor to a filler, and capper.

EXAMPLES

The following are non-limiting examples of thiol-acrylate and thiol-ene acrylate ink-jettable adhesive compositions.

1. Thiol-Acrylate

| Weight % | Weight % Range | Chemical | Supplier | Supplier Identifier | Descriptor |
|---|---|---|---|---|---|
| 70 | 50-90 | TPGDA (tripropylene glycol diacrylate) | IGM | Photomer 4061 ™, CAS#: 42978-66-5 | Di-acrylate monomer |
| 20 | 10-50 | PETMP (pentaerythritol tetra(3-mercaptopropionate)) | Bruno Bock | CAS#: 7575-23-7, EC# 231-472-8 | Tetra-thiol monomer |
| 8 AND 2 | Less than 15 OR Less than 5 | TPO (diphenyl (2,4,6-trimethylbenzoyl)-phosphine oxide) OR BAPO (Phosphine oxide, phenyl bis (2,4,6-trimethyl benzoyl)) | CIBA | Darocur ™ TPO, CAS#: 75980-60-8 OR Irgacure 819 ™, CAS#: 162881-26-7 | Photoinitiator |
| 5 | 5-15 | Adhesion Promoters for example: Phosphate Methacrylate | Miwon | Miramer SC1400A ™ | Adhesion Promoter |

-continued

| Weight % | Weight % Range | Chemical | Supplier | Supplier Identifier | Descriptor |
|---|---|---|---|---|---|
| 0.05 | Less than 1 | Inhibition Additive for example: Q-1301 (N-Nitorosophenylhydroxyl amine aluminum salt) | Wako | Q1301 ™ CAS#: 15305-07-4 | Inhibitor |

2. Thiol-Ene-Acrylate

| Weight % | Weight % Range | Chemical | Supplier | Supplier #, CAS# | Descriptor |
|---|---|---|---|---|---|
| 30 | 10-40 | TPGDA (tripropylene glycol diacrylate) | IGM | Photomer 4061 ™, CAS#: 42978-66-5 | Di-acrylate monomer, used as diluent in this case. |
| 30 | 10-50 | PETMP (pentaerythritol tetra(3-mercaptopropionate)) | Bruno Bock | CAS#: 7575-23-7, | Tetra-thiol monomer |
| 25 | 20-70 | TATATO (triallyl isocyanurate) | Sartomer | SR533, CAS#: 1025-15-6 | Tri-ene monomer |
| 8 AND 2 | Less than 15 OR Less than 5 | TPO (diphenyl (2,4,6-trimethylbenzoyl)-phosphine oxide) OR BAPO (Phosphine oxide, phenyl bis (2,4,6-trimethyl benzoyl)) | CIBA | Darocur ™ TPO, CAS#: 75980-60-8 OR Irgacure 819 ™, CAS#: 162881-26-7 | Photoinitiator |
| 5 | 5-15 | Adhesion Promoters for example: Phosphate Methacrylate | Miwon | Miramer SC1400A ™ | Adhesion Promoter |
| 0.05 | Less than 1 | Inhibition Additive for example: Q-1301 (N-Nitorosophenylhydroxyl amine aluminum salt) | Wako | Q-1301 ™ CAS#: 15305-07-4 | Inhibitor |

3. Thiol-Ene-Acrylate (with Thiols of Two Different Functionalities)

| Weight % | Weight % Range | Chemical | Supplier | Supplier #, CAS# | Descriptor |
|---|---|---|---|---|---|
| 20 | 10-40 | TPGDA (tripropylene glycol diacrylate) | IGM | Photomer 4061 ™, CAS#: 42978-66-5 | Di-acrylate monomer, used as diluent in this case. |
| 15 | 10-50 | PETMP (pentaerythritol tetra(3-mercaptopropionate)) | Bruno Bock | CAS#: 7575-23-7 | Tetra-thiol monomer |
| 20 | 10-60 | GDMP (glycol dimercaptopropionate) | Bruno Bock | CAS#: 22504-50-3 | Di-thiol |
| 30 | 20-70 | TATATO (triallyl isocyanurate) | Sartomer | SR533, CAS#: 1025-15-6 | Tri-ene monomer |
| 8 AND 2 | Less than 15 OR Less than 5 | TPO (diphenyl (2,4,6-trimethylbenzoyl)-phosphine oxide) OR BAPO (Phosphine oxide, phenyl bis (2,4,6-trimethyl benzoyl)) | CIBA | Darocur ™ TPO, CAS#: 75980-60-8 OR Irgacure 819, CAS#: 162881-26-7 | Photoinitiator |

-continued

| Weight % | Weight % Range | Chemical | Supplier | Supplier #, CAS# | Descriptor |
|---|---|---|---|---|---|
| 5 | 5-15 | Adhesion Promoters for example: Phosphate Methacrylate | Miwon | Miramer SC1400A ™ | Adhesion Promoter |
| 0.05 | Less than 1 | Inhibition Additive for example: Q-1301 (N-Nitorosophenylhydroxyl amine aluminum salt) | Wako | Q-1301 ™ CAS#: 15305-07-4 | Inhibitor |

Additional additives may include wetting agents, surfactants, inorganic fillers, and viscosity modifiers may be added to the base formulations above.

Comparative Example 1: Acrylate Formulation

| Weight % | Weight % Range | Chemical | Supplier | Supplier Identifier | Descriptor |
|---|---|---|---|---|---|
| 60 | 10-90 | TPGDA (tripropylene glycol diacrylate) | IGM | Photomer 4061 ™, CAS#: 42978-66-5 | Di-acrylate monomer |
| 30 | 10-90 | PEA (Phenoxyethyl Acrylate) | | | |
| 8 | Less than 15 | TPO (diphenyl (2,4,6-trimethylbenzoyl)-phosphine oxide) | CIBA | Darocur ™ TPO, CAS#: 75980-60-8 | Photoinitiator |
| 5 | 5-15 | Adhesion Promoters for example: Phosphate Methacrylate | Miwon | Miramer SC1400A ™ | Adhesion Promoter |

The cure dosage for the above formulations of both thiol-ene and thiol-acrylate is lower than the cure dosage of an acrylate formulation. Where cure dosage is the UV energy density in J/cm$^2$ required such that the highest possible conversion of C double bonds is attained or at least 90% of C double bonds are converted. A summary of example dosages (Fourier transform infrared spectroscopy (FTIR) measurement of C double bond conversion) is shown in the table below. As shown below, the cure dosage for Example 1 can be about one third of the cure dosage of Comparative Example 1.

Measured Cure Dosages

| Example | Formulation | Measured Cure Dosage (mJ/cm$^2$) |
|---|---|---|
| Comparative Example 1 | Acrylate based formulation (chain growth) | 368 |
| 1 | Thiol-Acrylate (step growth) | 103 |

Under the same UV intensity conditions, formulations with a lower cure dosage exhibit full conversion in a shorter time period of exposure. In some cases, the formulations can be substantially fully cured in less than or equal to one second.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "90°" is intended to mean "about 90°".

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for applying a transfer material onto the surface of a three-dimensional article comprising:
providing at least one three-dimensional article which has a surface;

providing at least one deposition device comprising an inkjet print head;

providing a transfer component with initial dimensions, a surface, and an initial configuration;

depositing a material onto a portion of the surface of said transfer component with said deposition device to form a transfer material on said transfer component, wherein at least a portion of said transfer material comprises a UV curable inkjet-able composition comprising a thiol-acrylate composition, a thiol-ene-acrylate inkjet-able composition, or a combination thereof, wherein said transfer material has an outer surface, and said UV curable composition is on the outer surface of said transfer material;

moving at least one of the transfer component with the transfer material thereon and the article toward the other so that the transfer component with the transfer material and a portion of the article make contact such that the outer surface of the transfer material is adjacent to the surface of the article;

providing a source of UV radiation;

at least partially curing the UV curable composition with the source of UV radiation; and transferring the transfer material from the transfer component onto the surface of said article, wherein the curing takes place during the time period between when the article and the transfer material make contact up until the transfer material is transferred from the transfer component onto the surface of the article.

2. The process of claim 1 wherein the UV curable inkjet-able composition comprises an inkjet ink.

3. The process of claim 1 wherein the UV curable inkjet-able composition comprises an inkjet-able adhesive.

4. The process of claim 1 wherein:

the transfer component is at least partially permeable to UV radiation;

the source of UV radiation is positioned so that the transfer component is disposed between the source of UV radiation and the UV curable composition; and the step of at least partially curing the UV curable composition with the source of UV radiation comprises passing the UV radiation through said transfer component to at least partially cure the UV curable composition.

5. The process of claim 4 wherein the step of providing at least one deposition device comprises providing a first deposition device and a second deposition device, wherein at least one of said deposition devices comprises an inkjet print head, and the step of depositing a material onto a portion of the surface of said transfer component with said deposition device comprises depositing ink onto a portion of the surface of the transfer component with said first deposition device, and then depositing an adhesive onto at least a portion of said ink with said second deposition device, wherein the UV curable inkjet-able composition comprises at least one of said ink and said adhesive, and the deposition device used to deposit said UV curable inkjet-able composition comprises an inkjet print head.

6. The process of claim 5 wherein the UV inkjet-able composition comprises at least said adhesive, and the step of at least partially curing the UV curable inkjet-able composition with the source of UV radiation comprises at least partially curing said adhesive by passing UV energy through said transfer component and said ink.

7. The process of claim 6 wherein said UV radiation comprises waves having a wavelength of greater than or equal to about 400 nm.

8. The process of claim 6 wherein said UV radiation comprises waves having a wavelength of greater than or equal to about 400 nm and less than or equal to about 700 nm.

9. The process of claim 1 wherein the inkjet print head has a plurality of nozzles having an opening with a diameter of from about 10 μm to about 200 μm, and said UV curable adhesive has an Ohnesorge number that is between about 0.1 and about 1 where the characteristic length used to calculate the Ohnesorge number corresponds to the nozzle diameter.

10. The process of claim 1 further comprising repositioning the transfer material on the surface of the article after the transfer component with the transfer material and a portion of the article make contact.

* * * * *